US012771902B2

(12) United States Patent
Wang et al.

(10) Patent No.: US 12,771,902 B2
(45) Date of Patent: Oct. 20, 2026

(54) MULTIMODE HETEROGENEOUS CELLULAR COMMUNICATION WITH INTEGRATED MULTI-CHANNEL LINK DIVERSITY, PHYSICAL LAYER OPTIMIZATION, AND RADIO ACCESS HANDOVER

(71) Applicant: China Entropy Co., Ltd. (AIOT Entropy., Ltd.), Beijing (CN)

(72) Inventors: Tiejun Wang, Beijing (CN); Anne Wong, Alexandria, VA (US); Ximing Wang, Beijing (CN)

(73) Assignee: China Entropy Co., Ltd. (AIOT Entropy Co., Ltd.), Beijing (CN)

( * ) Notice: Subject to any disclaimer, the term of this patent is extended or adjusted under 35 U.S.C. 154(b) by 0 days.

(21) Appl. No.: 19/239,178

(22) Filed: Jun. 16, 2025

(65) Prior Publication Data

US 2025/0373888 A1 Dec. 4, 2025

Related U.S. Application Data

(63) Continuation-in-part of application No. 19/136,979, filed as application No. PCT/CN2023/143593 on (Continued)

(51) Int. Cl.
*H04N 21/436* (2011.01)
*H04L 25/20* (2006.01)
(Continued)

(52) U.S. Cl.
CPC ....... *H04N 21/43615* (2013.01); *H04L 25/20* (2013.01); *H04L 65/61* (2022.05); (Continued)

(58) Field of Classification Search
CPC ....... H04N 21/43615; H04N 21/43635; H04N 21/4383; H04N 21/440218; (Continued)

(56) References Cited

U.S. PATENT DOCUMENTS 9,549,381 B2 * 1/2017 Dor ........................ H04W 52/52
11,200,799 B2 * 12/2021 Vrabete .................. G08G 1/017
(Continued)

*Primary Examiner* — Brandon J Miller
(74) *Attorney, Agent, or Firm* — Dentons US LLP

(57) ABSTRACT

The invention overcomes the constraints imposed by conventional wireless communication standards by introducing a physical-layer optimized architecture that decouples transmission control from any single protocol. Rather than being confined by the predefined behaviors of LTE, 5G NR, Wi-Fi, or NB-IoT, the system implements a unified control system that dynamically manages radio parameters—such as modulation, coding, and power—based on real-time link quality and network context. This cross-standard, multimode capability effectively supersedes traditional standard-driven implementations, enabling adaptive, low-latency, and spectrum-efficient communication in complex heterogeneous environments.

The system dynamically controls radio access network (RAN) and physical layer parameters, including carrier aggregation, dynamic spectrum allocation, modulation and coding scheme (MCS) adaptation, beamforming configuration, channel coding, transmit power control, and frequency selection. The system architecture includes multi-mode base stations, relay nodes, and edge access points that support inter-RAT handover, fast radio link recovery, and seamless mobility across diverse wireless technologies.

20 Claims, 33 Drawing Sheets

Related U.S. Application Data

Dec. 29, 2023, now abandoned, application No. 19/239,178, filed on Jun. 16, 2025 is a continuation-in-part of application No. 19/136,966, filed as application No. PCT/CN2023/137966 on Dec. 11, 2023, now abandoned, application No. 19/239,178 is a continuation-in-part of application No. 18/688,784, filed as application No. PCT/CN2022/116928 on Sep. 3, 2022, application No. 19/239,178, filed on Jun. 16, 2025 is a continuation-in-part of application No. 18/106,497, filed on Feb. 7, 2023, now Pat. No. 12,348,632, which is a continuation of application No. 16/605,191, filed as application No. PCT/US2019/042729 on Jul. 22, 2019, now abandoned.

(60) Provisional application No. 63/436,111, filed on Dec. 30, 2022, provisional application No. 63/450,100, filed on Mar. 6, 2023, provisional application No. 63/546,495, filed on Oct. 30, 2023, provisional application No. 63/240,965, filed on Sep. 5, 2021, provisional application No. 63/325,613, filed on Mar. 31, 2022, provisional application No. 63/353,816, filed on Jun. 20, 2022, provisional application No. 62/701,837, filed on Jul. 22, 2018.

(51) Int. Cl.

| | |
|---|---|
| ***H04L 65/61*** | (2022.01) |
| ***H04L 65/75*** | (2022.01) |
| ***H04L 67/50*** | (2022.01) |
| ***H04L 67/52*** | (2022.01) |
| ***H04N 21/41*** | (2011.01) |
| ***H04N 21/4363*** | (2011.01) |
| ***H04N 21/438*** | (2011.01) |
| ***H04N 21/4402*** | (2011.01) |
| ***H04N 21/61*** | (2011.01) |
| ***H04W 4/029*** | (2018.01) |
| ***H04W 28/06*** | (2009.01) |
| ***H04W 84/04*** | (2009.01) |
| ***H04W 84/12*** | (2009.01) |
| ***H04W 88/04*** | (2009.01) |

(52) U.S. Cl.

CPC ............ *H04L 65/765* (2022.05); *H04L 67/52* (2022.05); *H04L 67/535* (2022.05); *H04N 21/41265* (2020.08); *H04N 21/43635* (2013.01); *H04N 21/4383* (2013.01); *H04N 21/440218* (2013.01); *H04N 21/6131* (2013.01); *H04W 4/029* (2018.02); *H04W 28/06* (2013.01); *H04W 84/042* (2013.01); *H04W 84/047* (2013.01); *H04W 84/12* (2013.01); *H04W 88/04* (2013.01)

(58) Field of Classification Search

CPC ..... H04N 21/6131; H04L 25/20; H04L 65/61; H04L 65/765; H04L 67/52; H04L 67/535; H04M 21/41265; H04W 4/029; H04W 28/06; H04W 84/042; H04W 84/047; H04W 84/12; H04W 88/04

See application file for complete search history.

(56) References Cited

U.S. PATENT DOCUMENTS

| | | | | |
|---|---|---|---|---|
| 12,366,848 | B2 * | 7/2025 | Shao | G05B 19/41845 |
| 2014/0036702 | A1 * | 2/2014 | Van Wyk | H04B 3/46<br>370/252 |
| 2014/0192664 | A1 * | 7/2014 | Ericson | H04W 24/08<br>370/252 |
| 2016/0231830 | A1 * | 8/2016 | Nemala | G06F 3/04847 |
| 2017/0238129 | A1 * | 8/2017 | Maier | H04W 4/14<br>455/404.2 |
| 2018/0132189 | A1 * | 5/2018 | Sundararajan | H04W 16/32 |
| 2018/0198641 | A1 * | 7/2018 | Gilani | G06N 20/00 |
| 2018/0270876 | A1 * | 9/2018 | Ding | H04L 5/0055 |
| 2020/0050182 | A1 * | 2/2020 | Cheng | G06N 3/08 |
| 2021/0266715 | A1 * | 8/2021 | Uchiyama | H04W 4/48 |
| 2021/0329193 | A1 * | 10/2021 | Wu | H04N 5/77 |
| 2022/0050427 | A1 * | 2/2022 | Brooks | G06F 30/00 |
| 2023/0180138 | A1 * | 6/2023 | El-Jamous | H04W 52/223<br>455/280 |
| 2024/0373259 | A1 * | 11/2024 | Wang | H04W 24/02 |

* cited by examiner

MULTIMODE HETEROGENEOUS CELLULAR COMMUNICATION WITH INTEGRATED MULTI-CHANNEL LINK DIVERSITY, PHYSICAL LAYER OPTIMIZATION, AND RADIO ACCESS HANDOVER

1. CROSS REFERENCE TO RELATED APPLICATIONS

This application is a continuation in part of U.S. patent application Ser. No. 19/136,979 filed Jun. 6, 2025, which claims priority to national stage application no. PCT/CN/2023/143593 filed Dec. 29, 2023, which claims priority to U.S. Provisional Application Nos. 63/436,111 filed Dec. 30, 2022, 63/450,100 filed Mar. 6, 2023 and 63/546,495 filed Oct. 30, 2023. This application is a continuation in part of U.S. patent application Ser. No. 19/136,966 filed Jun. 9, 2025, which claims priority to national stage application no. PCT/CN2023/137966 filed Dec. 11, 2023, which claims priority to U.S. Provisional Application No. 63/436,111 filed Dec. 30, 2022. This application is a continuation in part of U.S. patent application Ser. No. 18/688,784 filed Mar. 3, 2024, which claims priority to national stage application no. PCT/CN2022/116928 filed Sep. 3, 2022, which claims priority to U.S. Provisional Application Nos. 63/240,965 filed Sep. 5, 2021, 63/325,613 filed Mar. 31, 2022, 63/353,816 filed Jun. 20, 2022. This application is a continuation in part of U.S. patent application Ser. No. 18/106,497 filed Feb. 7, 2023, which is a continuation of U.S. patent application Ser. No. 16/605,191 filed Oct. 14, 2019, which claims priority to U.S. Provisional Application No. 62/701,837 filed Jul. 22, 2018 and national stage application no. PCT/US2019/042729 filed Jul. 22, 2019. The entire contents of these applications are hereby incorporated by reference.

This application is a continuation in part of PCT/CN2023/143593 filed on Dec. 29, 2023, PCT/CN2023/143593 claims priority to U.S. patent applications No. U.S. 63/436,111 filed on Dec. 30, 2022, No. U.S. 63/450,100 filed on Mar. 6, 2023, and No. U.S. 63/546,495 filed on Oct. 30, 2023;

This application is a continuation in part of PCT/CN2023/137966 filed on Dec. 11, 2023, PCT/CN2023/137966 claims priority to U.S. patent applications No. U.S. 63/436,111 filed on Dec. 30, 2022;

This application is a continuation in part of PCT application No. PCT/CN2023/102266 filed on Jun. 26, 2023, all of which are incorporated herein by reference.

This application is a continuation in part of U.S. Ser. No. 18/688,784 filed on Mar. 3, 2024 which is a national entry of PCT/CN2022/116928 (WO2023030513A1), filed on Sep. 3, 2022. PCT/CN2022/116928 claims priority to the following: the U.S. application 63/240,965 submitted on Sep. 5, 2021, with the title of "A wireless system", and the application US 63/325,613 submitted on Mar. 31, 2022, with the title of "Physical Layer Optimized Multimode Heterogeneous Cellular Networks", the application US 63/353,816 filed on Jun. 20, 2022, with the title of "An IoT System"; the application CN202210571576.8 filed on May 24, 2022, titled "Internet of Things Data Utilization and Deep Learning Method", all of which are incorporated herein by reference in their entirety.

This application is a continuation-in-part of application Ser. No. 18/106,497 filed on Feb. 7, 2023, which is a continuation of application Ser. No. 16/605,191, with a PCT (PCT/US2019/042729) filed on Jul. 22, 2019, which claims priority of 62/701,837 filed on Jul. 22, 2018, all of which are incorporated herein by reference in their entirety.

2. DEFINITIONS

PLOMUCN—Physical layer optimized multimode heterogeneous cellular network

MHCN—Multimode Heterogeneous Cellular Networks

MHCCS—Multimode Heterogeneous Cellular Communication System

MMRAS—Multi-Mode Radio Access System

HCN—Heterogeneous Cellular Networks

DHRS—Dynamic handover and RAT switching

RATs—radio access technologies

SNR—signal-to-noise ratio

PER—packet error rate

RAN—radio access network

MAC layer—medium access control layer

MCS—modulation and coding schemes

BPSK—Binary Phase Shift Keying (digital modulation scheme)

QPSK—Quadrature Phase Shift Keying (digital modulation scheme)

QAM—Quadrature Amplitude Modulation

UDP—An acronym for User Datagram Protocol.

Base radio station—A transceiver connecting a number of other devices to one another or to a network.

3GPP—$3^{rd}$ Generation Partnership Projection such as 3G, 4G, 5G

Link—A communication channel that connects two or more devices.

Network node—An active electronic device that is capable of receiving and transmitting information over a communications channel to at least one other node of the network.

Node—A network node.

Cellular network—A network where the last link is wireless.

Mobile network—Another name for a cellular network.

1G, 2G, 3G, 4G, and 5G are acronyms for "first generation" through "fifth generation" 1G, 2G, 3G, 4G, and 5G also refer to sets of standards used for mobile devices and mobile telecommunications use services and networks.

Communication parameters—Bandwidth, data rate, latency, transmitted power, size of data package, data package structure, modulation scheme, coding scheme, receiving sensitivity, nodes of network, and node structure.

Network topology—Description of the links between nodes, which include the bus, ring, star, mesh, tree, and hybrid topologies.

Network structure—Network nodes, node addresses, node object code, data lookup tables, such as routing tables, packet priorities, routing priorities, and path priorities, and topology.

Data rate—The rate at which data is transmitted from one node to another.

Bandwidth—The maximum data rate at which data is transmitted from one node to another.

Latency—The amount of time for a message transmitted from a source to reach its destination.

Traffic shaping—Regulating network packets in a PSN.

Quality Of Service (QOS)—And technology on a PSN that manages data traffic to reduce packet loss, latency, and/or jitter.

Analog to digital converter (ADC)—An electronic circuit that converts an analog value to a digital representation of that value.

Seed—A number or vector input to a pseudo random number generator function.

Salt—One of two values stored in memory in association with one another, in which the other value is a hash of a concatenation the salt and a value comprising an identifier (such as a password).

AES (Advanced Encryption Standard)—A symmetric block cipher.

RSA (Rivest-Shamir-Adleman)—A public-key cryptosystem.

Multicast—Transmission from one sender to many recipients.

IP multicast—A network protocol in which certain nodes store “join” and “leave” messages for particularly designated frames or packets, and those certain nodes retransmit for particularly designated frames or packets to nodes from which they received a join message and have not received a leave message.

MC System—A partial acronym for Management Center System.

CHS—An acronym for Centralized Hub System.

PSTN—An acronym for Public Switched Telephone Network.

NFC—An acronym for Near Field Communication.

DSL—An acronym for Digital Subscriber Line.

HetNet—A pseudo acronym for Heterogeneous Network.

WCDMA—An acronym for Wideband Code Division Multiple Access.

PCIe—An acronym for Peripheral Component Interconnect Express.

MQTT—An acronym for Message Queuing Telemetry Transport.

RPC—An acronym for Remote Procedure Call.

gRPC—An open source RPC that uses HTTP/2 (an updated revision to HTTP) for Protocol Buffers as the interface description language.

3. DESCRIPTION OF THE BACKGROUND

Cellular communication networks have evolved to support an increasingly diverse range of applications, each with distinct performance requirements for data throughput, latency, reliability, and energy efficiency. To meet these demands, modern networks are often deployed as heterogeneous systems comprising multiple Radio Access Technologies (RATs), such as 2G, 3G, 4G LTE, 5G NR, NB-IoT, and Wi-Fi. These RATs differ in their physical layer characteristics, network topologies, coverage areas, and communication protocols. As a result, they offer varying capabilities in terms of bandwidth, latency, error resilience, and mobility support.

In heterogeneous wireless environments, the performance of communication links fluctuates dynamically due to factors such as multipath fading, interference, user mobility, terrain, and real-time network congestion. Different access technologies may respond differently to such conditions. For example, Wi-Fi networks typically deliver high throughput and low latency in short-range scenarios but are less effective for mobile users. On the other hand, cellular networks offer broader coverage and support for mobility, but often at the cost of higher latency and less predictable link quality.

Moreover, with the rise of the Internet of Things (IoT), an increasing number of devices operate under stringent power, latency, and reliability constraints. IoT deployments demand highly adaptable network behavior, especially at the physical and link layers, to ensure consistent communication quality in environments where link conditions are continuously changing.

While current communication systems support limited forms of handover and fallback between RATs, they generally lack unified control mechanisms to dynamically evaluate link conditions and reconfigure physical layer transmission parameters across multiple RATs and communication channels. These systems also do not provide efficient, real-time adaptation based on sensor-driven environmental data or support proactive network reconfiguration in response to changing conditions.

As a result, conventional systems are often unable to exploit available link diversity across heterogeneous networks or to maintain optimal performance in high-mobility or interference-prone environments. The lack of integrated cross-RAT coordination, physical layer optimization, and real-time control severely limits their suitability for latency-sensitive or mission-critical applications. Accordingly, there exists a need for a communication architecture that supports multimode operation across heterogeneous RATs with enhanced physical layer adaptability. Such a system should be capable of dynamically evaluating link quality metrics, performing seamless inter-RAT and intra-RAT handovers, and adjusting transmission parameters (such as modulation, coding rate, and transmit power) in real time. In particular, there is a need for a wireless system that leverages physical layer sensing and environmental data to optimize link performance, enhance spectrum efficiency, and support robust, low-latency communication across diverse and dynamic network conditions.

4. SUMMARY OF THE DISCLOSURE

4.1 Multimode Heterogeneous Cellular Network with Seamless Radio Access Handover and Physical Layer Optimization A Physical-Layer Optimized Multimode Heterogeneous Cellular Network (PLOMHCN) is disclosed, providing an integrated radio access framework that enables seamless, real-time handover and adaptive physical-layer transmission control. Unlike conventional systems constrained by fixed protocol boundaries, this invention introduces a cross-standard physical-layer and communication layer control architecture that transcends individual RAT limitations to deliver dynamic, environment-aware optimization of wireless links. The invention disruptively transcends and redefines the conventional boundaries of communication standards such as LTE, 5G NR, Wi-Fi, NB-IoT, and short-range communications, etc. The invention enables unprecedented flexibility and performance.

Central to the invention is its capability to continuously sense and respond to dynamic environmental factors impacting radio performance-such as user mobility, interference variability, multipath effects, and contextual data from spatially distributed sensors reflecting physical surroundings or network anomalies. This environmental awareness enables proactive, real-time adjustment of key physical-layer parameters-modulation schemes, coding rates, channel bandwidth, transmission power, and antenna configurations-independently of underlying RAT protocols. This adaptive control framework supports true multimode operation in both User Equipment (UE) and base stations, allowing concurrent or selective use of multiple RATs with seamless inter- and intra-RAT handovers. Decisions are based on link quality indicators (e.g., RSRP, SINR, CQI) combined with real-time environmental inputs, ensuring resilient, low-latency, and spectrally efficient connectivity in dense, heterogeneous deployments.

The PLOMHCN further incorporates multi-channel link diversity, carrier aggregation, and dual connectivity features, integrated with a cross-layer coordination module that synchronizes physical-layer reconfiguration with MAC and higher-layer mobility control. This enables rapid, low-disruption handovers and consistent QoS across complex network topologies including macrocells, small cells, relay nodes, Wi-Fi access points, etc.

Critically, the system leverages real-time environmental and network-edge sensing to trigger anticipatory radio parameter adaptations. For example, upon detecting interference spikes or obstructions, the system dynamically modifies modulation and coding schemes, bandwidth allocations, and scheduling priorities, thus autonomously maintaining optimal link performance and energy efficiency. By emphasizing physical-layer adaptability driven by real-world environmental feedback, the PLOMHCN overcomes inherent limitations of rigid protocol-defined systems, establishing a scalable, interoperable platform tailored for next-generation wireless services—including ultra-reliable low-latency communications (URLLC), enhanced mobile broadband (eMBB), massive machine-type communications (mMTC), and IoT networks demanding robust, efficient connectivity.

Transmission control is implemented directly at the radio units (e.g., gNBs, eNBs, or relay nodes), allowing localized link adaptation and self-healing behavior in the wireless network. Unlike application-layer architectures, the invention prioritizes physical and link-layer mechanisms to meet ultra-low latency, high reliability, and quality of service (QOS) requirements inherent in industrial and safety-critical scenarios.

By tightly integrating radio access technology control with physical layer sensing feedback, the invention enables next-generation wireless systems to autonomously reconfigure spectrum usage, manage interference, and maintain optimal link conditions-under fluctuating signal quality or geographic constraints. The physical layer-optimized heterogeneous cellular network is well-suited for Internet of Things (IoT) applications that require robust, adaptive, and energy-efficient wireless communication. Also referred as the “novel IoT network”, “next generation Internet of Things”, or “Multi-mode heterogeneous network” in parent applications and current disclosure, the PLOMHCN details a multi-mode, heterogeneous cellular system optimized at the physical layer and communication layer to support IoT device diversity, low-power operation, and scalable connectivity. The PLOMHCN defines an IoT-centric architecture enhanced through physical-layer-driven mechanisms and Radio Access Network (RAN)-level control techniques. These include adaptive modulation and coding (AMC), cross-RAT (Radio Access Technology) handover optimization, interference-aware scheduling, and real-time link quality assessment.

The novel IoT network or the next generation of IoT system is herein referred as the Physical Layer Optimized Multimode Heterogeneous Cellular Network (PLOMHCN) or Multi-mode heterogeneous network. The change in terminology reflects the network’s enhanced focus on physical-layer optimization and RAN-level control for wireless communication applications.

In some embodiments, the Heterogeneous Cellular Networks (MHCN) with Multi-Mode Radio Access Handover and Dynamic Physical Layer Control can be dynamically configured and optimized for low-power, massive IoT deployments. The dynamic configuration, for example, may be performed by one or more of hardware, firmware, and/or software resident in the network. The dynamic configuration may for example adjust network structure and communication parameters. The dynamic adjustment may for example be in response to correlation of values for physical properties received by sensors of the network. The values of the physical properties are one form of sensor data. This sensor data is generated by sensors at spatially diverse geographic locations and typically provides measurements of physical properties at those locations.

In some examples, dynamically configuring the IoT network and/or PLOMHCN may include moving processing functions and tasks between network nodes, Fog devices, and Edge devices. Dynamically configuring may include changing processing functions and tasks being performed by the PLOMHCN.

In some examples, dynamically configuring the PLOMHCN may be a response of the network to sensor data. Dynamically configuring may comprising, making and breaking links between network nodes. Dynamically configuring may comprising, changing routing priority associated with different types of data.

The novel IoT network and/or PLOMHCN functions to preferably adjust network structure and communication parameters by applying an algorithm to data, including the sensor data from plural sensors. The sensor data used by the algorithm may include sensor data obtained over a period of time. The sensor data may include sensor data obtained from sensors located at geographically disparate locations. The sensor data may include sensor data transmitted from sensors to different nodes of network. Each node of the network that communicates with a sensor, may communicate with plural sensors. However, each sensor typically communicates with only one node of the network.

The algorithm may determine the first and second time derivatives of the sensor data from any one or more or all of the sensors. The algorithm may determine the first derivative of the sensor data, and the second derivative of the sensor data.

The algorithm may respond to the sensor data, the first derivative of the sensor data, and the second derivative of the sensor data, by dynamically prioritizing communications to and from sensors having values outside a relatively normal range, from sensors providing values that have relatively large first time derivatives, and from sensors providing values having relatively large second time derivatives.

The algorithm may model the spatial progression of variation in values of sensor data, variation in first time derivatives, and variation in second time derivatives. From this modeling, the algorithm may predict spatial and temporal changes in environmental properties corresponding to the sensor data. The algorithm may use the results of the model to predict sensors in locations expected to experience abnormal sensor values, and large first and/or second time derivatives of sensor data. The algorithm may respond to the predictions by dynamically prioritizing communications to and from sensors predict to be in locations that will have abnormal values, and large first and/or second time derivatives of sensor data.

Dynamically prioritizing communications to certain sensors comprises one or more of changing network structure and communication parameters. For example, dynamically prioritizing communications to and from a particular sensor may comprise instructing a first node that receives communications directly from a sensor to increase transmission power and/or wirelessly link to a more network node further away from the node to which the first node previously linked. For example, dynamically prioritizing communications to and from a particular sensor may comprise instructing a first node that receives communications directly from a sensor to increase transmission frequency, to more frequently provide data from the sensor to a destination. For example, dynamically prioritizing communications to and from a particular sensor may comprise instructing a first node that receives communications directly from a sensor to switch modulation from BPSK to QPSK to increase data transmission rate. For example, dynamically prioritizing communications to and from a particular sensor may comprise instructing control electronics controlling the sensor to increase the sensors sampling rate and/or resolution. For example, dynamically prioritizing communications to and from a particular sensor may comprise traffic shaping and QOS of packets originating from that particular sensor. One mechanism to provide for traffic shaping and QOS of packets is to include a sensor ID, or geographic region ID, in packet control data fields in the header of the packets. One or more nodes in the network may inspect packet headers to determine a sensor ID, or geographic region ID. That node may determine whether to promptly forward the inspected packet depending upon comparison of sensor ID, or geographic region ID, to values or ranges that node stores in memory associated with high priority. That node may also determine to buffer, that is delay, transmission of packets whose a sensor ID, or geographic region ID do not match values or ranges that node stores in memory associated with high priority.

The algorithm may respond to the sensor data, the first derivative of the sensor data, and the second derivative of the sensor data, by dynamically adjusting communication parameters, bandwidth, data rate, latency, transmitted power, size of data package, data package structure, modulation scheme, coding scheme, receiving sensitivity, and nodes of network and network structure.

The novel IoT network preferably includes algorithms that can adjust the foregoing parameters based upon IoT network requirements. These requirements may vary depending upon the goal of the entities using the network, or by industry. One example is an IoT network containing sensors designed to determine if fire is present. The IoT sensors may sensors that monitor temperature, humidity, atmospheric gas content, and smoke. Fires evolve rapidly. It is therefore desirable to provide sensors in the vicinity of a fire with higher data rates, sampling times, and lower latency. The foregoing algorithm may function to identify fires by correlating data from sensor to sensor location. Upon identifying a fire, the algorithm may respond by increasing the responsiveness of sensors at the location of the fire and in locations predicted by the algorithm's predictive modeling to soon be in the fire. Consequently, the network and provide more responsive time feedback on the fire to personnel. Consequently, the network and provide more responsive time feedback on the fire to automated response equipment designed to respond to a fire. The software that carries out the dynamic adjustment for the IoT network may be centralized in one component or spread among multiple components of the network. In one example, a CHS includes the hardware, software or firmware to carry out at least some and optionally all of the dynamic configuration. In another example, an MC System includes the hardware, software or firmware to carry out at least some and optionally all of the dynamic configuration.

In conjunction with providing the dynamically configurable IoT network, one or more embodiments of the invention provide efficient integration for Internet, wireless networks, cable, DSL, satellite, and TV communications to enable communications among potentially different user terminals. The user terminals include home and office appliances (such as TV, computer) and wireless terminals (such as mobile phone, PDA). In a system configured according to this aspect, an MC System receives, selects, converts, compresses, decompresses, and routs data to the user terminals. Various examples are presented and will be apparent to the ordinarily skilled artisan once instructed according to the teachings of this aspect. By way of example, signals such as those from a fire alarm or theft sensor are sent through the MC System to a user's cell phone and/or 911 Center. The corresponding sensor data from these sensors is also used to carry out the dynamic configuration of the IoT network. In this aspect, some processing functions may be performed by the MC System in combination with other components, such as a user terminal, other MC Systems, the CHS, etc.

4.2 MDTU (Multimode Data Transmit Unit)

The Physical layer optimization enhances IoT performance in heterogeneous networks by improving link reliability, reducing latency, and supporting seamless mobility. The Physical Layer Optimized Multimode Heterogeneous Cellular Network and/or the novel IoT network comprises a plurality of nodes interconnected via a heterogeneous multichannel wireless network. A multimode data transmit unit (MDTU) dynamically selects links based on real-time link quality metrics including SNR, latency, and bandwidth. The MDTU's control circuitry adjusts communication parameters—modulation scheme, transmit power, data rate—to optimize link performance. The MDTU supports concurrent multi-channel operation for link diversity. The system enables dynamic protocol selection and edge processing, reducing latency and enhancing throughput in multi-protocol wireless environments. A multimode data transmit unit (MDTU) is an IoT network and/or PLOMHCN node that receives sensor data directly from one or more sensors, and transmits at least some of that sensor data to other nodes of the network. An MDTU preferably is capable of receiving data from different sensors transmitted to it using different transmission modes and protocols. The novel IoT network and/or the PLOMHCN comprises at least one and preferably a large number of MDTUs.

An MDTU comprises a digital computer which comprises a CPU, digital memory, a data bus, data communication lines and/or wireless transceiver, digital memory, and software and data resident in the memory. The resident software comprises an operating system controlling interaction of the CPU and other physical components of the MDTU enabling the CPU to read and write data to and from the memory, to send control signals circuitry controlling the data communication lines and/or transceiver to communication settings between the MDTU and other devices, and to send and receive data using the data communication lines and/or transceiver. The resident software configures the MDTU to apply the hash function to certain data and to encrypt certain data for transmission to other nodes, and preferably also to integrated sensors, and to authenticate and decrypt certain data received from other nodes and preferably integrated sensors. The MDTU's hardware may include static memory in addition to read writable memory.

The static memory and/or read writable memory preferably stores at least one hash function and at least one encryption algorithm for use in hashing and encrypting data for transmission.

Preferably, the resident software and/or hardware implement a clock function. The clock function preferably stores at least one time value in the memory. The software preferably is configured to read this memory to retrieve at least one time value stored in memory by the clock function. The software preferably comprises a clock calibration routine that reads a value contained in a time signal transmitted to the MDTU. The clock calibration routine preferably resets the MDTU's clock function to provide the same time value as other nodes of the network. The resident software may also configure the MDTU to receive a network value broadcast and/or IP multicast within the network to the MDTU, store that value in memory, and use that value instead of or in addition to a time value, as an input to a hash function.

An MDTU preferably comprises a transceiver. The transceiver may comprise an antenna, a mixer, and an ADC and a DAC. The transceiver may comprise software defined radio elements including one or more of mixers, filters, amplifiers, modulators/demodulators, implemented by software, and active electronics antenna configurations controlled by software.

Preferably, the MDTU comprises software for instructing integrated sensors to use specified transmission and reception frequencies or frequency bands, data rates, transmitted power, size of data package, data package structure, modulation scheme, information coding scheme, and receiver sensitivity, and integrated sensor configurable antenna configurations. That is, MDTU preferably comprise software for controlling integrated sensor communication parameters.

Preferably, the MDTU receives messages from an integrated sensor in the form of data transmit units.

An MDTU is designed to be capable of communicating with multiple sensors, either wirelessly or via wired connections. For example, using RS-232 or IEEE-485 communication specifications. In one embodiment, each MDTU communicates with 11 different sensors. Some or all of the sensors may be embedded in the MDTU as integrated elements in a common mechanical structure.

An MDTU transmits sensor data to one or more other nodes of the network. An MDTU may process sensor data and then transmit to another node the results of processing. The MDTU may change encoding of sensor data and transmit to another node the sensor data in the newly encoded format. An MDTU may receive data from different sensors encoded in different specifications and convert the data from the sensors to a common encoding specification. The MDTU may use the data from the sensors encoded in the common specification to form data transmit units containing that data for transmission to other nodes of the network.

For example, and MDTU may convert analog voltage representing temperature, to a digital value representing temperature in Kelvin, and then encode in some specification both the digital value and an indicator that the digital value represents temperature in Kelvin, as a binary sequence, and then form one or more data transmit units containing the binary sequence. The data transmit units may be packets confirming to TCP/IP.

Preferably, an MDTU has sufficient digital calculation capability so that it can be configured to provide significant EDGE computing capabilities.

An MDTU may also provide the functions of an MC System as described in U.S. Pat. No. 9,912,983. The MDTU may link to a centralized hub as described for an MC System in U.S. Pat. No. 9,912,983. The MDTU may link directly or indirectly to nodes or gateways of various networks, including the Internet, cellular networks, PSTNs, and various service provider networks, as described for an MC System in U.S. Pat. No. 9,912,983.

An MDTU may also provide the functions of a centralized HUB system (CHS) as described in U.S. Pat. No. 9,912,983, and may link to an MC system, as described for a CHS in U.S. Pat. No. 9,912,983. An MDTU may link to more than one node of the IoT network and/or Physical Layer Optimized Multimode Heterogeneous Cellular Network. An MC system, as described in U.S. Pat. No. 9,912,983, may be a node of the IoT network and/or the Physical Layer Optimized Multimode Heterogeneous Cellular Network.

4.3 Dynamic Link Selection, Signal Optimization, and Network Reconfiguration in Multi-Protocol Heterogeneous Cellular Communication The Physical Layer Optimized Multimode Heterogeneous Cellular Network supports dynamic configuration, including reassignment of wireless devices among MDTUs based on signal quality, link attenuation, and network load balancing. Wireless communication links are selected considering signal strength, interference, and frequency capabilities of MDTUs and wireless devices. The optimized physical layer enables efficient IoT operation over multimode cellular networks. IoT communication represents one exemplary application of the present invention, benefiting from enhanced reliability and efficiency, adaptive link control, and seamless mobility support. The network maintains mapping tables storing unique device IDs, geographic locations, frequency bands, and receiver sensitivities. Advanced electromagnetic wave propagation models and network topology data are used to optimize link selections, maximize signal-to-noise ratios, and minimize interference by adjusting transmission parameters such as frequency bands, time division, and antenna beamforming. Network software applies minimization algorithms (e.g., multivariable least squares) to optimize overall network link quality, constrained by device sensitivity and background noise levels. The system supports dynamic spatial and temporal reconfiguration to maintain robust, efficient wireless communications in diverse and evolving environments. The Internet of Things (IoT) is advanced through implementation over a Physical Layer Optimized Multimode Heterogeneous Cellular Network, as IoT environments demand ultra-reliable low-latency communication (URLLC) and massive machine-type communication (mMTC), where dense device deployments and highly variable radio conditions require continuous physical-layer optimization and radio access network (RAN)-level control to ensure quality of service (QOS), extended coverage, and energy-efficient transmission. Sensors of the novel IoT network and/or Physical Layer Optimized Multimode Heterogeneous Cellular Network may be associated with an integrated wireless transmitter, and wirelessly communicate pursuant to a specification for communicating data to an MDTU. Sensors of the novel PLOMHCN may, alternatively, be physically integrated into an MDTU, in which case the MDTU receives the signal from the sensory typically by a conductive connection. Sensors of the novel network may, also, be physically external to an MDTU, but have a data link to the MDTU via a conductive connection. In any case, sensors can provide their sensor output to an MDTU.

One or more of the MDTUs may implement software to correlate sensor data and determine a response to that data. Each MDTU may correlate data from the sensors it directly communicates with and sensors it does not directly communicate with to determine a response to that data. A cloud center may implement software to correlate sensor data and determine a response to that data. Which, if any, of MDTUs and cloud centers perform the correlation function and determines a response to that data may be determined dynamically as explained herein above.

Different PLOMHCN configurations may be preferable for different purposes or for use by different industries, such as fire control; audio service; and home heating and air conditioning, theft prevention, and child/day care. The Physical Layer Optimized Multimode Heterogeneous Cellular Network advances next-generation IoT deployment by delivering seamless connectivity, dynamic link adaptation, and enhanced reliability across heterogeneous environments. The Physical Layer Optimized Multimode Heterogeneous Cellular Network includes an edge computer supporting IoT operation, such as an MDTU, is programmed to respond to time correlation of values from plural sensors at one location, and/or from plural sensors at plural locations. A response may be generation of a communication signal including determining an address for the communication. A response may be generating a process control signal to control a process. For example, a process may be closing automatically controllable fire doors, send an elevator to a floor of a building, opening a valve along a pipeline, alerting a designated set of recipients according to their stored information. The response may be coordinated and executed using information stored in a mapping table of an MC System.

An example of a time correlation is a correlation of plural seismographs miles apart indicating direction and magnitude of propagation of a seismic disturbance (earthquake). A time correlation between different kinds of sensors may be an increase in temperature and detection of smoke, both at one location.

The novel IoT network and/or Physical Layer Optimized Multimode Heterogeneous Cellular Network (PLOMHCN) includes data associated with sensors, which includes sensor ID and sensor location. Preferably, all sensors forming part of the PLOMHCN are associated with both a unique sensor ID and location of that sensor. Preferably, each sensor is associated with memory that stores a sensor ID and sensor location. That memory may be integrated with the sensor or integrated with the MDTU. This information may be communicated to and stored in a mapping table of an MC System. The novel Physical Layer Optimized Multimode Heterogeneous Cellular Network includes data associated with MDTU's, which includes MDTU network ID and preferably MDTU location. Preferably, the wireless network comprises software designed to instruct sensors having memory storing their sensor ID and location to change their sensor ID and specify the sensor's location. For example, as the PLOMHCN grows due to addition of or replacement of MDTU's and sensors, ID conflicts may arise, and need to be resolved by reassigning IDs. As elements of the novel IOD network move from point to point, their change in location needs to be updated so that the memory of the novel IOD network can maintain an accurate spatial configuration of all sensors and MDTU's of the network.

Preferably, the novel IoT network and/or PLOMHCN comprises software designed to reconfigure the network to reassign wireless sensors from one MDTU to another. For example, the software may determine that addition of a new MDTU to the network results in that new MDTU having a better wireless connection to a particular wireless sensor. The software may in that case instruct the old MDTU with which the sensor previously communicated, to instruct the wireless sensor to conduct communications with the new MDTU. The PLOMHCN software may perform this determination of which MDTU a wireless sensor communicates with based only upon the distance between MDTUs and wireless sensors. However, the PLOMHCN may also base this determination upon either of both of (1) modeling and (2) testing of signal attenuation between MDTUs and wireless sensors (such as signal strength attenuation between signals sent from or to one particular MDTU and to or from a corresponding particular wireless sensor.) Preferably, the PLOMHCN memory stores data for all MDTUs that are wireless capable, and all wireless sensors, which data includes frequencies over which those wireless capable MDTUs and wireless sensors are capable of wireless transmission. Preferably, the PLOMHCN stores data defining shapes and locations of solid, liquid, and gaseous objects in the geographic regions where the PLOMHCN's wireless devices are located. Preferably, the PLOMHCN stores electromagnetic wave transmission modeling software to model the propagation and attenuation of wireless transmission between wireless sensors and wireless capable MDTUs of the network, to estimate link attenuation between pairs of wireless devices, including between a wireless sensor and MDTUs, and between pairs of MDTUs. Preferably, the PLOMHCN software is designed to select links for wireless sensors to MDTU's that take into account the number of other sensors linked to each MDTU and the signal attenuation from that wireless sensor to that MDTU. For example, if an MDTU has a limit of 10 sensors it can communicate with, then an eleventh sensor would not be linked to that MDTU, even if that the link to that MDTU provided the lowest attenuation of a wireless signal sent from that sensor to any MDTU. Preferably, the PLOMHCN software is designed to actually test received signal strength of various links between wireless MDTUs, and between a wireless sensor and various MDTU's using frequency bands over which the MDTUs and wireless sensors are capable to determine links that provide the greatest received signal strength or lowest attenuation, and also the greatest signal to noise.

Preferably, the PLOMHCN software is designed to test interference of a link by wireless transmission from MDTUs and wireless sensors that are not part of that link. Preferably, the PLOMHCN software is designed to perform this test on may possible links between two MDTUs and between various wireless sensors and MDTUs. Preferably, the PLOMHCN software is designed to determine many or all wireless network links and frequencies of transmission and modes of transmission of those links, to maximize average received signal strength in the set of links, reduce or minimize average noise in the set of links, or maximize average signal to noise in the set of links. Preferably, the PLOMHCN software performs this network analysis, and the implements a minimization algorithm, such as a multivariable least squares analysis, to arrive a configurations that increase average received signal strength, reduce average noise, or increase average signal to noise.

Preferably, the novel IoT network and/or PLOMHCN also stores the sensitivity of each receiver for wireless devices included in the network, and stores data defining the average background noise level as a function of frequency for each of the receiver locations of the network. Preferably, the minimization algorithm is constrained to select links to each device that result in a signal strength above the average background noise ratio for that device, and above the sensitivity threshold for that device.

to Minimize Network Induced Noise, the PLOMHCN May Attempt to Maintain Distinct transmit/receive frequency bands or use time division for relatively physically closely spaced links of the network. To minimize network induced noise and maximize signal to noise, the PLOMHCN may calculate from locations of MDTUs and sensors, a direction of a transmitter to the corresponding intended receiver, and instruct the transmitting MDTU or sensor to configure antennae parameters to shape its transmit beam with high intensity propagating in the calculated direction. To minimize network induced noise and maximize signal to noise, the PLOMHCN may attempt to maintain distinct transmit/receive frequency bands or use time division, for relatively physically closely spaced links of the network.

4.4 Latency-Optimized Data Splitting in Physical-Layer Optimized Communications PLOMHCN may execute software that results in a node of the network "splitting" a stream of data originating from one sensor and intended for an ultimate destination node. That node may be the MDTU to which the sensor is linked. That node may be a node receiving a stream of data from the MDTU to which the sensor is linked.

Splitting a stream of data means operating on a data stream directed to an ultimate destination node, by transmitting different portions of the stream along different paths (nodes), that all end at the ultimate destination node. In other words, different portions of the stream take different paths, along different nodes, to the ultimate destination node. The stream refers to digital data. The stream may comprise digital data representing various phenomena, such as, but clearly not limited to, audio signals, video signals, telemetry, control information, data specification information, identification information, and time information. In one example, the information for carrying out the transmission of the data stream is stored in the mapping table of an MC System.

Preferably the PLOMHCN stores data defining values for link latencies, link bandwidths, and rankings for data type by time sensitivity and bandwidth requirement. Preferably, at least some of the nodes of the novel IoT network and/or PLOMHCN employ latency and bandwidth ranking algorithms to determine data type, and match data types having relatively high time sensitivity (compared to other types of data) to relatively low latency paths to their ultimate destination node. Preferably, at least some of the nodes of the wireless network employ algorithms to determine data type, and match data types having relatively high bandwidth (compared to other types of data) to network links providing relatively high bandwidth.

Preferably, the data stream for one or more sensors contains data type identifiers identifying the underlying type of data in the stream. Preferably, the latency and bandwidth ranking algorithms include code to inspect the data stream and determine data type identifiers and associated data having that type.

Preferably, the latency and bandwidth ranking algorithms include code to determine frequency of variation of certain sensor data, and values of certain sensor data in the stream. And preferably, the bandwidth ranking algorithms include activation code based upon frequency of variation of certain sensor data, and values of certain sensor data in the stream, to activate splitting of the stream. For example, in case temperature value increases above a certain rate, or a smoke concentration value exceed a specified level, then latency and bandwidth ranking algorithms may trigger splitting of a data stream comprising video, smoke and temperature data by sending the smoke and temperature data over a path to the ultimate destination node for the stream that has low latency, and sending the video data over a path that has relatively high bandwidth, but relatively large latency. For example, the low latency path may be over a channel using conductive power grid wires, and the high bandwidth high latency path may be over a channel connecting through a satellite.

4.5 Adaptive Data Compensation in Multimode Cellular Communication Networks Based on Spatial and Temporal Correlation Analysis Preferably the PLOMHCN executes software for adjusting at least some of its sensors. Sensor need adjustment for various reasons. Some sensors are not preset to provide correct values. Some sensors have responses that drift over time. Preferably at least some of the sensors of the PLOMHCN are capable of having their values adjusted. Adjustment includes for example an offset bias, a scale factor, and a functional form change. For example a sensor expressing a voltage as a function of a resistance may have a drift in voltage in case the resistance value increases over time due for example to material fatigue. In this case, an adjustment would be a scale factor. A sensor whose electronics outputs an analog value representing wind velocity as a function of measuring a wind pressure may define a square wind pressure (wind velocity scales as the square wind generated pressure). A spring used to transduce the pressure may stiffen over time, and the elements of the electronics may have values that drift over time. Consequently, this sensor may require both scale, functional form, and bias adjustments. Adjustments may be to analog adjustment circuit elements reading the value from the transducer, or compensation to a digital representation of the output of the transducer. In case of adjustments to digital output, this may occur proximate the sensor or remote from the sensor at some node of the network.

Preferably the PLOMHCN executes software for adjusting at least some of its sensors based upon results of correlation with historical values for that sensor. Preferably the PLOMHCN executes software for adjusting at least some of its sensors based upon results of correlation to values of that sensor to values of other sensors. For example, two temperature sensors in close proximity can be assumed to measure the same average temperature. An average temperature for the first sensor may be used to adjust the average value of the second sensor to provide the same values as the first sensor. For another example, a type of sensor may have a known variation or drift in output, as a function of time based upon measurement of prior sensors of the same type. The PLOMHCN executes software for adjusting for this known time dependent based upon the age of the sensor and the known time dependence of drift.

Preferably the PLOMHCN executes software and a correlation algorithm for correlating values of like sensors in disparate location, by modeling, for example by interpolation using geographic positions, the most likely value for one sensor based upon a number of other nearby sensors. For example, a number of temperature sensors at ground level at disparate locations can be used to define a two dimensional temperature variation at ground level, as a function of surface coordinates, that is a model of a two dimensional function, in a plane. And the value of any sensor along the plane may be assumed by the PLOMHCN to be the value defined by the model for the corresponding point in the plane. The PLOMHCN may then execute software to control an adjust for that sensor to provide the value defined by the model for that sensor's location.

As noted, the PLOMHCN may, in fact, not adjust the electronics of an integrated sensor so that the output of that sensor provides a corrected analog or digital value. Instead, the PLOMHCN may store compensation values, or a compensation function to compensate for values generated by the sensor, and then apply the compensation to the output of the sensor, so that the resulting value is likely a more accurate representation of the physical value being measured than what the value the sensor provides. In this way, the PLOMHCN may compensate for drift in sensor outputs relative to the actual value of the physical parameter, without actually adjusting the sensor's transducer, analog electronics, or the digital values output by some integrated sensors.

4.6 Downlink Channel Dynamic Adjustment

The optimized physical layer empowers seamless IoT operation in multimode heterogeneous networks. Preferably, the novel IoT network-PLOMHCN-executes software routines to dynamically adjust sensor data sampling rates, data precision, and transmission frequency based on real-time network conditions and application requirements. That is, the downlink signal from an MDTU instructs the sensor to change at least one of that sensor's sampling rate, data precision, and frequency of transmission. The network software may instruct adjustment as a result of data received by the network, and as a result of network condition. For example, the network software may respond to a large number of sensors providing abnormal indications, such large audio signals, or unusual brightness, in one region by reducing the data precision and increasing the frequency of transmission of other sensors in the same region or near the same region. For another example, the PLOMHCN may generate network usage data showing volume of data transmission between nodes, ratio of total network CPU clock cycles per second used for processing utility software task compared to total network CPU clock cycles per second. That is, the network may measure its fraction of data communication capacity and calculational capacity in use. The PLOMHCN may run software to reallocate utility software tasks reallocate from nodes in a geographic region having relatively high CPU usage to nodes in a region having relatively low CPU usage. The PLOMHCN may run software to reallocate network paths from nodes and links operating at or near their bandwidth limit to nodes and links operating further below their bandwidth limits. Using the same indications of high CPU usage or high bandwidth usage in a geographic region the PLOMHCN may execute software the instructs sensors in that geographic region to reduce their load on that region of the network, by reducing sensor data sampling rate, data precision, and frequency of transmission. The PLOMHCN may execute software that also identifies sensors transmitting data across a region of the network identifies as overly loaded (in CPU usage of bandwidth) and instruct those sensors to reduce sensor data sampling rate, data precision, and frequency of transmission. In correspondence, the same software may instruct sensors to resume their default data sampling rate, data precision, and frequency of transmission when network conditions no longer indicate a need to reduce network load.

5. Dynamic Modulation and Encryption Control in Physical Layer Optimized Multimode Heterogeneous Cellular Network The wireless communication system in present invention includes a security architecture for dynamic multi-channel environments. Communication nodes perform real-time encryption, authentication, and integrity checks in connection with link quality evaluation and management. Security protocols are selected and adjusted according to transmission parameters such as modulation scheme, frequency band, and node mobility, ensuring confidentiality and resistance to malicious access across heterogeneous wireless links.

5.1 Sensor Hash

One novel security measure comprises an integrated sensor applying a hash function to a digital sequence, such as a binary sequence, which sequence is the output of a pre-function.

5.2 Sensor Hash Pre-Function

The sensor hash pre-function, also referred to as pre-function, is a function of at least one of digital values for the sensor's sensor ID, the sensor's sensor location, and the sensor's sensor time.

The pre-function may also be a function of additional digital values, such as the identification and/or address of the MDTU linked to the sensor, the identification and/or address of the ultimate address node for a message, and other IoT network node identifications and/or addresses that can form a set of links from the MDTU to the ultimate node, a digital value broadcast and/or IP multicast to a plurality of nodes of the network, and time of receipt of a network timing pulse.

Preferably, the pre-function is also a function of part or all of a sensor message in either unencrypted or encrypted form, as discussed below. Moreover, the sensor message may be a function of one or more sensor sample values for a physical property sensed by the sensor.

Because the sensor hash is a function of the output of the pre-function, the sensor hash is also a function of the inputs to the pre-function. Thus, the sensor hash is a function of (1) at least one of digital values for sensor ID, the location, and sensor time and optionally two or all three; (2) may be a function of the ID and network address for the MDTU linked to the sensor, the ID and/or network address an ultimate destination for a sensor message, and IDs and/or addresses of other nodes of the network; (3) may be a function of a digital value broadcast and/or IP multicast to a plurality of nodes of the network; (4) may be a function of a network timing pulse; and (5) preferably is a function of part or all of a sensor message in either unencrypted or encrypted form.

Preferably, the pre-functions are not hash functions, and are invertible functions, such as permutations of digital sequences, so that the digital sequence input to a pre-function can be retrieved by applying the inverse function of the pre-function to the output of the pre-function. However, the pre-functions may be non-invertible, and the pre-functions may be hash functions.

Preferably, the integrated sensor represents the digital values as binary data, that is as binary sequences. Preferably the pre-function concatenates, in a predetermined order, the binary sequences representing the digital values that are the inputs to the pre-function, and outputs the resulting concatenated sequence. Preferably, the hash function inputs the concatenated sequence output by the pre-function. The output of the hash function is the sensor's sensor hash.

The integrated sensor may employ different hash functions, different pre-functions, and different encryption algorithms and encryption keys, at different times, for use with different types of messages, and for different message recipients. The integrated sensor may execute software that controls which hash function, pre-function, encryption algorithm, and keys, to use, depending upon time, type of message, and message recipient. The integrated sensor may receive instructions from an MDTU specifying conditions for the integrated sensor to use particular hash functions, pre-functions, encryption algorithms, and encryption keys.

5.3 Sensor ID

The sensor's sensor ID may be either a non programmable hard coded value stored in the sensor during sensor fabrication or a value stored in readable and writeable memory of the sensor, and the sensor's sensor ID may be a combination of both the non programmable hard coded value and value stored in readable and writeable memory of the sensor.

5.4 Sensor Time

The sensor time is a value stored in the sensor. The sensor time may be a time that the sensor will transmit a message, a time when a sampling period begins or ends, a time when the transduced physical value is subject to ADC conversion, a time when digital electronic encoding of the digitally converted sampled value occurs, or a time when the sensor transmits the encoded value. This time value need not be relatively close in time to when the physical parameter being measured by the sensor was sensed by the sensor. However, a time when the sensor obtained a value for a physical parameter may be included in a message.

5.5 Sensor Location

Sensor location refers to coordinates in a defined map or frame of reference. Preferably, the sensor stores its coordinates in memory. Alternatively, or in addition, the sensor may store times of arrivals of signals transmitted from spatially diverse transmitters, such as satellite GPS transmitters along with identifications of the source transmitters, or may store differences of times of arrivals of pairs of such transmitters. The sensor location may be calculated from differences of times of arrival, for signals transmitted from at least three transmitters, the locations of the transmitters at the times the signals were transmitted, and the signal propagation velocity.

5.6 Sensor Message

A sensor message is a message that the sensor transmits. A sensor message may comprise data representing measurements by the sensor of at least one physical property, such as temperature, pressure, light intensity, light intensity in a particular wavelength band, sound intensity, etc. Alternatively or in addition, a sensor message may comprise information about the sensor, such as sensor status data, or for an integrated sensor software version data, usage statistics, and any other data stored by the integrated sensor that does not correspond to measurements of physical parameters obtained by the integrated sensor.

5.7 Integrated Sensor

Integrated sensors may provide measurements of more than one physical property, that is have more than one kind of transducer, and an integrated sensor message therefor may comprise data representing measurements of more than one physical property.

An integrated sensor preferably includes software or hardware for applying a hash function, and also for applying an encryption algorithm. The sensor's hardware may include hard coded routines in static memory for reading data including at least one of the values for sensor ID, sensor time, and sensor location, and applying the hash function to the read data.

The integrated sensor may comprise: a CPU, digital memory, a data bus, a receiver (or transceiver), digital memory, a sampling controller controlling sampling of the value of the physical value transduced by the sensor, and software and data resident in the memory. The software installed on the integrated sensor comprises an operating system controlling interaction of the CPU and other physical components, such that the CPU can read and write from the memory, and send control signals to the receiver (or transmitter) to specify receiver (and transmitter) settings, and to the sampling controller to specify settings (adjustments, sampling rate, sensitivity, precision) of signals corresponding to values of physical parameters measured by the sensor's transducer. The software is configured to read from the memory values including values for at least one of sensor ID, sensor location, and sensor time. The software is configured to apply at least one hash function to the read values. The software is preferably configured to apply at least one encryption algorithm to a portion of a message stored in the sensor's memory.

Preferably, the integrated sensor includes software or hardware implementing a clock function, the clock function preferably stores at least one time value in the memory, and preferably the software is configured to read this memory to retrieve at least one time value stored in memory by the clock function. Preferably, the software comprises a clock calibration routine that reads a value contained in a time signal transmitted by the MDTU. The clock calibration routine preferably resets the integrated sensor's clock function to provide the same as the time value of the time received from the MDTU. The integrated sensor may also be programmed to receive a network value transmitted from the MDTU, store that value in memory of the integrated sensor, and use that value instead of or in addition to a time value, when generating a sensor hash. The network value transmitted from the MDTU may be a value broadcast and/or IP multicast within the network.

The integrated sensor may comprise a transceiver for receiving data from an MDTU and transmitting data to an MDTU. The transceiver comprises an antenna, a mixer, and an ADC. Alternatively, the integrated sensor may be linked to the MDTU by a wired network connection, or by a system bus.

Preferably, the integrated sensor comprises software responsive to signals from an MDTU defining at least one of the integrated sensors's transmission and reception frequencies, or frequency bands, data rate, transmitted power, size of data package, data package structure, modulation scheme, information coding scheme, and receiver sensitivity. That is, integrated sensor can preferably be controlled by signals from an MDTU.

5.8 Sensor Message Authentication Using Sensor Hash 5.8.1 Conventional Authentication Nodes of the novel IoT network and/or Physical Layer Optimized Multimode Heterogeneous Cellular Network receive data transmit units containing both a payload and a sensor hash. The receiving node may apply a hash function to the payload to determine if the payload is authentic. If the sensor applied the same hash function as the receiving node, to the payload in the data transmit unit, then a match of the receiving node hash and the sensor hash indicates the payload is authentic.

5.8.2 Unconventional Authentication

The integrated sensor and nodes of the wireless communication network however may transmit data transmit units that have payloads that do not include all bits of a binary sequence used to generate the hash included in the data transmit unit. In these implementations, a node receiving the data transmit unit may still authenticate the a data transmit unit. The receiving node may do so by guessing the missing binary bits from the payload necessary to compute the sensor hash. The receiving node can guess the missing bits by knowing the specification for the missing data and possible values for the missing bits. The specification for the missing data includes bits for: at least one of digital value for sensor ID, sensor location, and sensor time. The specification for the missing data may includes bits for either of both of the other ones of digital values for sensor ID, sensor location, and sensor time. The specification for the missing data may also include: IDs and network address for network nodes; digital values broadcast and/or IP multicast to a plurality of nodes of the network; and time values associated with network timing pulses. A receiving unit that guesses the correct values for missing data and computes the hash of the missing data and payload, the receiving nodes hash will equal the sensor hash.

A receiving node can cycle through permutations of the values for missing data, compute hashes of those permutations in combination with the payload, and compare each of those hashes to the sensor hash. A match indicates both authentication of the payload, and identifies to the receiving node, the missing data.

The missing data and the payload are referred to as test data. Nodes of the novel wireless network that receive a data transmit unit containing a sensor hash may apply a hash function to test data to generate a receiving node hash. Preferably, the test data includes at least one of sensor ID, sensor location, and sensor time. The test data may include the receiving node's ID and/or address, other network node IDs and/or addresses, a digital value broadcast and/or IP multicast to a plurality of nodes of the network, and a network timing pulse. The network node may compare the receiving node hash to the sensor hash. If the hashes match, that indicates the data transmit unit is from the sensor having the sensor ID, sensor location, or sensor time contained in the test data.

Assuming authentication, the additional address information in the test data may be interpreted by the node as instructions. For one example, if the receiving node's ID or network address is not present in the test data, the receiving node may discard the data transmit unit. For another example, if the receiving nodes ID or network address is in a sequence of addresses in the data transmit unit, then the receiving node may transmit the data transmit unit to the node having the ID or address sequentially following the receiving node's ID or address in the data transmit unit. For example, if the receiving nodes ID or network address is the last ID and/or address in a sequence of IDs and/or addresses in the data transmit unit, the receiving node may decrypt encrypted message data and store message data received in the data transmit unit, in node memory.

5.9 Sensor Message Encryption 5.9.1 Entire Message Encryption

In one alternative, the integrated sensor executes an encryption algorithm by inputting the entire sensor message into the algorithm to generate an encrypted version of the entire message. Subsequently, the integrated sensor forms sufficient data transmit unit so that the entire message is transmitted to the MDTU.

Subsequent to entire message encryption, the integrated sensor selects some sequence of N bits from the binary representation of the entire encrypted message. The integrated sensor includes the selected bits to be the part of the input originating from the message, that is input to the pre-function to generate an output of the pre-function.

Preferably, N equals the number of bits of a message to be included in a data transmit unit. The integrated sensor also generates a corresponding data transmit unit including this sequence of N bits from the binary representation of the encrypted message. Preferably, the integrated sensor stores information identifying which sequence of bits from the encrypted message correspond to the particular output of the pre-function. The integrated sensor will then be able to retrieve the sequence of N bits from the binary representation of the encrypted message, in order to construct the data transmit unit, by retrieving the stored information. The integrated sensor preferably generates a sensor hash from the output of the pre-function.

If N is greater than the number of bits in the binary representation of the entire encrypted message, the integrated sensor can pad the additional bits of the data transmit unit.

If N is less than the number of bits in the binary representation of the entire encrypted message, then the integrated sensor may select another sequence of N bits from the binary representation of the encrypted message, and generate another output of the pre-function, another sensor hash, and another data transmit unit.

The integrated sensor may repeat these steps until sensor has processed all bits of the binary representation of the encrypted message (along with other data) into outputs of the pre-function, and the integrated sensor has included all of the bits into corresponding data transmit units.

5.9.2 Encrypting the Message, Portion by Portion

In one alternative, the integrated sensor executes an encryption algorithm by inputting a portion of the message into the encryption algorithm to generate an encrypted version of the message portion. Here, message portion means less than all of the message. Subsequently, the integrated sensor calculates outputs of the pre-function, calculates sensor hashes from these outputs, and forms data transmission units. Each data transmission unit includes an output of the pre-function and the sensor hash of that output, following the procedure just described in the "Entire message encryption" section. Preferably, in this alternative, the binary representation of the each encrypted message portion has the same number of bits as the message portion of each data transmit unit, and each data transmit unit includes exactly one encrypted message portion.

The integrated sensor repeats the process of executing the encryption algorithm on portions of the message, calculating outputs of the pre-function, calculating sensor hashes, and forming data transmission units, until all portions of the message have been encrypted and included in data transmission units.

5.9.3 Encrypting Only a Portion of the Message

In another alternative, the integrated sensor encrypts some portions of the message and does not encrypt other portion of the message. In this alternative, all bits corresponding to both the encrypted portion and the unencrypted portion of the message are included as inputs to the pre-function, associated sensor hashes are calculated for each output, each output is included in a data transmit unit.

The purpose of the integrated sensor generating data transmit units is to transmit the message data. The integrated sensor transits its data transmit units to the MDTU to which it is linked.

5.9.4 Network ID and Address Hiding

In some embodiments of the pre-function, the inputs to the pre-function that are not message data are decoupled from inputs that are message data, such that the output of the pre-function based upon specified non message data input is unchanged by variations in message data. For example, assume the non message data input to the pre-function is a sequence of binary values that are the concatenation of binary values for sensor ID, sensor location, and a network ID, and that sequence occupies N bits. In one embodiment of the pre-function, the first N bits of the output of the pre-function are identical to the first N bits of the input to the pre-function, independent of values for message data. In another embodiment of the pre-function, the first N bits of the output of the pre-function are a permutation of the order of values of first N bits of the input to the pre-function, again independent of values for message data. In these examples, a receiving node, knowing the pre-function and knowing the specification for the missing data missing from a payload, and knowing possible values for the missing data, may guess the missing data, apply the pre-function to the concatenation of the guess of the missing data and message data in the data transmit unit, and apply the hash function to the output of that pre-function to form a receiving node hash. The receiving node can determine if the receiving node hash matches the sensor hash. A match indicates the message is authentic and identifies the missing data associated with the payload.

Data transmit units normally contain address information in unencrypted form, typically as part of a header as specified by a protocol. The address information is used by nodes for routing data transmit units. The data transmit units and protocol associated with this kind of network ID and address hiding may also contain address information in unencrypted form. However, they may also exclude address information and instead rely upon the missing data specification and limited optional values for missing data, and the ability of network nodes to determine the missing data, and therefore address information, based upon authentication. In one embodiment, a node receiving a pulse that identifies the missing data to include the address or ID for that receiving node may act on the data transmit unit, pursuant to the protocol, such as to retransmit the pulse, decrypt the pulse, or take some other action defined by the protocol and the data in the data transmit unit. If the node receiving the pulse does not identify in the missing data an address or ID for that node, then that node may take no action in response to receiving the data transmit unit, or it may multi cast the data transmit unit so that other nodes can identify the missing data and determine if they should act on the pulse based upon the missing data. If the node receiving the data transmit unit does not identify in the missing data an address or ID for that node, but does identify an address or ID for another node, then that node may forward the data transmit unit to the other node.

Using a protocol in which the data transmit units do not include data transmit unit address information explicitly, and instead rely upon authentication based upon determinable missing data to determine data transmit address information, precludes network attacks that rely upon knowledge of data transmit unit address information.

Another alternative network protocol employs the embodiment of the pre-function, in which the first N bits of the output of the pre-function are a permutation of the order of values of first N bits of the non message data input to the pre-function, and these N values include address information. In this protocol, the node receiving the data transmit unit would apply the inverse function for the portion of the pre-function operating on the first N bits of input, to output the N bits of non message information. This message information as noted may contain address information.

5.9.5 Sensor Message Encryption

Another novel security measure comprises how the integrated sensor encrypts a message. Preferably, and as noted above, message encryption occurs before generating a sensor hash for a data transmit unit.

The integrated sensor implements an encryption algorithm of the type that takes at least two inputs, one input being an encryption key, and another input being a message. The encryption algorithm may take other inputs.

5.10 Encryption Key Generation

The encryption key may be the output of a key generating algorithm. The key generating algorithm preferably is a pseudo random number generator.

Preferably, an input to the key generating algorithm is sensor data that results from measurement of a physical quantity (for example, temperature) in order to introduce randomness into the resulting key value. Inputs to the key generating algorithm may comprise one or more of a sensor hash, sensor location, sensor time, ID and/or network addresses for: the sensor's MDTU, the ultimate destination node, and other nodes; a value broadcast and/or IP multicast in the network; and time of receipt of a value broadcast and/or IP multicast in the network Inputs to the key generating function may comprise a sensor hash and IDs and/or network addresses of a set of nodes defining a path from the MDTU to the ultimate destination address for a message.

The resulting encryption key generated by the integrated sensor may be shared secretly with an intended recipient using a public-key crypto-system by encrypting the resulting encryption key using the intended recipient's public key and the asymmetric encryption algorithm specified for the crypto-system and transmitting that resulting key to the intended recipient in one or more data transmit units. The intended recipient can authenticate the received data transmit units in the manner discussed above to confirm the data transmit units originate from the integrated sensor. Similarly, the intended recipient MDTU can generate a pseudo random key using the resulting encryption key generated by the integrated sensor, a seed, and a pseudo random number generator, and then share that resulting MDTU generated key secretly with the integrated sensor using the integrated sensor's public key and the asymmetric encryption algorithm specified for the crypto-system, and transmitting that resulting MDTU generated key to the intended integrated sensor in one or more data transmit units. The MDTU and integrated sensor may use either the resulting encryption key generated by the integrated sensor or the resulting MDTU generated key, and a symmetric encryption algorithm, to encrypt messages and send data transmit units containing those messages to one another.

Preferably, the integrated sensor stores the encryption algorithm, key generating algorithm, and resulting encryption key or keys, in memory. However, the algorithms may be hard coded in digital circuits. The integrated sensor may use the same or different encryption keys to encrypt more than one data transmit unit, or more than one message.

Symmetric encryption algorithms employ the same key for encryption and decryption. Asymmetric encryption employs an one key for encrypting key and another key for decrypting in a manner well known in the art, and asymmetric encryption may be used in public-private key schemes, in a manner well known in the art. An example of a symmetric encryption algorithm is AES-128. An example of an asymmetric encryption algorithm is RSA. Source code for implementing these and many other encryption algorithms are widely and freely available.

The sensor hash used for encryption may be different from the sensor hash used for authentication. For example, the hash function used for encryption may different from the hash function used for authentication. For example, hash function to provide a n digital bits may be implemented sequentially removing all odd digital bits, checking to determine of the result is less than 2n digits, and if so, truncating the result to the first n digital bits. And repeating the process for results larger than 2n digital bits until the number of bits is less than 2n. Another hash function may use the same algorithm, but chose a different value for n.

For another example, the hash function used to generate a hash for encryption may be the same function as the hash function used for generating a hash for authentication, but use a different time value, or a different location value, to generate a hash. For example, the hash function used for encryption may use a time value based upon time of data acquisition, an anticipated time of message transmission, time when the hash used for encryption is created, when the message is encrypted, or time of an IoT network timing pulse, and may use a location value of the integrated IoT sensor at any one of these times. And the hash function used for authentication may use a time value based upon time of data acquisition, an anticipated time of message transmission, time when the hash used for authentication is generated, or time valued provided by an IoT network timing pulse, and may use an location value of the integrated IoT sensor at any one of these times.

5.11 MDTU Transmissions and Node Re-Transmissions

The MDTU may transmit data transmit units to the other nodes in which each data transmit unit contains a sensor hash resulting from information from the corresponding sensor from which the message information in the data transmit unit originated.

For integrated sensors that are themselves physically integrated into an MDTU, everything discussed above about the function and structure of the integrated sensor also applies to the MDTU. For example, the MDTU may generate and transmit the data transmit units containing message data as discussed above for the integrated sensor, including performing the encrypting and hashing.

For sensors that merely provide, to an MDTU, transduced values or digital representations of transduced values, and do not perform the authentication and encryption noted above in discussing integrated sensors, the MDTU generates and transmits the data transmit units containing message data as discussed above for the integrated sensor. This includes the MDTU performing the encrypting and hashing and preparing the data transmit units.

The MDTU may also use the sensor hash in a data transmit unit received from an integrated sensor, as the input to a pseudo random number generator. The MDTU may use the output of the pseudo random number generator as an encryption key. The MDTU may further encrypt message data in a data transmit unit using the new encryption key. The MDTU may further encrypt message data of a data transmit unit using the new encryption key. The MDTU may use the output of the pseudo random number generator to negotiate a secret key with another node for asymmetric encryption with that other node and then further encrypt message data of a data transmit unit, using that new encryption key. The MDTU may input the further encrypted message data into a hash function, to generate an MDTU hash, and include that MDTU hash and the further encrypted message data in a data transmit unit, and transmit that data transmit unit.

A node receiving the data transmit unit from the MDTU may use the MDTU hash as input to a pseudo random number generator, use the output of the pseudo random number generator or the hash as an encryption key, or use the output of the pseudo random number generator or the hash as an input to negotiate a shared encryption key with another node using a public key architecture, and then further encrypt message data of the data transmit unit that node received from the MDTU, using that shared encryption key. The node receiving the data transmit unit from the MDTU may input the further encrypted message data into a hash function, to generate an node hash, and include that node hash and the further encrypted message data in a data transmit unit, and transmit that data transmit unit to the other node having the shared encryption key.

Any subsequent node receiving the data transmit unit from the prior node may use the prior node's hash as input to a pseudo random number generator, or use the output of the pseudo random number generator or the hash as an input to negotiate a shared encryption key with yet another node using a public key architecture, and then further encrypt message data of the data transmit unit that node received from the prior node, using that new shared encryption key. The subsequent node receiving the data transmit unit from the prior node may input the further encrypted message data into a hash function, to generate an subsequent node hash, and include that subsequent node hash and the further encrypted message data in a data transmit unit, and transmit that data transmit unit to the other node having the shared encryption key.

One benefit of the process of encryption and hash functions depending directly or indirectly upon the sensor hash for encryption and/or authentication is that the sensor hash may contain transduced data which provides the randomness required to defeat security attacks.

5.12 Example of an MDTU Hash Function and Use for Encryption

In one embodiment, a sequence of 128 bit values may represent each one of sensor ID, sensor specified location, and time value a message was received from the sensor at its linked MDTU. The MDTU forms a binary sequence of 128×3 bits by concatenating the 128 bit values representing sensor ID, location, and time. The MDTU applies a hash function to that 128×3 sequence, for example resulting in a 128 bit sequence.

The MDTU may use that hash as an input to an encryption algorithm, such as a key or as a secret for transmission by a public key architecture to another node to negotiate a session key with that other node. Or the MDTU may use the hash as a seed for a pseudo random number generator to generate one or more values. The MDTU may then for use the resulting one or more values in an encryption algorithm, such as one or more keys for an encryption algorithm or as the MDTU's secret for transmission by a public key architecture to another node to negotiate a session key with that other node.

The MDTU executes an encryption algorithm that uses the resulting encryption key and part or all of the data from one or more sensors, and then transmits that data to the other node of the network. For example, the MDTU may encrypt sensor data, but not destination data. For example the MDTU may or may not encrypt sensor ID. For example, the MDTU may or may not encrypt it time stamp (time associated with the MDTU's receipt of the sensor data). For example, the MDTU may keep the destination data (such as network address of a node), sensor ID, sensor specified location, and MDTU time stamp, or any combination thereof, unencrypted and transmit this data in unencrypted form.

5.13 Hash Physical Location, Time, and Sensor ID. Hash (Location, Time, Sensor ID)

Network nodes each have a physical location, a time of data acquisition (for example time stamp associated with receipt of data transmit unit or complete stream of data transmit units defining a file or message), and an ID.

Each node may compute a hash function using as inputs at least one of node location, time, and node ID. The hash function inputs may also include data from one or more data transmit units received at the node. Preferably, hash function inputs comprise both time of data acquisition and at least some of and optionally all of the content of a data transmit unit associated with that time of data acquisition by that node.

Each node may use the hash it computes for encrypting a data transmission. The node may use the hash as an encryption key, use the hash as a seed to generate a pseudo random number, or use the hash or pseudo random number as a secret for use with a public key infrastructure to negotiate a shared secret with another network node. It is well known generate a shares secret key using a public private key infrastructure negotiation.

Each node may encrypt the messages it receives prior to retransmission. Alternatively, each node may retransmit received messages without further encryption.

Each node has the capability to determine a node to which to send a received message. This capability preferably includes the node executing code to determine a network address to which to transmit data transmit units containing the message. As noted above, a node may transmit different data transmit units for the same message, that contain different kinds of data, such as video data and temperature data, along different links to the same ultimate network node. So the high bandwidth video data travels along one path and the low bandwidth temperature data travels along another path, for example to minimize latency for the temperature data, and to efficiently transmit the video data to its destination. This routing may depend upon network addresses stored in table in memory of the node, which table also includes a field for at least data type, and preferably also includes fields for source ID or address, destination ID or address. In some embodiments, this capability results from the node being able to decode unencrypted path information in a data transmit unit, such as address information contained in a packet header. If the path, or ultimate address for the communication is contained in the header information, as in TCP/IP, then each node can either read the next node to which to send the communication or determine from the ultimate address a next node to which to send the communication. In packet switched networks, the contents of each packet may be individually encrypted, or the contents of an entire message may be encrypted and then broken up into pieces and each piece included in a data transmit unit. Each node may not encrypt the ultimate destination address or ID in a data transmit unit, or may not encrypt a sequence of nodes IDs or addresses in each data transmit unit to which the communication should be transmitted in sequence to reach the ultimate destination. Alternatively, the communication protocols may also encrypt the defined or definable communication path, such as the sequence of nodes along which a communication should be forwarded, or the address of the ultimate node, that is the destination address for the communication. In these alternatives, the encryption of the address or path information is of a form that allows each node along the communication path to interpret the address information to either send the communication to the next defined node along the path or to determine a next node to which to send the communication. For example, each node may have a private key and a public key pair, encrypt its address based upon public key of the target node (to which the communication will be sent from that node) and include the encrypted form of its address in a data transmit unit. This would allow the recipient target node to decrypt the address of the sender nodes address based upon the recipient node's private key. Or the sending node may encrypt and include a sequence of node addresses and/or IDs with the recipient target node's public key. The recipient target node could then decrypt the sequence of node addresses and/or IDs with its private key. Each node may store a plurality of public keys each corresponding to the public key of a different node of the network, and determine the target recipient node by encrypting the message using that target recipient's public key. Only the target recipient node can would decrypt the message using its private key; all other recipient nodes would fail to decrypt using their private key. Decryption would, under this protocol, instruct the decrypting node to act on the contents of the data transmit unit or units containing the message. Failure to decrypt would, under this protocol, instruct the node failing to decrypt the message to take no action in response to receipt of the contents of the data transmit unit or units containing the message, other than perhaps to log the fact the node received and discarded the data transmit units.

5.14 Sequential Key Encryption, and Sequential Decryption to Retrieve Message Data In one embodiment, each node may modify at least one data transmit packet for each message, to include the symmetric encryption key that node will use to further encrypt that data transmit packet, in the portion of the data transmit packet subject to encryption. In this embodiment, when the data transmit packets arrive at their ultimate destination node, that ultimate destination node may apply the decryption algorithm in conjunction with the key ultimate destination node shares with the node that transmitted the message to it, to perform a first decryption. That decrypts the key used for the prior encryption by the prior transmitting node. The ultimate destination node may apply the decryption algorithm with the newly decrypted key, to decrypt the key used for the yet prior encryption by the yet prior transmitting node. The ultimate destination node may continue to sequentially apply the decryption algorithm with the newly decrypted encryption keys until it has reversed the encryption applied by the original integrated sensor of MDTU, to thereby decrypt the original message.

In embodiments, session keys generated by the nodes are transmitted to the ultimate network address for a sensor message along a different communication path than the corresponding data. For example, when the ultimate address is contained in the transmitted data, then each node along the path may encrypt its symmetric encryption session key and optionally its network address or ID and optionally the network address or ID of the node to which the node is transmitting the message, using a public key of the ultimate address and a public private asymmetric encryption algorithm. The node may then transmit that encrypted message containing key and optionally ID data, to the ultimate address. The node may direct encrypted message containing key and optionally ID data to some node other than the node to which it sends the sensor message; that is along a different path in the network than the underlying message data.

In a simulcast or ad hock network, the ultimate address is not predefined. In this situation, each node may be programed (configured) to send is key data to a central key server. The nodes may be programmed to use the central key server's public key and the corresponding public private asymmetric encryption algorithm to encrypt the session key and optionally the nodes network address or ID and optionally the network address or ID of the node to which the node is transmitting the message. Ultimate recipients of the encrypted data transmit units defining the message are preferably programmed pursuant to network protocol to query the central key server for decryption keys necessary to decrypt the message.

5.15 Distributed Ledger, Message Authentication, Chain of Custody

Preferably, the wireless network implements sensor data authentication using a distributed ledger and sequential permutations of the sensor hash. Preferably, the Physical Layer Optimized Multimode Heterogeneous Cellular Network comprises a plurality of nodes that each stores in their memory a distributed ledger showing sequence of transactions, each transaction indicating transmission of a sensor message from one node to the next.

Preferably, each successive node of the network receiving data transmit units, implements a permuting function to permute the values of the bits of the data transmit unit in the location in the data transmit unit corresponding to the location of the sensor hash. The function is a function of the bit values at these locations, the ID of the sending node, and the ID of the receiving node. The output of the permuting function is included in the next data transmit unit, preferably in the same location the sensor hash was previously stored. Alternatively, the output of the permuting function may be stores at some other location in the data transmit unit, as defined by an applicable protocol.

Each time a node transmits a plurality of data transmit units defining a message, or each time the node transmits a single data transmit unit, it also transmit a ledger entry data transmit unit. The ledger entry data transmit unit contains the ID of the previous transmitting node ID, the ID of the current transmitting node, the current transmitting node's time, and the output of the permuting function. Each successive transmission of a message or data transmit unit results in sending of a ledger entry data transmit unit. The ledger entry data transmit units are broadcast or IP multicast to ledger nodes programmed to store and validate copies of the distributed ledger.

Each ledger should contain two records for a node ID closely linked in time, with the node ID in one record in the record field indicating that node is receiving the message and another entry of the node ID in the record field indicating that node is sending the message. Each ledger nodes executes code to associate these pairs of records for the same message in sequence, and thereby builds a sequence of record entries linking transmissions of the same message or message data units containing the same message data between nodes. The value of the permuting function in each transaction record is a function of the value of the permuting function in the prior transaction record and the values of the node IDs in the current record. Each ledger node can therefor calculate what the value for the permuting function should be in the current ledger, by computing that value from the values in pairs of records linked by node ID. Each ledger node can also check the time in pairs of records to determine if the time of receipt by a node is later than the time of transmission to that node of the same message or data transmit unit. A ledger node may publish its results to the other ledger nodes of that ledger node's time sequence check and permuting function check on two ledger entries for a node ID. The ledger nodes may implement consensus software to determine whether to accept the ledger entry. If all or a specified number of ledger nodes confirm the output of the permuting function matches the newer ledger entry and the time sequence of the two entries is correct, the ledger nodes may accept the new ledger entry. Otherwise, the ledger nodes reject the new ledger entry and do not finally include that ledger entry in the ledger. In this case, the ledger nodes may implement notification to the network of repudiation of the message or data transmit unit.

Alternatively, in an embodiment, the nodes of the network are programmed to transmit a ledger entry data transmit unit and wait for the ledger nodes to transmit back a verification that the corresponding message is legitimate, before transmitting the data transmit unit or units containing the corresponding message data to the next node.

While a single ledger node may be sufficient, the use of multiple distributed ledger nodes offers security benefits such as redundancy and resilience against corruption or compromise of any single node or ledger copy. In the context of an IoT network implemented over a Physical Layer Optimized Multimode Heterogeneous Cellular Network (PLOMHCN), a key security feature of the distributed ledger architecture is that the permuting function operates on an original sensor hash, which itself may be derived from transduced data. Since transduced data inherently contains randomness, the resulting hash inputs are unpredictable, thereby enhancing security. IoT is thus a compelling and exemplary application of the present invention.

5.16 Distributed Ledger, Two Factor or Multi Factor Authentication

Alternatively, in an embodiment, the nodes of the network are programmed to wait until receiving both a message or data transmit unit, and a verification from one or more ledger nodes that the corresponding message is legitimate, before transmitting the data transmit unit or units containing the corresponding message data to the next node. This process is analogous to the receiving node requiring two factor or multi factor authentication.

5.17 Data Transmission Optimization Using Link Entropy and Signal Metrics in Radio Networks One embodiment of present invention discloses radio-layer intelligent security switching in multi-mode heterogeneous cellular communication networks. The method continuously monitors real-time physical-layer transmission parameters-including signal strength, interference level, transmission delay, packet loss rate, and modulation scheme. Using these metrics, the system calculates a link evaluation entropy value to quantify link quality and stability. Based on this entropy value and the transmission information entropy of the link's data stream, the system dynamically selects and activates the most suitable security mechanism from a predefined set, tailored to the specific radio access environment. The switching mechanism operates at or near the radio access layer (RAN), enabling seamless, secure link adaptation without disrupting ongoing sessions. The system supports dynamic handover, radio link reassignment, and security context switching (e.g. real-time), enabling persistent, low-latency, and reliable communication under changing wireless conditions. In failure conditions (e.g., link degradation or disconnection), the system reprioritizes all available radio links and associated security systems based on updated entropy metrics, selects a new optimal combination, and re-establishes secure communications. This ensures robust and secure wireless connectivity in industrial IoT, mission-critical, and multi-hop mobile environments by coordinating physical-layer link quality with real-time security system decisions. The present invention provides a method for intelligent switching security system operation, so as to obtain a link evaluation entropy value through the attribute information of the transmission link, and when the transmission link needs to switch the security system, the best security system is selected from multiple preset security systems according to the link evaluation entropy value and the security system strategy for switching and secure communication.

6. Dynamic Frequency and Topology Allocation for Spectrum-Efficient Predictive Model in Cellular Networks 6.1 Data Fields In another aspect, the novel wireless network is programmed and/or configured to provide a Virtual Reality (VR) based upon sensor data collected from a plurality of sensors. Preferably, the virtual reality is implemented in software. Preferably, the virtual reality predicts a time progression of based upon sensor data collected from various sensors.

The VR comprises data structures defining a space having at least two and preferably three dimensions. Preferably, the space is a virtual representation of real physical space, and the dimensions are representations of two or three physical dimensions. The representations may be intrinsic representations (such as a representing point on a curved surface with two coordinate values), or extrinsic representations (such as a representing a curved surface embedded in three dimensional space with three coordinate values). Locations in the virtual space may be represented by a coordinate system defining axes that span the space. Each coordinate point (that is one point in the virtual space) may be associated with plural values. These values may be representations of quantities that are scalar, vector, second order tensor, and higher order tensor. A quantity having values at plural coordinates in a space is called a field.

Examples of scalar quantities that may form fields include temperature, light intensity, sound intensity, smoke density, wind magnitude, humidity, magnetic field strength. Examples of vector quantities that may form fields include gradients of fields of any scalar quantity, magnetic field strength and direction, and wind speed and direction, Newtonian gravitational field magnitude and direction. Examples of rank 2 tensor quantities that may form fields include the Cauchy stress tensor, electromagnetic tensor, viscous stress tensor, metric tensor, Einstein tensor, and the Stress-energy tensor.

Each one of the values stored in association with a coordinate point of a virtual reality may be a function of values of scalar, vector, and higher order tensors. These values may be values stored in association with that coordinate point or may be a function of values stored in association with the same and/or another coordinate point.

For example, assume a set of three MDTUs reside at three points along a line in real space, or along an arc defining a locus of points approximately defining the surface of the earth. Assume that each MDTU normally provides sensor data for wind speed. Assume at some time the middle MDTU's wind speed sensor fails. The IoT network and/or Physical Layer Optimized Multimode Heterogeneous Cellular Network may be programmed and configured to respond to the failure by using values from nearby MDTUs to approximate a value for the middle MDTU and store that approximation in association with the location of the middle MDTU. For example, Physical Layer Optimized Multimode Heterogeneous Cellular Networks may be programmed to calculate the average value of the other two wind speed sensors, and store in memory that average in association with a location associated with the middle MDTU. This provides an approximate value for the MDTU. The PLOMHCN instead may approximate and store values for a failed sensor in other ways.

The PLOMHCN instead may be programmed and configured to respond to the failure by retrieving the last value recorded by the failed sensor, difference between that value and the average value at a time proximate when the middle sensor failed, of the other two wind speed sensors, determining the difference between the last recorded value and that average value, and then at subsequent times to when the middle sensor failed, add that difference to subsequent average of the other two sensors to result in an estimate, and storing that estimate in memory in association with a location associated with the middle MDTU.

Instead of using a mere average, the PLOMHCN may weight the inputs of the average based upon their relative distances to the middle MDTU. That is, multiply each value by the ratio of its MDTU's distance to the middle MDTU and then divide the result by the sum of the distances of both outer MDTUs to the middle MDTU. Instead of using only two MDTUs near the middle MDTU, the novel wireless network may average weighted values from all MDTU's within a certain distance from the middle MDTU. (For example, multiplying each value by the distance of its MDTU to the middle MDTU and dividing the result by the sum of the distances of all MDTUs including in the weighted average from the middle MDTU.)

6.2 Discrete Data Time Derivatives

Time derivatives calculated from sampled digital data normally refer to calculations based upon values at discrete time intervals instead of continuous function derivatives. It is to be understood that the determination of first and second time derivatives require values from at least one and two prior times, respective.

6.3 Composite Values

The IoT over the Physical Layer Optimized Multimode Heterogeneous Cellular Network may be programmed and configured to store a value in association with a virtual location that is a function of more than one value for more than one physical property for that location. For example, the PLOMHCN instead may be programmed and configured to compute a composite value that is a function of values for smoke density, wind magnitude, and temperature from one MDTU at one point in time, and store the composite value in association with a location for that MDTU.

6.4 Time Derivatives

For example, the IoT over Physical Layer Optimized Multimode Heterogeneous Cellular Network instead may be programmed and configured to compute a composite value that is a function of values for one or more of smoke density, wind magnitude, and temperature, and first and second time derivative of smoke density, wind magnitude, and temperature, from that one MDTU at one point in time, and store the composite value in association with a location for that MDTU.

6.5 Spatial Derivatives

The IoT network over Physical Layer Optimized Multimode Heterogeneous Cellular Network may be programmed and configured to store one or more spatial derivative values in association with a virtual location. Each spatial derivative value may be a function of values for a physical property from more than one location, or may be a function of composite values for physical properties from more than one location, where the locations are of MDTUs or sensors. The PLOMHCN may compute each spatial derivative value by fitting the values and locations with which they are associated to a function, and determining the value of the function at the virtual location.

6.6 Immersive Display System with User-Tracking Via Multi-Mode Heterogeneous Wireless Network Novel IoT network including PLOMHCN may include VR display technology, for displaying scenes and optionally providing audio and other outputs from the virtual reality to a user. For example by providing output to a conventional flat screen computer video monitor and audio transducer, or to an immersive headset display. PLOMHCN may be programmed to output to an immersive headset display a video image tracking the location and orientation of the user. For example, receiving location and orientation data from the headset identifying the changes in physical location and orientation of the person wearing the headset, and by performing coordinate transformation operations on the coordinate points storing the VR data, and then calculating a perspective view for certain values related to one or more physical properties and display those values within the headset. Preferably, the data defining the virtual map or image representation is updated by a node of the PLOMHCN within 100 milliseconds of when the node receives the data, that is, in real time.

6.7 Predict Progression in Time of Virtual Reality (VR).

Preferably, the IoT over Physical Layer Optimized Multimode Heterogeneous Cellular Network is programmed to predict field values at a future time based upon current and past values stored in the virtual reality, using field evolution algorithms.

For example, the field evolution algorithms, may input the current value, and first and second time derivatives for a physical property, or a composite of physical properties, for a location in the virtual reality, to determine time progression at that location for that physical property of composite of physical properties.

For example, field evolution algorithms, may model the spatial distribution of values for a physical quantity or composite quantity from various points in the VR at one time, and then determine from time derivatives of various points in the virtual reality, one or more velocities for the spatial distribution, and model the variation in time along the direction of that velocity, as propagation of the spatial distribution along the direction defined by that velocity, as a spatial displacement of the spatial distribution of values for a physical quantity or composite quantity along that direction. The field evolution algorithms may apply this same spatial distribution algorithm to different directions thereby defining different propagation velocities along different directions, and at different locations.

The wireless network may be programmed to determine averages and least squares values for predicted field values from outputs of more one time evolution and/or spatial evolution calculation.

6.8 Responses to and Effect on Time Evolution

The IoT and/or PLOMHCN may be configured to run simulations of the effect of responses to sensor data on the predicted progression in time of VR scenarios, to predict how responses change time evolution. And to determine responses that maximize a particular effect on the time evolution of physical values.

For example, a response to a forest fire might be to drop a load of fire retardant in a particular area at a particular time. The Physical Layer Optimized Multimode Heterogeneous Cellular Network may model that response as effecting a drop in temperature, a drop in smoke measurement, a reduction in velocity of spatial displacement of the spatial distribution of values for temperature, of the like. The PLOMHCN may be configured to run simulations by varying the time of the drop of fire retardant, and location of drop of the retardant, to model effect on progression of the fire. The PLOMHCN may be configured to determine the location and time that minimizes the velocity of the fire in one direction (for example towards a building), and output that information to either a person or an automated control of the vehicle that will drop the fire retardant. The simulation may be in advance of a real fire and the results of the minimization may be stored in memory of the PLOMHCN.

In general, the Physical Layer Optimized Multimode Heterogeneous Cellular Network may use a virtual reality model of sensor data to compute most effective activity to achieve a desired change in physical values, in response to sensor data. For example, where and how to allocate resources in response to remote sensor data. For example, where to send fire fighting equipment to most effectively contain and stop a forest fire. How to change traffic lights controlling traffic advance of severe weather, such as a local thunderstorms approaching an area from a certain direction, to minimize traffic congestion.

The PLOMHCN may also store in the VR location and type of materials. For example, location of gasoline service stations, location of reactive chemical storage locations, quantity of chemical in storage, houses, commercial buildings, and zoning information therefore, such as residential, commercial, industrial, gas line locations, power line locations, water line locations, and communication line locations. For each type of location, the Physical Layer Optimized Multimode Heterogeneous Cellular Network may store associated data, such as a flammability value indicating degree of flammability, an explosive value indicating likelihood of causing an explosion in response to heat, magnitude of explosion (dependent upon quantity of material) occupancy value indicating the anticipated number of people at the location, and other values for the location, local traffic conditions. The PLOMHCN may employ algorithms to determine from time progression predictions and this additional data, when explosions as a result of a fire may be anticipated, and what responses if any might be effective to avoid explosion. For example, the PLOMHCN may predict the amount of time to an explosion, and send an instruction to a fire response device (or person), based upon location, time, and results of VR time progression and response calculations, instructing on the most effective course of action. For example, take no action; travel to location of fire an extinguish fire; or travel to location of fire an order evacuation.

Given a suitably complete data set for a virtual reality, large numbers of possible scenarios based upon different starting conditions (such as weather, traffic, time of day, location and quantify of relevant materials, timing of street lights), and possible responses to the scenarios may be tested, to determine best responses. The PLOMHCN may store the scenario inputs and best responses, for future use. The PLOMHCN may run software algorithm that checks for a match of test parameter values or ranges to stored abnormal scenarios. Upon detecting a match, the PLOMHCN may retrieve is stored response, and transmit information consistent with that response, given the location, time, and conditions relevant to the detected abnormal situation. The PLOMHCN may also generate and output results of virtual reality (VR) scenarios and corresponding system responses at any time, particularly within an IoT network environment. The VR aspects may also be used to test potential home applications. For example, the VR aspects may implement a database of the home environment and provide examples of how the home environment and other conditions would update given changes to sensor data. This could allow more effective control of home heating and air conditioning, more effective decision making regarding the implementation of updated lighting, appliances, solar panels, or the like with respect to monthly energy costs, etc.

An MC System may be configured to include the VR aspects. This MC System preferably includes, along with the sensor information and mapping table, information regarding the home environment.

7. Ip Multicast and Broadband

Preferably, the novel IoT network and/or PLOMHCN uses IP multicast and/or broadcast technology in wireless and wired communication network to communicate punctually with sensors. Preferably, the PLOMHCN controls some sensors in response to their sensing an abnormal situation. Preferably, the PLOMHCN is configured to concentrate communication power, bandwidth and frequency of communications to one or more MDTUs and sensors related to the sensors sensing an abnormal situation, such as MDTUs and sensors an a geographic or logical region experiencing the abnormal situation.

7.1 Geographic Region Abnormality

Preferably, the PLOMHCN is programmed to utilize IP multicast and/or broadcast technology to communicate punctually with a plurality of geographically diverse sensors. Preferably, one or more nodes of the PLOMHCN determine that sensor data indicate an abnormal condition. The sensor data may from one sensor, from a plurality of sensors at the same location, or from a plurality of sensors at different locations. The one or more nodes are programmed generate a response to the sensor data. The response may include instructions for transmitting MDTU instructions, and/or sensor instructions, to a plurality of sensors associated with one or a plurality of MDTUs. The sensors to which the responsive instructions are sent may include only sensors distinct from those that generated the sensor data, may include a subset of the sensors that generated the sensor data, may include exactly the same set of sensors that generated the sensor data, and preferably include at least one of the sensors that generated the sensor data, and at least one sensor that did not generate the sensor data. Preferably, the sensors to which responsive instructions are sent include at least one of the sensors that generated the sensor data, and a plurality of sensors that did not generate the sensor data.

Preferably, each node that generates responsive instructions for a plurality of MDTUs and/or sensors employs IP multicast to specifically target the plurality of MDTUs and/or sensors to minimize the amount of data transmission over network links.

Moreover, when one or more nodes of the PLOMHCN determine that sensor data indicate an abnormal condition for which the PLOMHCN is programed to generate responsive instructions, the PLOMHCN executes code to determine a suitable node for receiving additional sensor data from sensors whose data defines the abnormality and executing software to provide responsive instructions. The resulting suitable node will be the incident control node. The suitable node determination algorithm may take as input, geographic locations of at least one of, preferably at least two of, and more preferably all of, the sensors providing data indicating the abnormality, geographic locations of nodes of the IoT network and/or Physical Layer Optimized Multimode Heterogeneous Cellular Network, node resources including CPU capacity, memory, IoT link structure (which nodes are linked or linkable with which other nodes and bandwidth and/or latencies for each link), and the links required for each sensor providing the sensor data indicating the abnormality to communicate with a particular node.

The suitable node determination algorithm may estimate minimum node resources and bandwidth resources including CPU capacity and memory, required to receive subsequent data from sensors providing the sensor data indicating an abnormality and generate and transmit the responsive instructions.

The suitable node determination algorithm may perform a function that limits possible suitable nodes for generating responsive instructions, to those nodes having sufficient resources to respond, based upon the number of sensors and type of sensor data of sensors indicating abnormality, to determine a set of potential responsive nodes.

The suitable node determination algorithm may calculate the number of total links required for a each node of the set of potential responsive nodes to receive sensor data from sensors providing data indicating abnormality.

The suitable node determination algorithm may calculate the sum of geographic distance between each node of the set of potential responsive nodes and sensors or MDTUs having sensors providing data indicating abnormality.

The suitable node determination algorithm may calculate the sum of link latencies of paths from sensors providing the data indicating abnormality to each node of the set of potential responsive nodes.

The suitable node determination algorithm may calculate, instead of the sums, more general functions of the number of links, distances, and latencies. The suitable node determination algorithm may use the sums or outputs of the more general functions, as inputs to a node selection algorithm that provides values for each node of the set of potential responsive nodes. Alternatively, the suitable node determination algorithm also inputs (1) the output of the selection algorithm and (2) the estimate of node resources to provide values for each node of the set of potential responsive nodes. Preferably, the suitable node determination algorithm selects a node having the largest or the smallest output value, as the suitable node.

An IoT network implemented via the Physical Layer Optimized Multimode Heterogeneous Cellular Network (PLOMHCN) is programmed to instruct a suitable node to generate responsive instructions upon detection of abnormal sensor data. Preferably, the novel IoT network and/or PLOMHCN is programmed to await a signal from the suitable node, indicating that the suitable node is taking over generating responsive instructions. For example, the suitable node may have to install incident response software necessary to generate responsive instructions, and that may require a finite amount of time during which the one or more nodes, by default, respond to sensor data indicating abnormality. If so, preferably the one or more nodes transmit to the suitable node, their instructions and any sensor data not also transmitted to the suitable node during the time the abnormality was identified and the time when suitable node indicates it is taking over generating responsive instructions.

The suitable node becomes the incident control node when it takes over generating responsive instructions.

The incident control node may perform several functions. One function incident control node may perform is determining from which sensors to receive sensor data. One function incident control node may perform is determining to which sensors to send instructions. One function the incident control node may perform is determining what instruction to send to sensors. One function the incident control node may perform is determining which other nodes to send instructions. One function the incident control node may perform is determining sampling parameters for a sensor, including sampling rate, ADC resolution, frequency of sensor data transmission from the sensor. One function the incident control node may perform is determining frequency of data transmissions from the MDTU associated with the sensor. One function the incident control node may perform is determining network path that the MDTU should use from the MDTU to the incident control node.

One function incident control node may perform, or that the incident control node may instruct another node to perform, or that may be performed by another node without an instruction to do so from the incident control node, is incident modeling. This modeling preferably uses sensor data as discussed above to predict which of the IoT sensors at future times will be associated with the incident. For example, which sensors the model predicts will provide abnormal values at future times as a result of modeling of the time progression of the abnormality. An abnormality may be for example, an atmospheric disturbance, such as a weather storm, earthquake, fire, network outage, environmental temperature extreme. An abnormality may be for example limited to sensor data in a single building or relatively localized area of a cluster of buildings, for example sensor data indicating abnormal atmospheric content, such as substantial carbon monoxide, carbon dioxide, natural gas, or water vapor, or other gas concentration.

An output of incident modeling may be a set of sensors or a geographic region for which the incident control node is programmed to generate instructions for those sensors or sensors in those regions, or for particular types of those sensors to transmit sensor data to the incident control node. For example, the output may be only a subset of sensors measuring atmospheric content. For example, the output may be only a subset of sensors measuring temperature. For example, the output may be only sensors providing audio and video data. An output of incident modeling may specify a time period for each sensor, for multiple sensors based upon sensor type and location, or for all sensors of set of sensors. Each output time period correlated to on or more sensors may form part of an instruction sent by the incident control node to instruct that sensor to provide to the incident control node, sensor data, during that time period. In other words, the incident control node may use the output of incident modeling to specify which sensors send data to the incident control node, during what time periods the provide data to the incident control node, and the specifics of the data frequency, precision, and transmission modes from the sensors to the incident control node.

The incident control node may determine nodes that link it to sensors that have, or are anticipated by modeling, to provide abnormal sensor data. The incident control node may execute programming instructing nodes forming those links to prioritize retransmission of data either transmitted from specified sensors or specified geographic regions, or data directed to the incident control node, at a higher priority than data from the sensors generating that data would normally be transmitted or re-transmitted. The incident control node may execute programming instructing the sensors or MDTU's to prioritize transmission or retransmission of data directed to the incident control node at a higher priority than data from the sensors generating that data would normally be transmitted or retransmitted. For example, in one protocol, QOS is defined by a sequence of bit, for example 16 distinct values (4 bits), and one particular sensor data is normally transmitted in frames or packets having a priority of 2. The incident control node may instruct the MDTU initially forming frames and packets for data from that sensor to specify priority 16 in the frames or packets.

For example, in one protocol, the incident control node specifies an incident severity level, for example as one of 16 distinct values (4 bits), and transmit that sequence pursuant to a fame or packet protocol reserving specified frame or packet bit locations for incident severity level, and specifies a unicast group corresponding to a group nodes forming links to MDTUs related to the abnormality, and/or MDTUs related to the abnormality. The incident control node includes both the incident severity level and unicast group in a unique packet transmitted to one or more than one other node of the wireless network, and preferably to only one other node of the Physical Layer Optimized Multimode Heterogeneous Cellular Network.

7.2 Logical Region Abnormality

The foregoing related generally to geographic regions experiencing an abnormality. However, digital abnormalities may be defined by a logical region, such as a segment of a network, nodes programmed with particular software, whether operating system or utility software, or integrated sensors containing certain programming. Situations where particular code has been corrupted, replaced with malicious code, or malicious code has been installed, may relate to a logical region. Where logical regions correspond to a particular geographic region, the foregoing descriptions of the IoT network or Physical Layer Optimized Multimode Heterogeneous Cellular Network response apply.

Where logical regions do not correspond to a particular geographic region, the PLOMHCN may be programmed to respond by implementing an incident control node selection algorithm that determines a node that does not have an identified corrupted code, replaced code, or installed malicious code, and then assigning that node as an incident control node. Preferably, the PLOMHCN also determines a sequence of fallback nodes to be the incident control node, in case the existing incident control node is subsequently determined to have identified corrupted code, replaced code, or installed malicious code. That is, the identification of problematic code may evolve with time and the network software may continue to determine problematic code, and need to delegate the current incident control node to not be the incident control node in case the network software determines that node to be infected with problematic code.

The suitable node determination algorithm for a logical region may perform a function that limits possible suitable nodes for generating responsive instructions, to those nodes having sufficient resources to respond, based upon the number of sensors and type of sensor data of sensors indicating abnormality, to determine a set of potential responsive nodes.

The suitable node determination algorithm may calculate the number of total links required for a each node of the set of potential responsive nodes to receive sensor data from sensors providing data indicating abnormality.

The suitable node determination algorithm for a logical region may calculate the sum of geographic distance between each node of the set of potential responsive nodes indicating abnormality.

The suitable node determination algorithm for a logical region may calculate the sum of link latencies of paths from nodes providing the data indicating abnormality to each node of the set of potential responsive nodes.

The suitable node determination algorithm may compute a value for each potential responsive node, which depends upon one, more than one, or total number of links; and/or one, more than one, or all latencies; and/or estimate of potential responsive node resources, and select an incident control node based upon the output of that function.

The incident control node for a logical region abnormality may control links and priority of data communications to nodes determined to be subject to the abnormality; may control data paths through the IoT network or Physical Layer Optimized Multimode Heterogeneous Cellular Network to avoid nodes determined to be subject to the abnormality; and may receive communications from nodes determined to be subject to the abnormality and provide responsive instructions to those nodes; and may determine when nodes previously determined to be subject to the abnormality are no longer subject to the abnormality; and provide changes in network routing instructions and links and priority of data communications with those nodes once they the incident control node determines that the other node no longer subject to the abnormality.

The incident control node for a logical region abnormality may control links and priority of data communications to reroute sensor data generate by sensors and transmitted within the network to avoid nodes subject to the logical abnormality and/or the logical region subject to the abnormality.

The incident control node may control links and priority of data communications by IP multicasting or broadcasting node link specifications specifying node links, node link specifications identifying network addresses or IDs of network nodes precluded from carrying network data (infected nodes), instructing data transmitted from infected nodes be deprioritized, and instructing data transmitted from non-infected nodes have priority increased.

In one embodiment, the incident control node stores a list of network addresses or IDs of nodes determined to be infected, and broadcasts that list to a plurality of other storage nodes, and the network runs software on each node specifying which one or more of a plurality of storage nodes to query to determine nodes of the network that have been determined to either be infected or be not infected. Each network node then implements instructions to prioritize data transmission to and from the infected and non infected nodes accordingly, and to update their local copy of infected or non-infected nodes either periodically, when instructed to do so, or in response to predetermined criteria. One such criteria might be a IP multicast of broadcast network transmission indicating the logical abnormality had been eliminated from the network. One such criterial might be a rate of increase or decrease of infected nodes for an incident. Each node might determine such a rate by comparing the number of infected nodes, or number of non infected nodes, it stores locally, as a function of time.

7.3 Combination Geographic and Logical Region Abnormality

The novel IoT system implementing PLOMHCN may determine a combined Geographic and Logical Region Abnormality, for example, when certain sensors and MDTUs are detrimentally affected by a disturbance related to some geographic event, such as a solar flare, forest fire, or the like which may affect both the values of sensors providing abnormal values and the logical functioning of nodes providing unstable responses due to physical damage or unintended variations in data or code stored in node memory. The PLOMHCN may respond to such a determination by combining function for determining incident response nodes and responsive instructions and algorithms use for each of the geographic region abnormalities and logical region abnormalities.

8. BRIEF DESCRIPTION OF THE FIGURES

The following figures illustrate various aspects of the novel Physical Layer Optimized Multimode Heterogeneous Cellular Network (PLOMHCN) implemented in IoT environments, also referred as the "(novel) IoT network", including its architecture, components, and practical implementations. The figures are exemplary, only, to the extent required to comply with rule requiring drawings to illustrate embodiments of claimed elements, and are not intended to limit the novel disclosed concepts.

Figure 6:
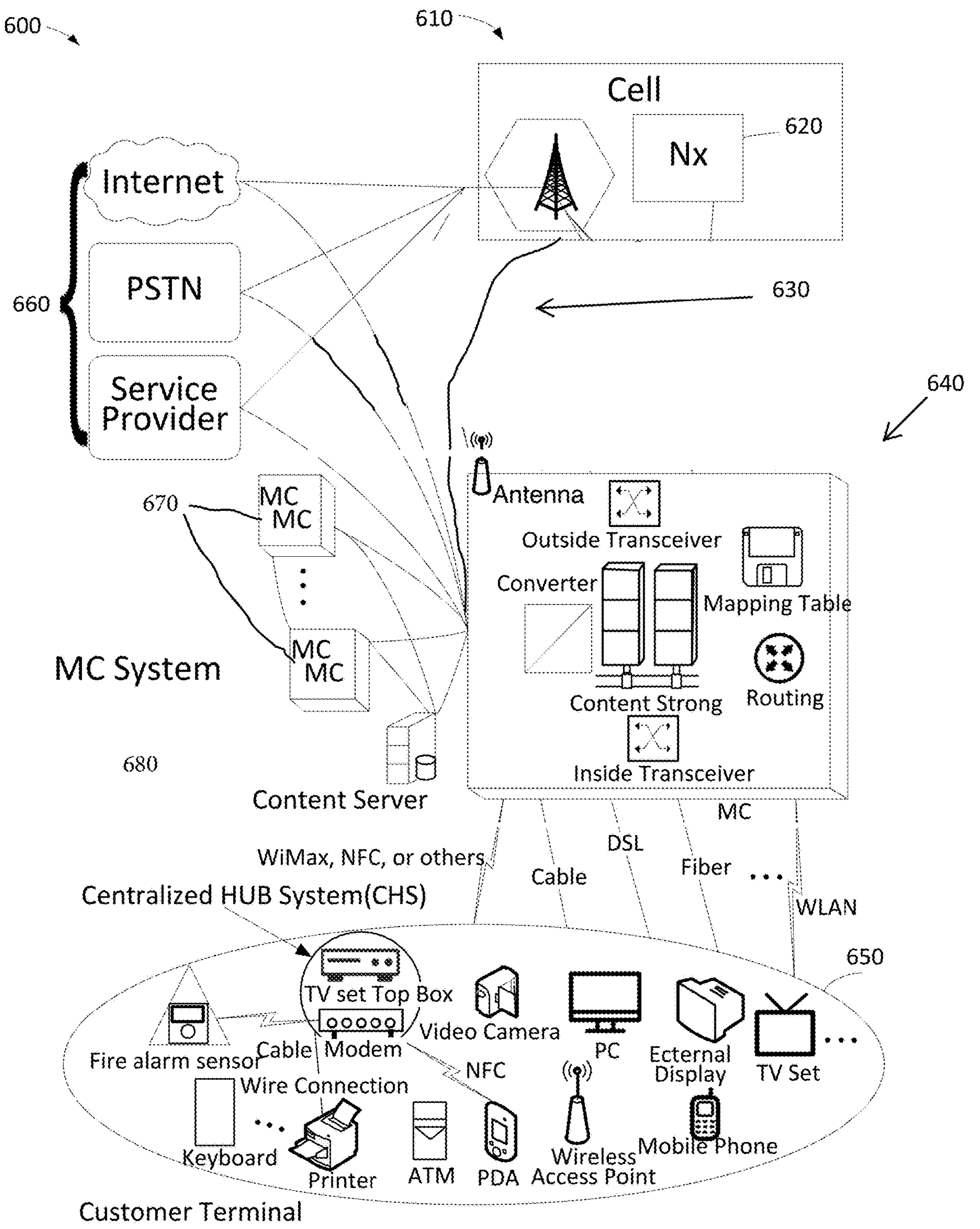

FIG. 6 shows another schematic illustrating a novel configurable IoT Network and/or Physical Layer Optimized Multimode Heterogeneous Cellular Network 600, including an MC System and a CHS, as generally described in U.S. Pat. No. 9,912,983, which is incorporated herein by reference.

Figure 7:
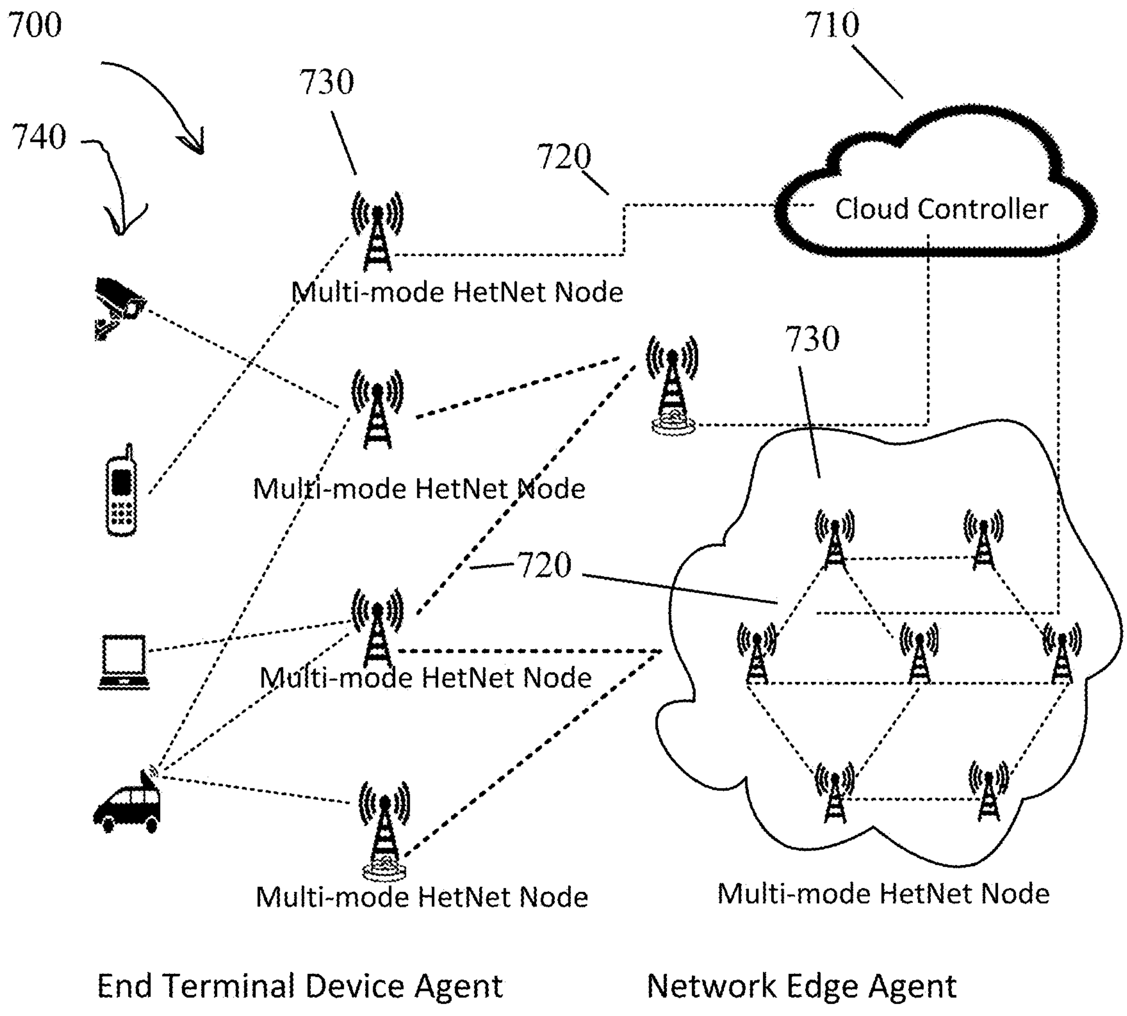

FIG. 7 is a schematic showing an IoT network and/or Physical Layer Optimized Multimode Heterogeneous Cellular Network 700 comprising a cloud controller 710 for controlling an IoT network and/or Physical Layer Optimized Multimode Heterogeneous Cellular Network.

Figure 8:
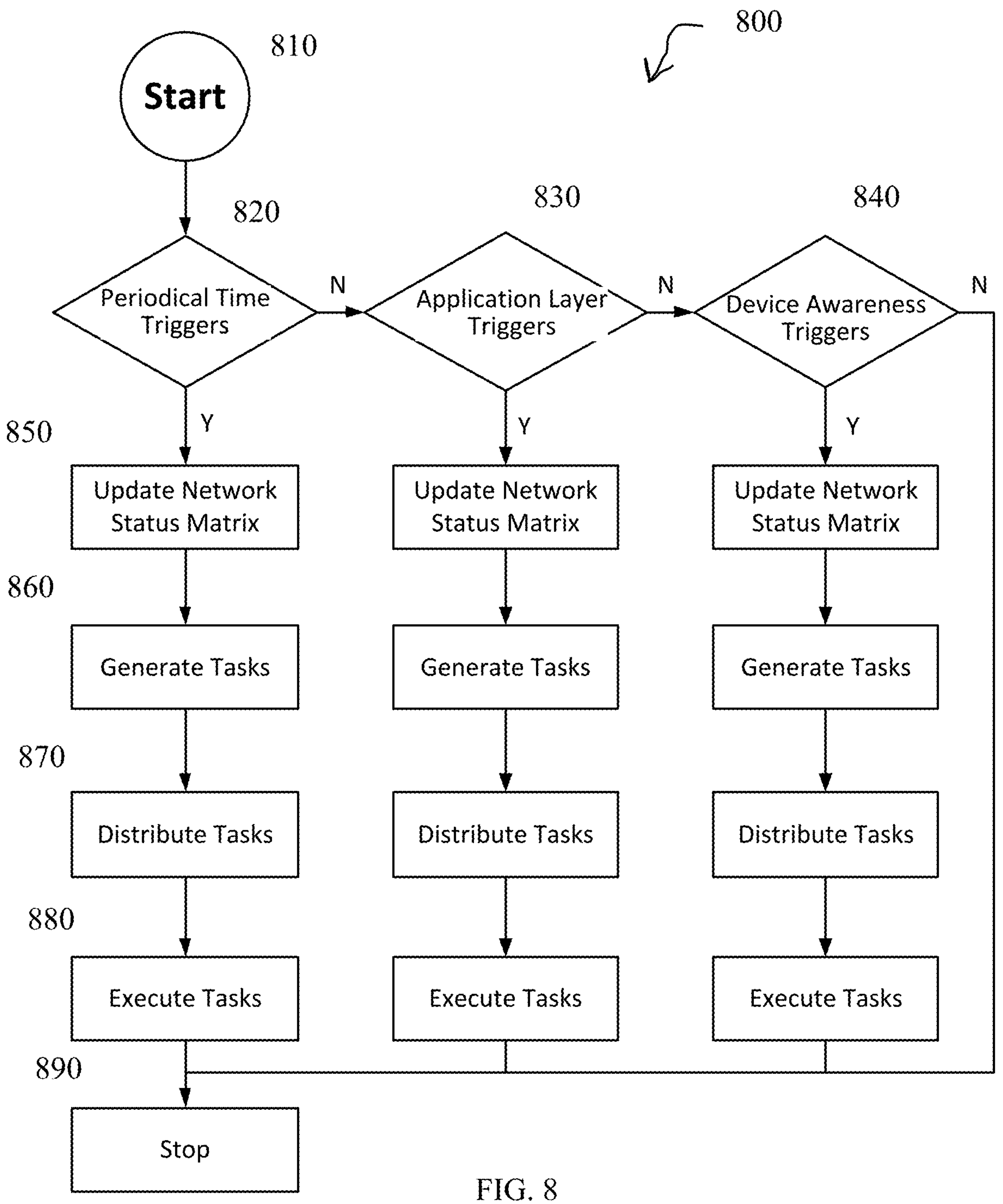

FIG. 8 is a high-level flow chart showing flow of functions performed by cloud controller 710 of IoT network and/or PLOMHCN 700.

Figure 1:
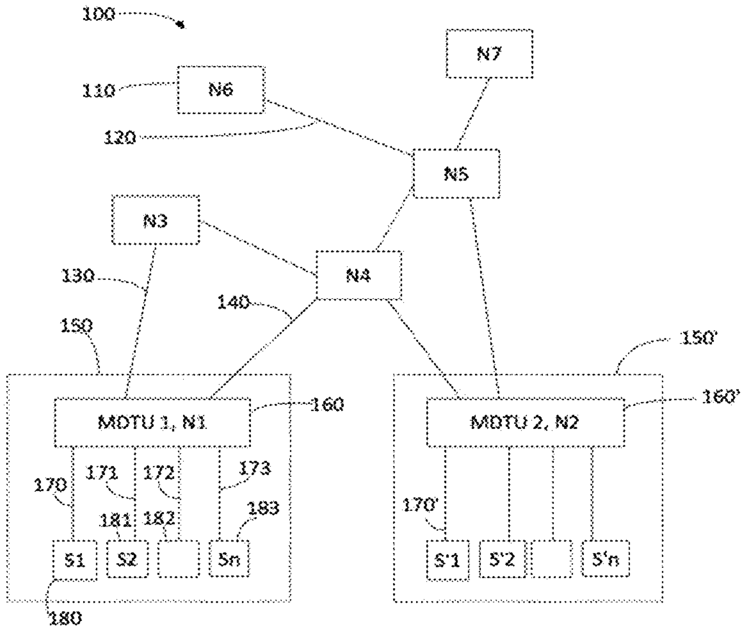
FIG. 1 shows a schematic of a novel IoT network and/or PLOMHCN 100.
Figure 9:
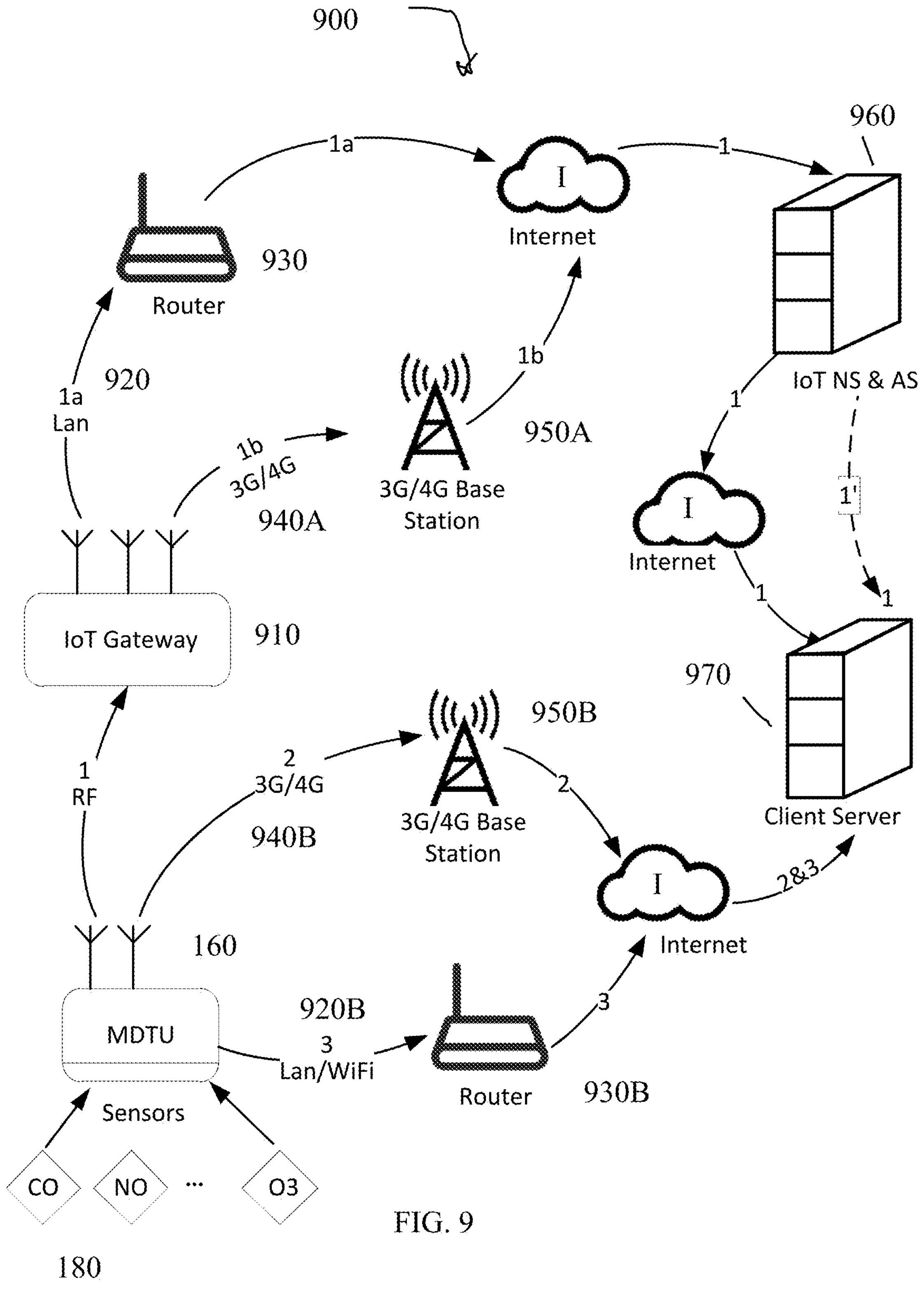

FIG. 9 is network schematic 900 showing communication links between sensors, an MDTU of FIG. 1, and network interfaces.

Figure 10:
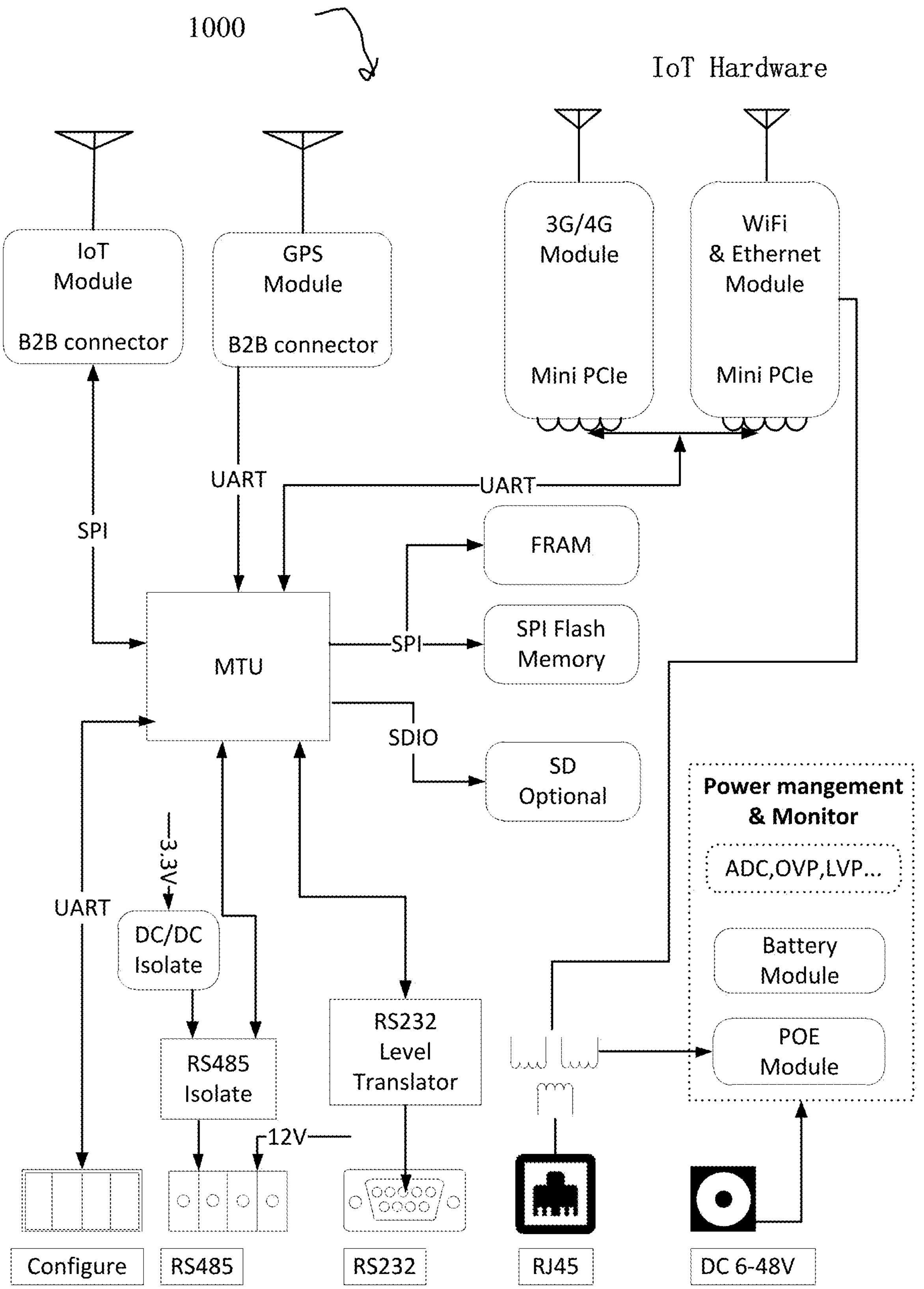

FIG. 10 is a schematic 1000 of components of one embodiment of an MDTU of FIG. 1.

Figure 11:
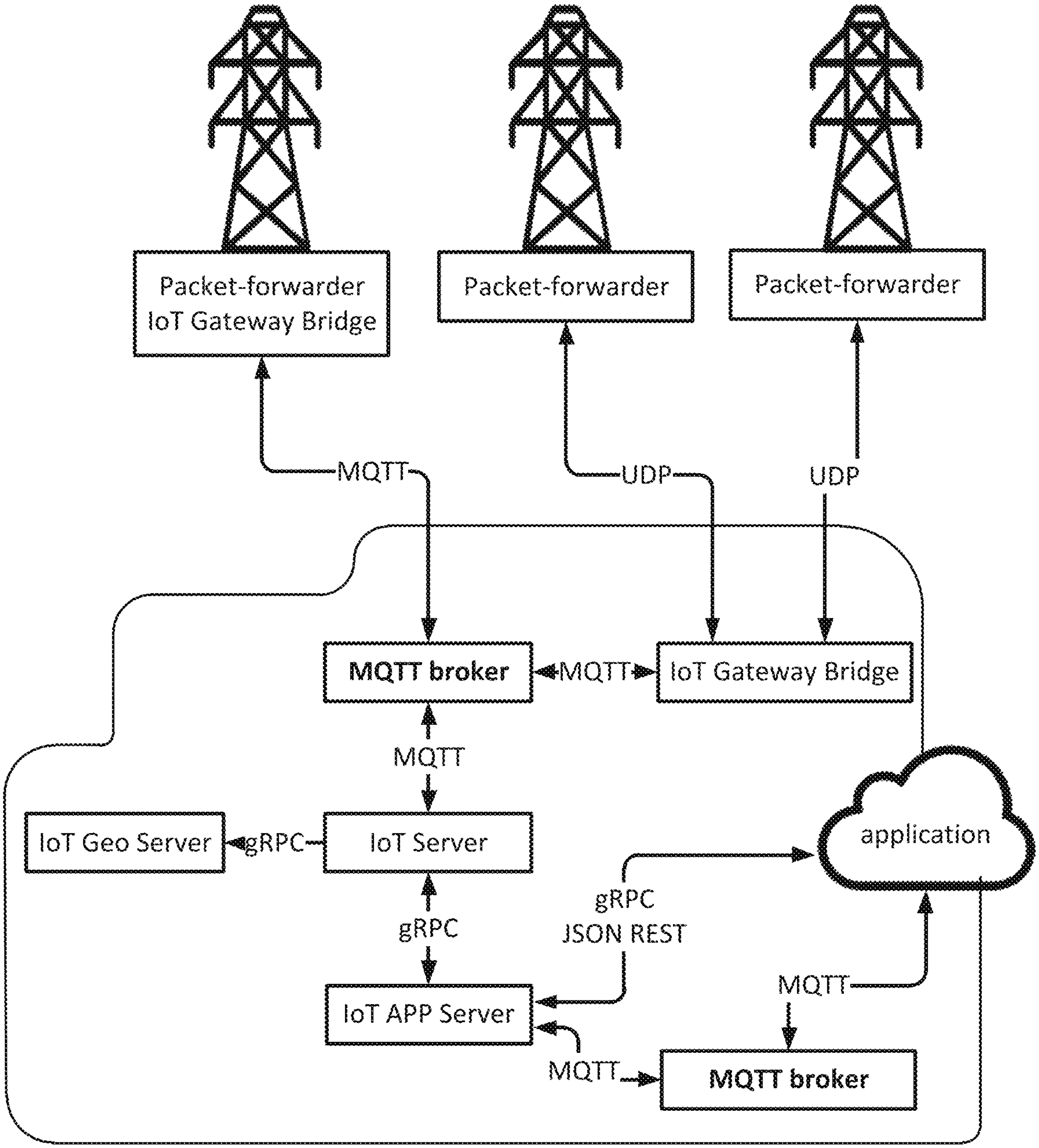

FIG. 11 is a schematic 1100 of an agent (either a Network Edge agent or a Device Agent) communicating with an IoT network and/or Physical Layer Optimized Multimode Heterogeneous Cellular Network.

FIGS. 12-21 illustrate various aspects of Physical Layer Optimized Multimode Heterogeneous Cellular Network (PLOMHCN) with applications in industrial IoT, also referred as "Internet of Things", "IoT system", or "IoT network", including its architecture, components, and practical implementations.

Figure 2:
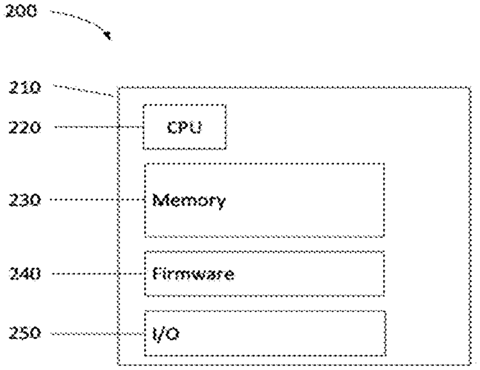
FIG. 2 shows a schematic of N6, node 110, of the novel IoT network and/or PLOMHCN.
Figures 1, 22:
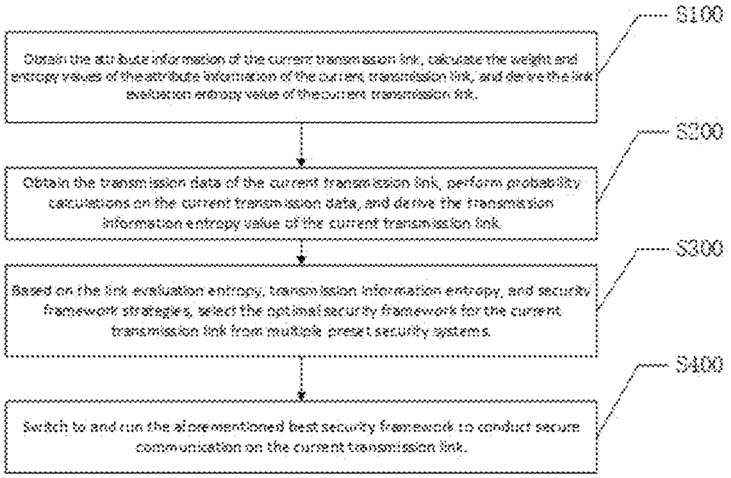
Figures 2, 22:
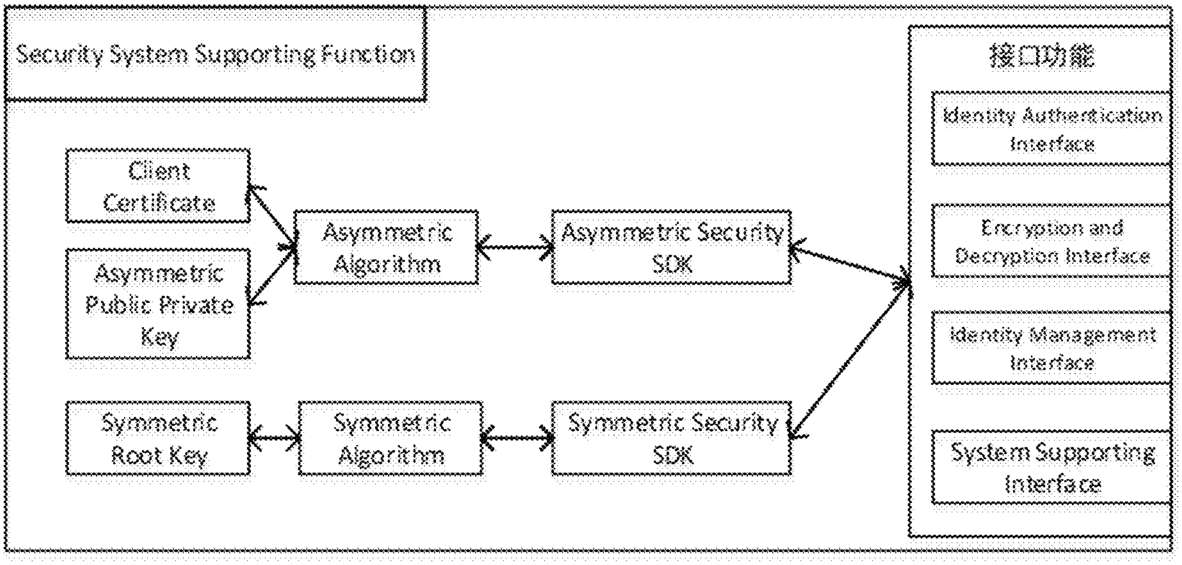
Figure 23:
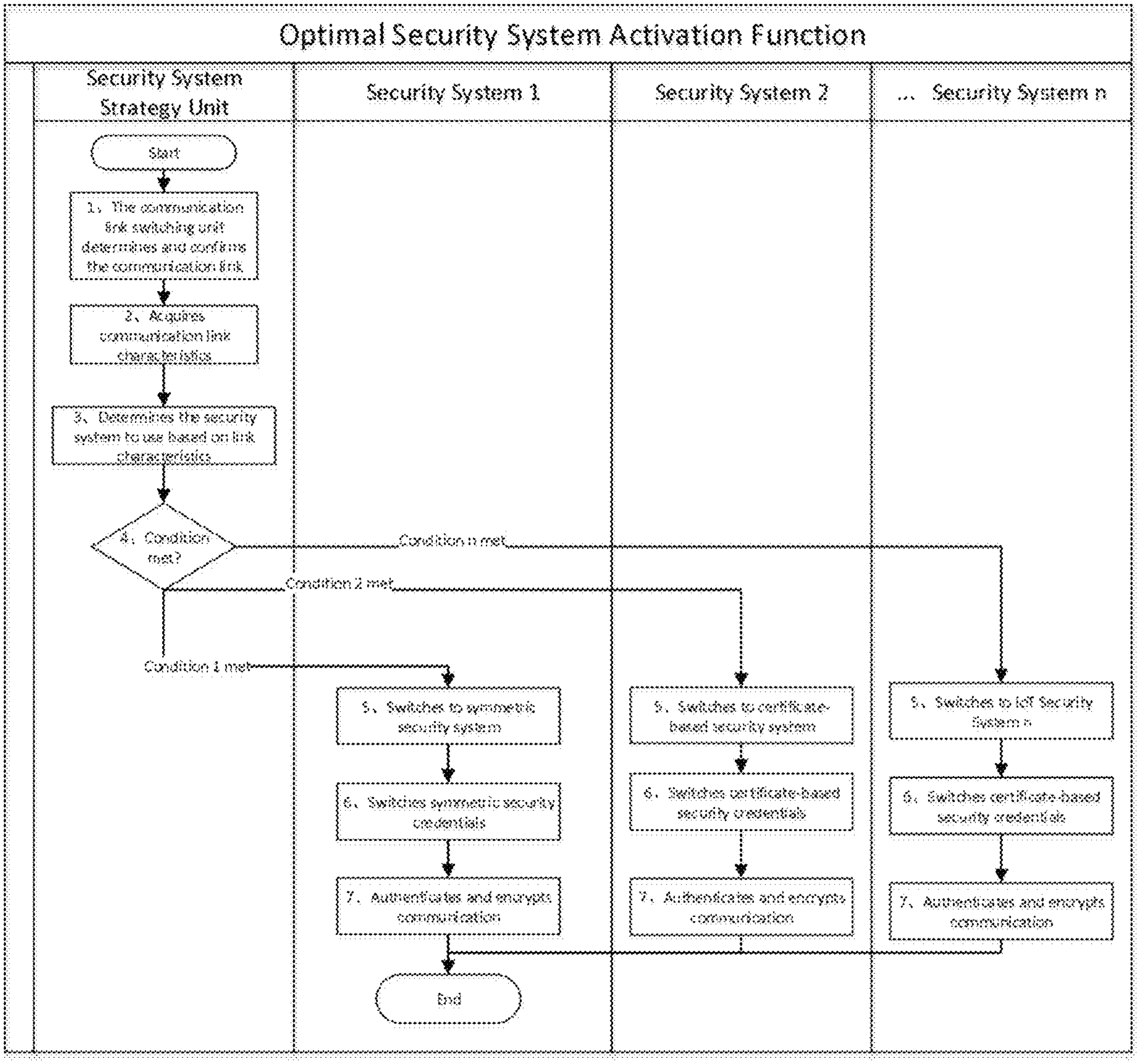
Figure 24:
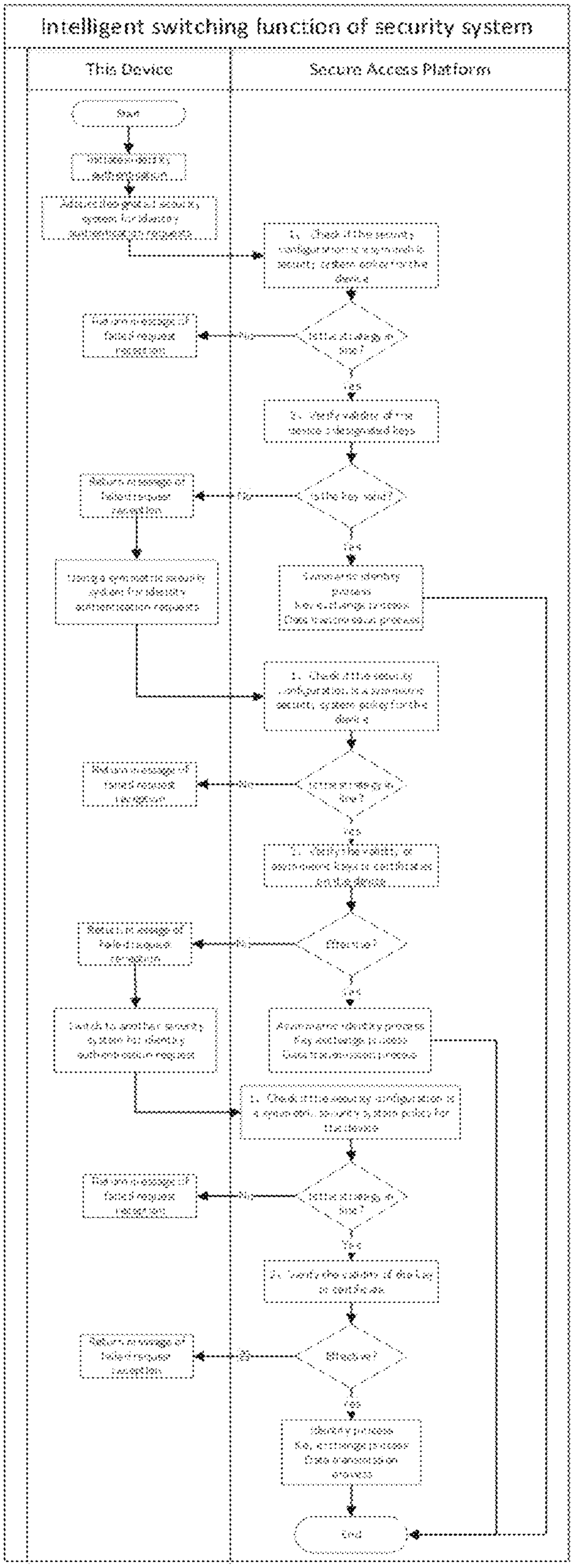
Figure 25:
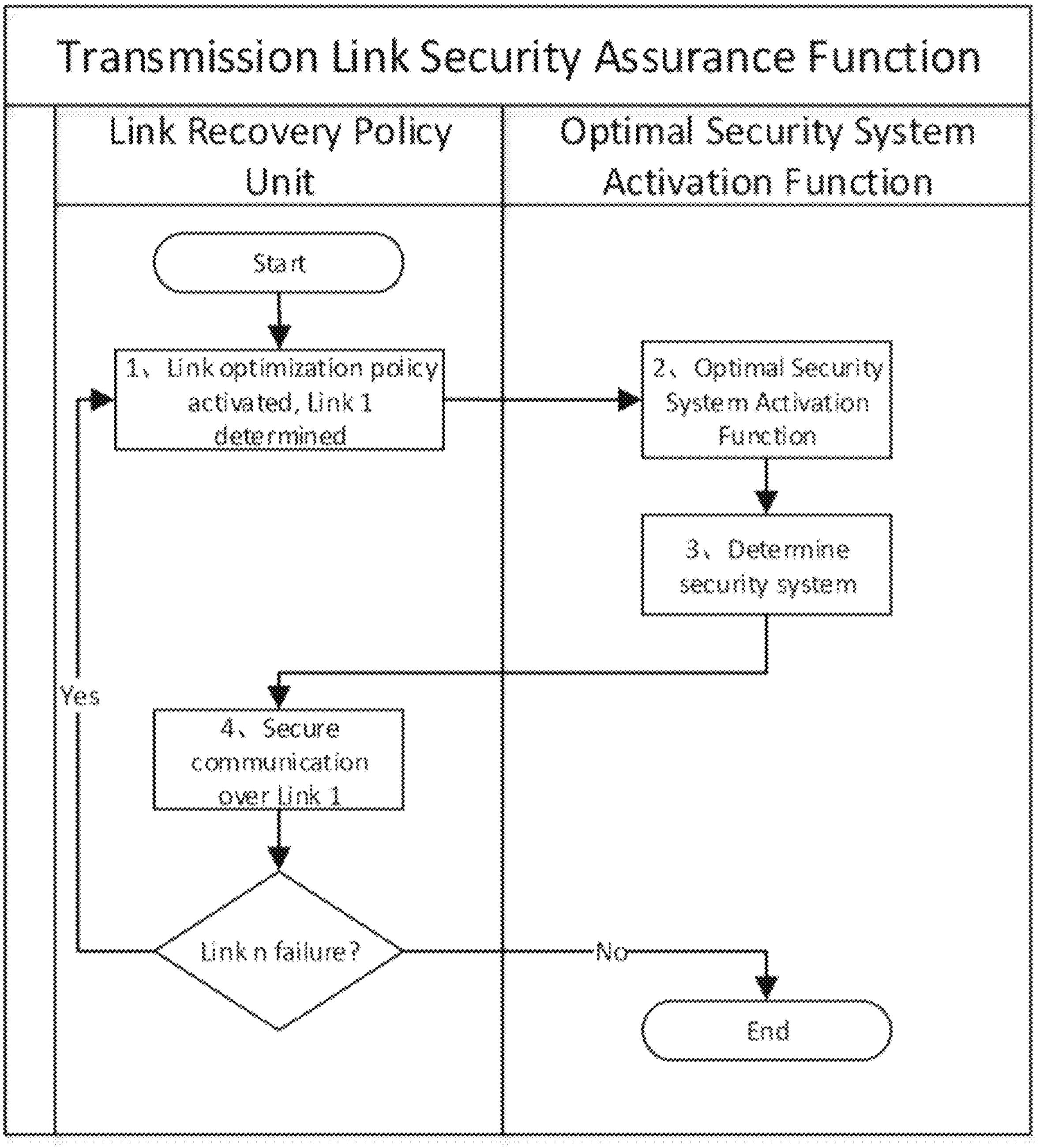
Figures 1, 26:
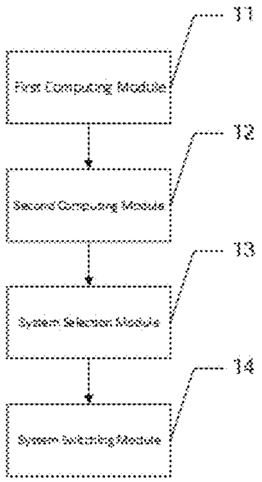
Figures 2, 26:
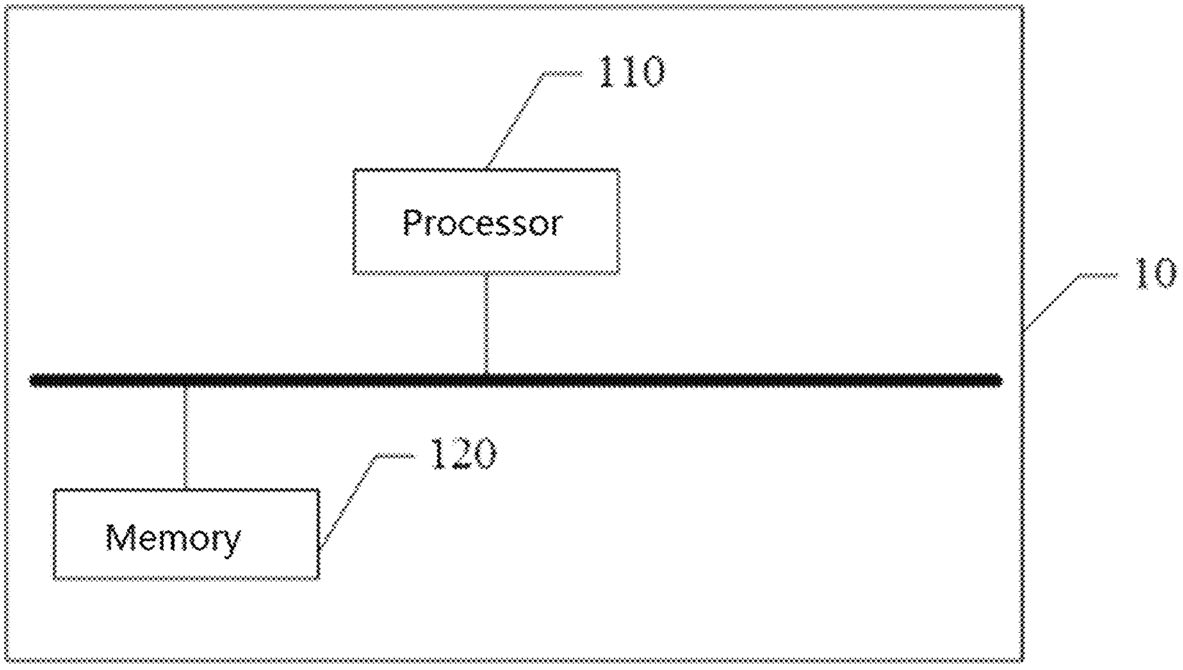

FIG. 22-1 is a flow chart of a method for operating an intelligent switching safety system;

FIG. 22-2 is a security system architecture diagram of a method for operating an intelligent switching safety system provided by an embodiment of the present invention;

FIG. 23 is a flow chart of step S300 for operating an intelligent switching safety system;

FIG. 24 is a flow chart of step S400 for operating an intelligent switching safety system;

FIG. 25 is a flow chart of for operating an intelligent switching safety system;

FIG. 26-1 is a structural diagram of an intelligent switching safety system;

FIG. 26-2 is a hardware structure diagram of a system for operating an intelligent switching safety system.

Figure 27:
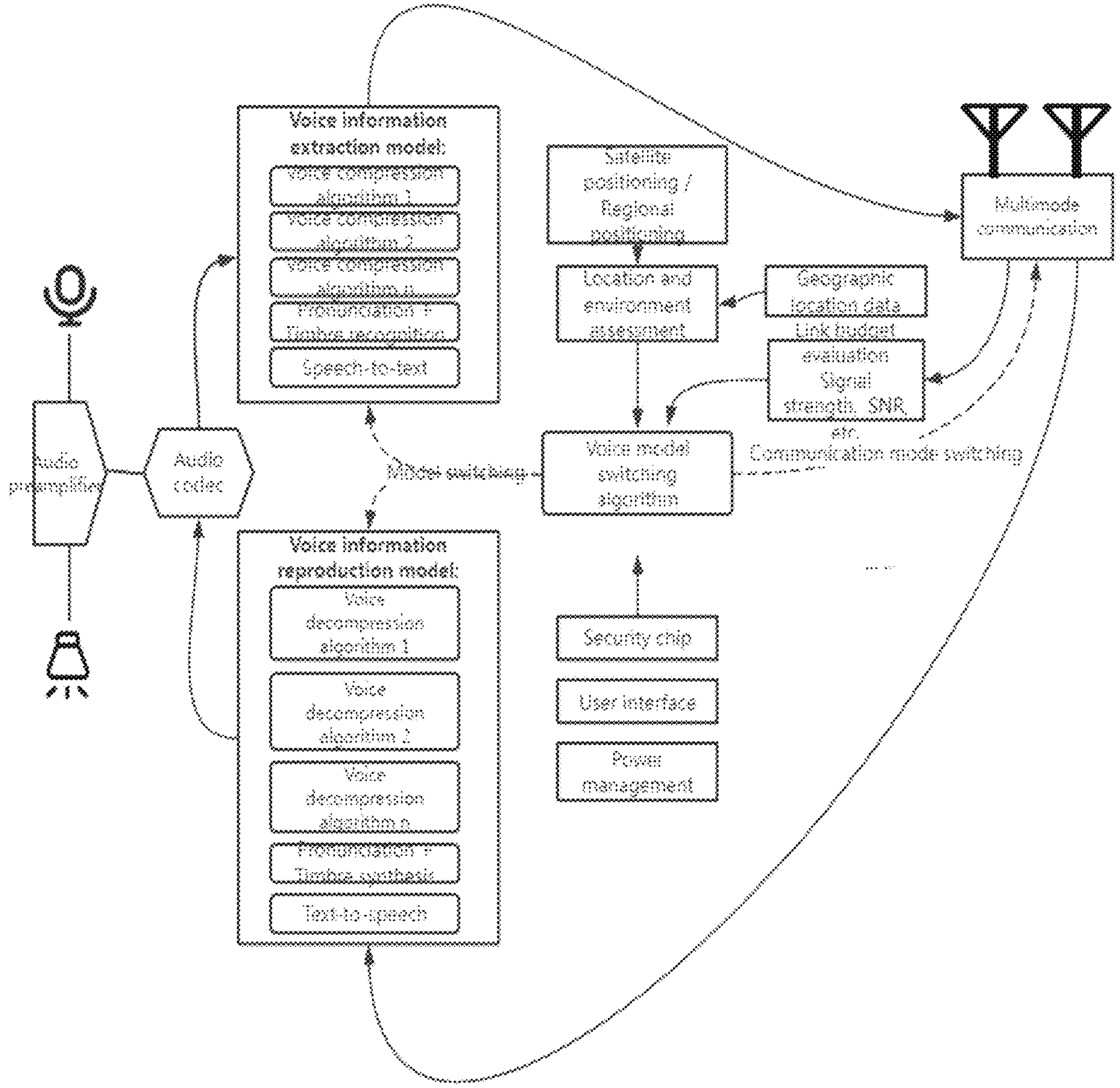

FIG. 27 is a framework diagram of the intelligent bitrate switching wireless intercom system provided by an embodiment of the present invention.

Figure 28:
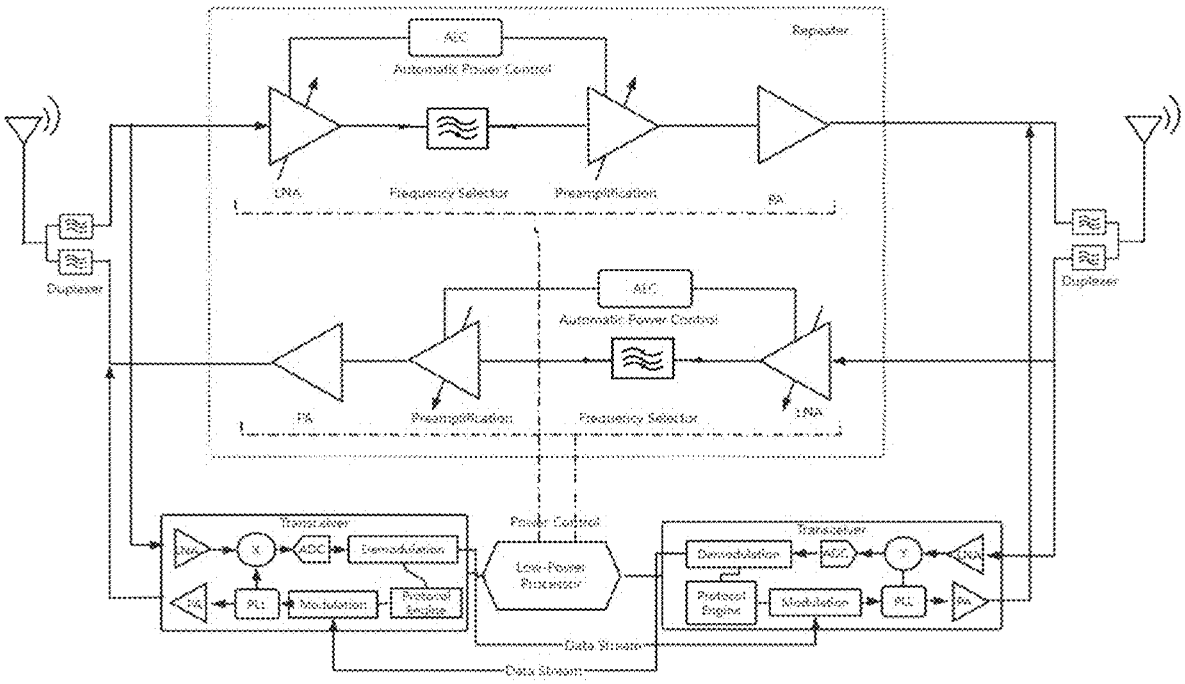
Figure 29:
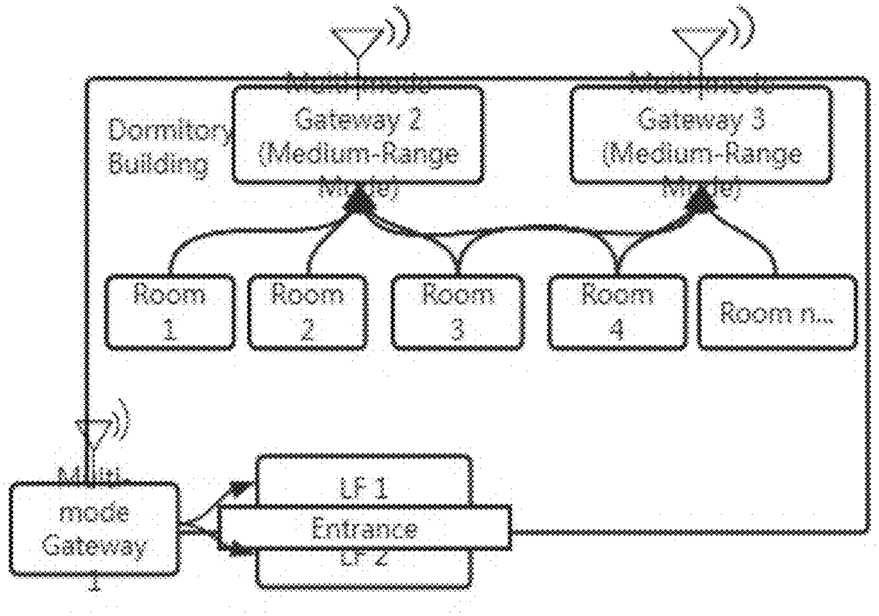

FIG. 28 is a framework diagram of the low-power mixed mode wireless relay system.

Figure 31:
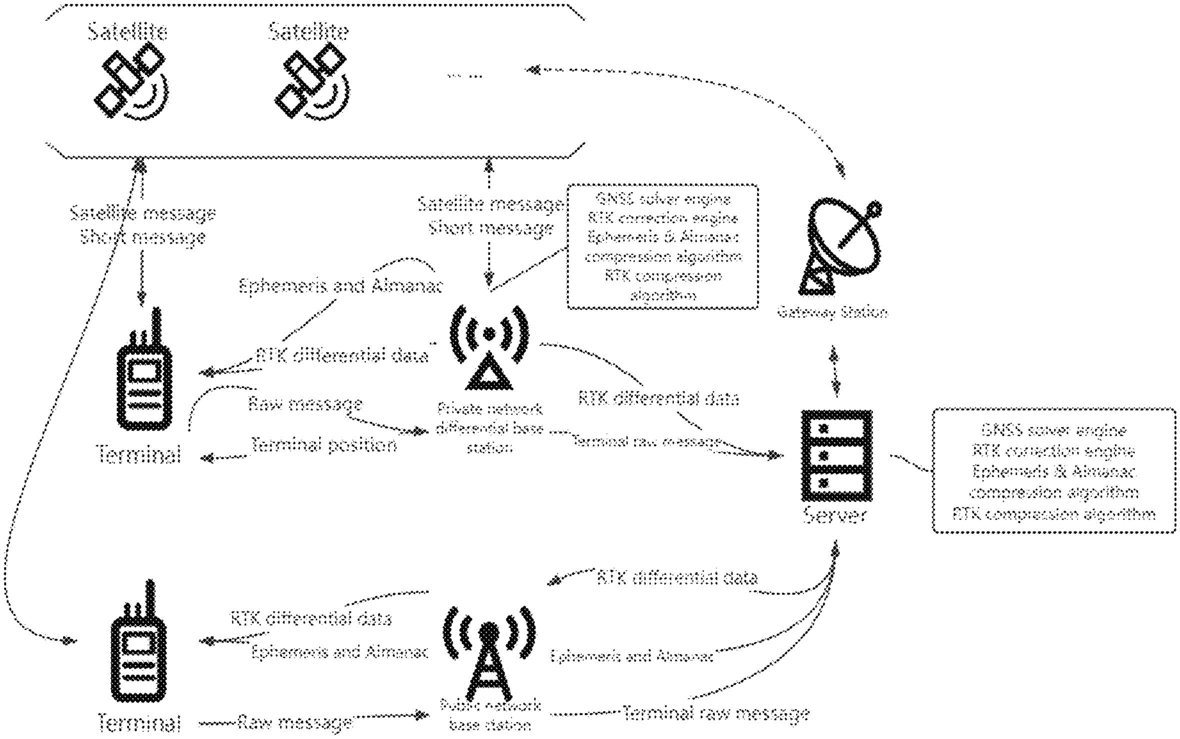

FIG. 31 is a framework diagram of a positioning system based on multi-mode heterogeneous radio communication.

Figure 32:
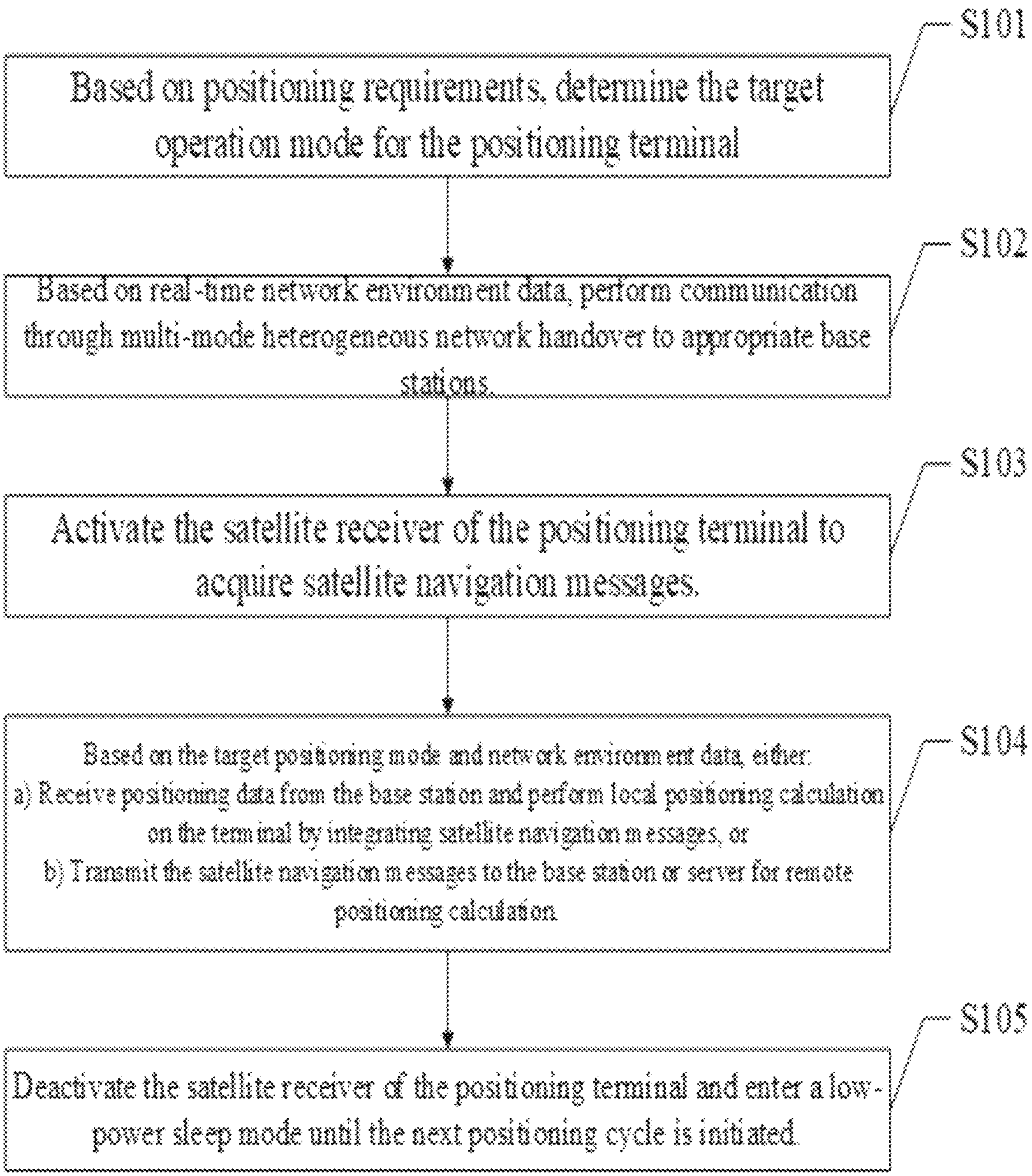

FIG. 32 is a flow chart of a positioning method based on multi-mode heterogeneous radio communication.

Figure 33:
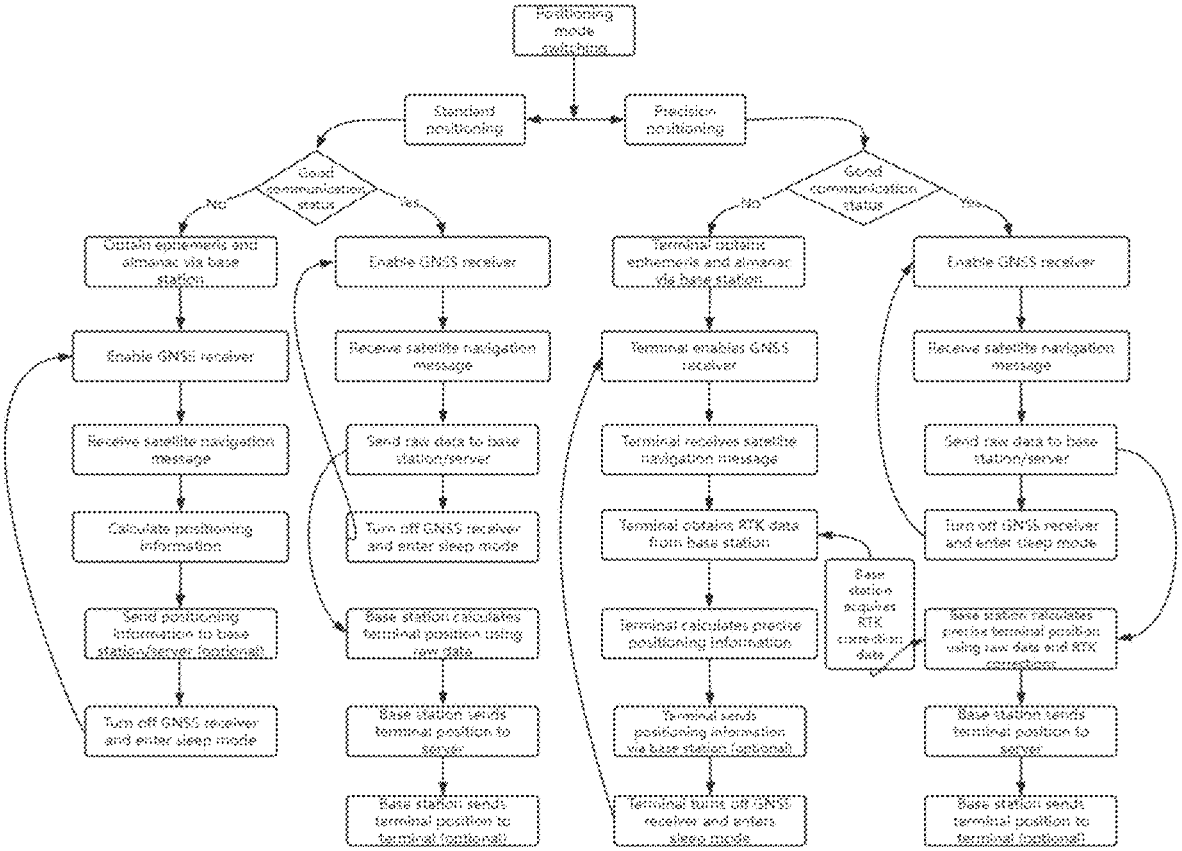

FIG. 33 is a positioning work strategy diagram based on multi-mode heterogeneous radio communication.

Figure 34:
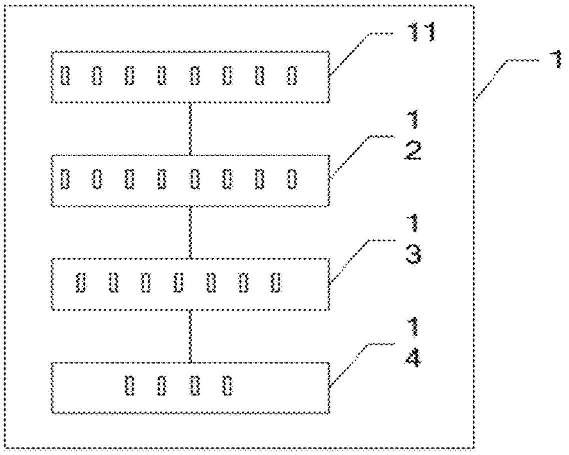

FIG. 34 is a functional module diagram of a positioning device based on multi-mode radio heterogeneous communication.

Figure 35:
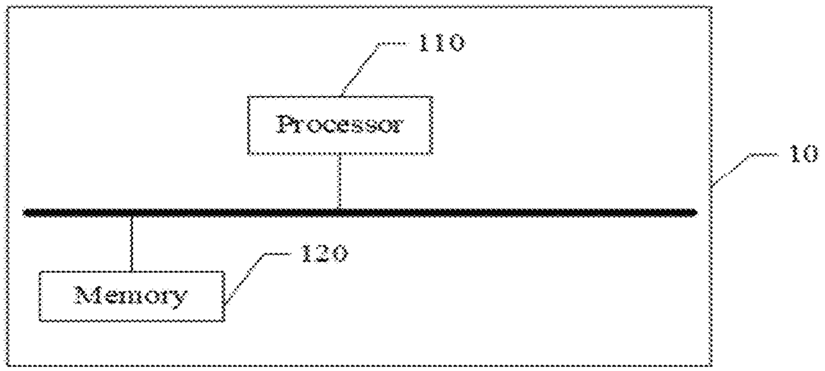

FIG. 35 is a hardware structure diagram of a positioning system based on multi-mode radio heterogenous communication.

FIGS. 36, 37, 29, and 30 are the integration and application of multiple invented technologies.

9. DETAILED DESCRIPTION OF EMBODIMENTS

FIG. 1 shows novel IoT network and/or Physical Layer Optimized Multimode Heterogeneous Cellular Network 100. Network 100 is shown comprising nodes N1 to N7. Node 100, N6, is connected to Node 5, by link 120. Node N3 is connected to Node N1, that is element 1060, by link 130. Node N4 is connected to Node N1, by link 140. Element 160 is node N1, which is also an MDTU, identified as MDTU1. MDTU1 communicates with a plurality of sensors, S1, S2 to Sn (n representing an integer), numbered 180, 182, 183, and 183, by communication and/or control lines numbered 170, 171, 172, and 173. Communication and/or control line 172 and sensor 182 are shown in dashed lines indicating they may represent a plurality of sensors communicating data to node 160. FIG. 1 shows dashed box 150 representing are relatively localized region of space surrounding node 160 that contains sensors S1 to Sn, indicating that sensor data originating in the IoT network or Physical Layer Optimized Multimode Heterogeneous Cellular Network from sensors communicating with node 160 originates in the vicinity of node 160, for example within a 10 kilometers of node 160, for example within 1 kilometer of node 160, and for example within 100 meters of node 160. FIG. 1 shows element 160' is a node and an MDTU identified as N2 and MDTU2 and has an associated vicinity 160'. Node 160 also has associated sensors S1' to Sn' and sensor communication and/or control lines 170'. FIG. 1 also shows node 160 having links to two other nodes, nodes N4 and N5.

FIG. 2 shows node 200 comprising a casing 210, CPU 220, memory 230, firmware 240, and I/O 250. The casing is optional. The memory may be organized in various forms including logical drives and conventionally addressable random access memory. Not shown are conventional hardware elements including data bus's, power supply and the like. Also not shown are contents of memory including a local operating system, code necessary for network operations in addition to operating system, system configuration data, and utility software code. The I/O represents the ability to communicate with other nodes including for example a network interface and storage of corresponding protocols.

Figure 3:
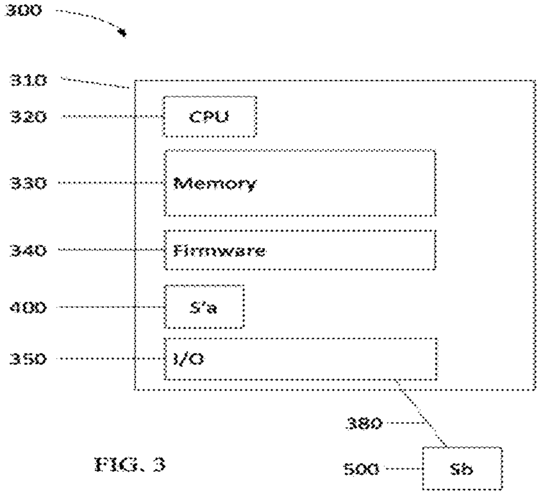
FIG. 3 shows a schematic of a node MDTU1, or N1, of FIG. 1 that is an MDTU, and associated sensors.

FIG. 3 shows MDTU node 300 including casing 310, CPU 320, memory 330, firmware 340, and I/O 350 as described for elements of FIG. 2.

FIG. 3 also shows dumb sensor 400 (Sa) within casing 310 and integrated sensor 500 (Sb) communicating with node 160 via link 380. FIG. 3 illustrates configuration of an MDTU of network 100 receiving sensor data from both an internal dumb sensor and an integrated sensor.

Figure 4:
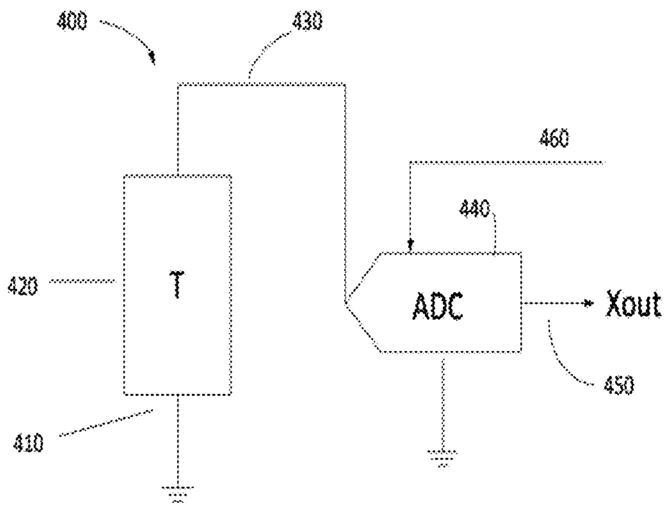
FIG. 4 shows a schematic of an associated dumb sensor of FIG. 3.

FIG. 4 shows dumb sensor 400 comprising ground connection 410, physical property transducer 420, conductive line 430. Conductive line 430 outputs a voltage to input of ADC 440. ADC 440 outputs digitally sampled data 450 (Xout). ADC 440's sampling parameters (such as precision and sampling rate) may be controlled by signals received from control line 460.

Figure 5:
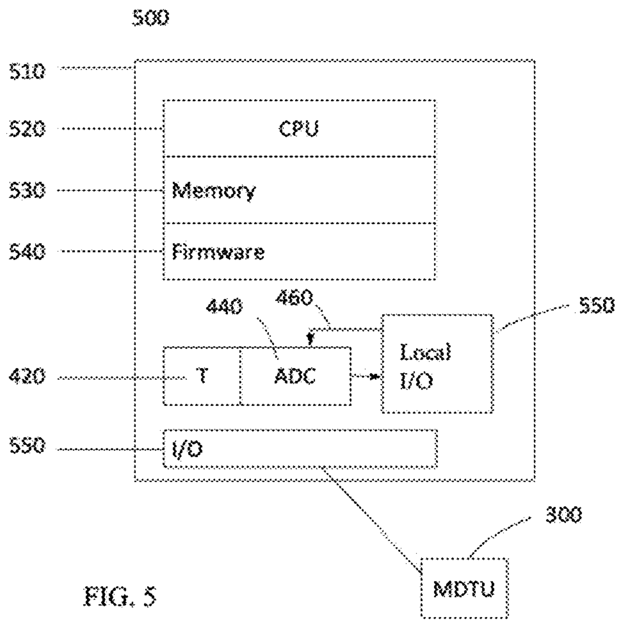
FIG. 5 shows a schematic of an associated integrated sensor of FIG. 3.

FIG. 5 shows integrated sensor 500 comprising a casing 510 enclosing CPU 510, memory 520, firmware 540, and I/O 550, similar to elements of FIG. 2. FIG. 5 also show integrated sensor 500 comprising a dumb sensor (transducer 420, ADC 440, and control line 46) communicating with local I/O 550. Local I/O received sampled data output from ADC 440 and optionally provides control signals to the dumb sensor on line 460. For clarity, FIG. 5 shows MDTU 300 to illustrate that I/O 550 communicates with an MDTU.

The wireless communications of the embodiments are dynamically configurable to provide or participate in the dynamically adaptable IoT via PLOMHCN, based on updates such as sensor data changes.

FIG. 6 is a schematic illustrating a dynamically configurable IoT 600 comprising a CHS and an MC system. FIG. 6 shows cellular network 610; node Nx, that is node 620 of cellular network 610; MC system 640 and links 630 from MC system 640 to networks 660 (comprising the Internet, PSTNs, and service provider networks), to cellular network 610, and to other MC systems 670; CHS 650; and content server 680.

As shown, MC system 640 may comprise: an inside transceiver; a routing module; a mapping table; an outside transceiver; a content strong; a converter; and one or more antenna.

As shown, MC system 640 may have links to WiMax, NFC, Cable, DSL, Fiber, WLAN or other transmission media and standards of CHS 650. MC system 640 may optionally include content server 680.

As shown, CHS 650 may comprise a customer terminal, a keyboard, a printer, a fire alarm, a modem, a TV set top box, a video camera, an ATM, a PDA, a PC, a wireless access point, a mobile phone, an External display, a TV set. CHS 650 may comprise other devices.

CHS 650 may comprise an MDTU, that is a network node having sensors. MC system 640 may also comprise an MDTU, that is a network node having sensors.

The MC System 640 functionality includes receipt, conversion and transmission of content in two directions. MC System 640 includes facilities for mapping and routing content to various connected devices and data storage for storing content that is served locally or to remote devices. Receiving, converting and transmitting multimedia content may be performed in two directions using the MC System 640. For example, this may include receiving and transmitting signals from one or more of the cellular networks, the Internet, the PSTNs, and the service provider networks 660, other Management Centers, as well as receiving and transmitting signals from user terminals including televisions, monitors. A variety of sensor monitoring is also implemented, including diaper monitoring, video camera, fire alarm, theft sensor, etc.

The MC System 640 also includes a converter module with routines for selecting, extracting, compressing, decompressing, adjusting data, and converting the data format and/or power level and/or data package size/format.

The MC System 640 also includes a mapping table and a routing module. The mapping table is described further below. It matches phone numbers, cable ports, DSL ports, IP addresses, etc. The routing module is for routing data to destinations through designated channels. The routing module accommodates routing the received data that is inbound from a variety of sources including but not limited to cable, broadcast television and Internet. It also accommodates routing to a variety of interfaces found on receiving terminals, including but not limited to RS232, USB (any versions of the specification for USB), and video cable port. The routing module receives the relevant information concerning routing from the results of looking up the same in the mapping table, and carries out the routing accordingly. The mapping table and routing module also include information and program code for carrying out the dynamic configuration of the IoT network over PLOMHCN.

The MC System 640 also includes data storage, such as a spinning or solid state hard disk. This allows the MC System 640 to store content to assist faster and more efficient data receiving and transmission to user terminals. The MC System 640 may also conveniently retains converted content (e.g., compressed, coded, decrypted, decompressed) for subsequent additional access. This converted content may be provided internally or transmitted externally from MC System 640.

When a communication is inbound to the MC System 640, it may include a data package that identifies the destination device. This may be in the form of a unique device identifier that is associated with each device managed by MC System 640. The mapping table is queried for the presence of the unique identifier. Once this is successfully performed, corresponding information regarding the processing of the communication may be automatically gathered from the mapping table. The information in the data package is also connected to the IoT network and/or Physical Layer Optimized Multimode Heterogeneous Cellular Network dynamic configuration. Thus, for example, changes in sensor data may be associated with updates for destination devices and/or routing requirements.

Additionally, or alternatively, MC System 640 (and/or CHS 650) can obtain formatting, addressing, and other information by referencing portions of the received data package according to a predefined protocol. For example, information within the received data package may indicate the format (e.g., TCP package in Internet) for transmission and the format (e.g., data package defined by WCDMA standard in 3G) for receiving, as well as the destination address corresponding to the converted data format. The overhead information within the received data package can inform the MC/CHS regarding the next transmission protocol and matched format. That is, the data package received by the MC/CHS includes some defined extra data besides the desired content data. This information informs the MC/CHS regarding the inbound data format transmission protocol, and also the outbound data format and the transmission protocol corresponding to the data format.

There may also be network-based connections, such as to a PC (or home LAN router) or directly to a television equipped with a network interface card and related functionality. In these instances the address information (and corresponding entries in the mapping table) would include the network address of the particular device. MC System 640 is equipped with its own network interface card and corresponding output to engage in these communications. These and other communications such as to a cellular phone via either the use of the cell phone number or a direct local wireless communication may be made, again as indicated in the mapping table.

There may also be situations where multiple different processes and corresponding conversion and addressing need to be applied for a given device. For example, a television set may be connected to both a network connection and the video output of MC System 640. As another example, a cellular phone may have alternative communication capabilities as noted. In these circumstances, the mapping table may also include multiple different entries designating the address, signal format, etc. In this fashion, the IoT network including Physical Layer Optimized Multimode Heterogeneous Cellular Network (PLOMHCN) dynamically accommodates updates to communication protocols and addressing schemes according to changing conditions and situational updates.

Category codes includes in the mapping table information may be used to efficiently sort different forms of processing that depend upon conditions (e.g., based upon sensor data). Thus, for example, a processing category code #1 may be a low level priority while sensor data is relatively benign (e.g., no fire), whereas processing category code #2 may provide a higher level of priority and different communication pathways and requirements for emergency situations (e.g., possible fire detected, possible unauthorized entry, power outage, etc.) The processing category code may (like the device identifier) be a number that is included in the data package.

The data package may also be variously provided to MC System 640. In one embodiment, the data package may be contained in a header area in packet data sent to MC System 640 by the source. Still further, at times the data package may itself contain information used in converting and/or addressing the appropriate device. For example, the data package itself may contain the network address of the destination device in lieu of looking for the same in the mapping table. As another example, all or part of key information for decrypting content may also be provided in the data package. As still another example, the data package may contain a flag to track an indication as to whether a virus screening process has completed successfully.

Devices that are intended to work with MC System 640 may also be equipped with software and/or hardware that allows them to insert and deliver the appropriate information in communications with MC System 640. For example, a cellular phone may be equipped with software that provides the appropriately configured data package in initiating communications with MC System 640 and/or configuring MC System 640 to provide any of the dynamic IoT network and/or the Physical Layer Optimized Multimode Heterogeneous Cellular Network features described herein.

MC System 640 variously processes data depending upon corresponding devices and purposes for the data. For example, the data received from cellular networks are selected and then converted to be displayed on home or office appliances with different types of display screens. Similarly, some content can be displayed more properly by mobile phone displays.

In addition, some data are also compressed and reorganized at MC System 640 so that they have certain data package sizes and formats for matching the requirements of the relevant transmission networks. For example, the signals sent from a wet diaper, fire alarm, and/or theft sensor may be transmitted to a user's cell phone or 911 Center. Additionally, either these signals or the corresponding routing condition of information related to them is updated depending upon the sensor data. This information may be compressed before transmission over the wireless network, which allows increased efficiency when using the wireless communication channel Additionally, security and encryption protocols (e.g., SSL) and error prevention protocols and coding schemes (e.g., Huffman, Solomon, or Turbo LDPC coding) may be applied to ensure that the information that is transmitted remains secure and without error.

The dynamically reconfigurable Physical Layer Optimized Multimode Heterogeneous Cellular Network also applies to home appliances. The home appliances (e.g., TV set, PC, Handset, Printer, PALM, camera, Headset, game controller, refrigerator, etc.) may also function through the (CHS), as illustrated. CHS 650 communicates with MC System 640 and/or Internet and/or other networks. CHS 650 can also be built into a cable modem, TV set top box, or other device. The sensor signals, for example, from a wet diaper, fire alarm, or theft sensor can also be sent from the CHS. Finally, it is noted that CHS 650 may perform the functions described for MC System 640.

The commonly practiced wireless connection centralized by wireless access point is based on WLAN technology, which is IP-oriented technology. Since the IP addresses may exhaust over time, each consumer electronics item such as headset, game controller, etc. configured to have an IP address is costly and fails to serve the user's needs well. One or more embodiments of the present invention offer two aspects in this regard. First, an intelligent management system centered by traditional connection equipment, such as TV set top box, cable modem, DSL modem or the like unites, manages, and optimizes the consumer electronics' functions. Also provided is a non-IP based wireless connection among these consumer electronics devices.

As shown in FIG. 6, CHS 650 communicates with the Internet through ADSL or cable and cellular base stations through wireless connection. The consumer electronics items communicate with CHS 650 through wireless channels such as Bluetooth, UWB, NFC or wire line connection. CHS 650 is the center of this wireless communication system.

A handset (e.g., cellular phone) can receive Internet data through CHS 650 and/or MS instead of communicating with a cellular base station. This communication channel is more reliable, less costly, and offers improved bandwidth compared to conventional connections between base station and the cellular phone.

There may be a corresponding connection between CHS 650 and the cellular network. This may implement a traditional wireless connection between CHS 650 and a cellular base station, with the communications implementing conventional wireless communications protocols. Another possibility is a leased line or wireless line connecting CHS 650 to the core cellular network. CHS 650 preferably includes a WIFI router function as well as the ability to route addresses between IP and cellular telephone number. It also is able to report to the cellular network with regard to the location of a particular user, so that information designated for that particular user may be directed to CHS 650 accordingly (e.g., calls, content ordered by particular user via cellular phone, etc.). It also may include any necessary conversion functions. In addition to reporting the location of a user to the cellular network, MC System 640 (or CHS) may also report roaming information to other MC Systems (or other CHS). This allows subsequent communications between users without involving the cellular network. That is, a first user may be located in the covered area for a first MC System, and a second user may be located in the covered area of a second MC System. While this circumstance remains, communications between the first and second users via their mobile terminals may involve the wireless connections from the MC Systems (as well as the connection between MC Systems, which may, for example, be an IP connection).

In addition, the information sent to the cellular phone can be delivered to a TV for a better display in accordance with another aspect of the present invention. Furthermore, the communication between CHS 650 and an oven with sensors and corresponding conditions can be variously triggered, such as through the detection of boiling water or the temperature of the food in an oven. A signal to arouse the attention of whomever is cooking the food or boiling water is transmitted to the TV, acoustic system, cellular phone, computer, beeper, mobile terminal, PDA, etc.

Various sensor data may prompt corresponding communications. For example, a wetness sensor in a child's diaper may prompt when wetness is detected. Corresponding signals will be delivered to TV, cellular, day care center, etc. Similarly, fire alarms, entry alarms, power outage alarms and other prompt communications that may be dynamically configured and update according to all the contributing sensor data.

A variety of data transmission protocols may be used to transmit multimedia content to MC System 640, including from cellular networks (e.g., 3G), Internet, Service Providers, and from other MC Systems.

A set of transmitters(s) and/or receiver(s) for connection with external resources is equipped at MC System 640. The connection channels for data transmission may include wired line connections (e.g., DSL, Fiber, Cable, DSL, least line, etc.) between MC System 640 and outside networks (e.g., Cellular Network, Internet, Service Provider networks). Additionally, wireless connections (e.g., WiMax, Satellite communications (e.g., VSAT system), traditional communications with cellular base stations, point-to-point, or point-to-multipoint wireless connections) may provide the connection between MC System 640 and outside networks. MC Systems may also connect, communicate, route, and relay content among and between each other. The connections among MC Systems are structured by efficient data transmission, service requirement, cost, bandwidth and other resources availability, and the relationships with Internet Content Servers, Cellular Networks, local Service Providers, and other MC Systems.

A variety of communications may also be applied for the communication channels between MC System 640 and the various local user terminals. At the user terminal side, the users use TV, computer, DSL modem, Cable modem, WLAN access point, mobile terminals, and various sensors that communicate with MC System 640.

A set of transmitters(s) and/or receiver(s) are equipped for the data transmission between MC System 640 and user terminals. Communication channels between MC System 640 and user terminals include the following: (1) direct connection using the available transmission port/standard such as USB, RS232, TV cable, Ethernet, Telephone line, etc.; (2) Wireless Personal Area Network such as UWB, Bluetooth, WLAN, etc.; (3) Long-range wireless connections such as WiMAX, Satellite, e.g., VSAT, TV broadcast, etc.; or (4) Wire-line connection such as DSL, Cable, Ethernet, etc.

The data transmission between an MC System 640 and user terminals can be one-way or two-way. One-way data transmission includes data sent from MC System 640 to the user terminals and the data sent to MC System 640 from user terminals. For example, MC System 640 sends data to user terminals (e.g., advertisement broadcast to TVs, computers, mobile terminals, etc.). Similarly, the user terminals send data to MC System 640 (e.g., signals sent from a fire alarm to an MC System). The data transmitted between an MC System 640 and a user terminal is preferably bidirectional. In this circumstance, transmitter and receiver at both sides are equipped.

The operations on data processing and transmission at an MC System 640 can be shared with a plurality of user terminals and/or other MC Systems. In some circumstances, some functions of MC System 640 described above can be done by a user terminal, so MC System 640 is omitted. One aspect of the invention is a TV or other display that is equipped to receive RF signals sent from cellular base stations. The cellular television demodulates, and/or compresses/decompresses data, and/or converts the signals to the appropriate format before displaying the image/video. The conversion and transmission provided with the television can also be two-way. The cellular television with a video camera/microphone can also record and extract the multimedia information, which can be transmitted to other users' terminals through cellular network or Internet. The cellular television is equipped to extract and/or convert, and/or compress, and modulate the multimedia information before sending it to the cellular base station. The cellular television also preferably has a separate channel for displaying multimedia information from the cellular network or other networks beyond traditional TV programs. Users may also use the TV remote controller to dial telephone numbers like a telephone dial panel.

Referring again to FIG. 1, an MDTU may be embodied as a group of sensors, for example corresponding to the fire alarm sensor of CHS 650. Alternatively, an MDTU may be embodied within other components, such as MC System 640 and/or CHS 650. Examples of these implementations of an MDTU are illustrated in MC System 640 and the local environment of CHS 650, as illustrated in FIG. 6.

FIG. 7 shows IoT network integrated with Physical Layer Optimized Multimode Heterogeneous Cellular Network 700 comprising a cloud controller 710 for controlling an IoT network, for example. FIG. 7 also shows links 720 (dashed lines); nodes 730 (Multi-mode HetNet Nodes); and IoT devices 740 (graphically indicated as video recorder, mobile phone, PC, and automobile). FIG. 7 distinguishes between nodes 730 linked to an IoT device 740, identifying those nodes with End Terminal Device Agents, and nodes 730 not linked to an IoT device 740, identifying those nodes with Network Edge Agents.

A Network Edge Agent is built-in as firmware of wireless network equipment, i.e. base station, gateway, repeater, etc. Network Edge Agent receives and implements policies and tasks sent from the Cloud Controller. Network Edge Agent works closely with radio-related functions thus may dynamically change radio parameters i.e., Tx Power, Central Frequency, Bandwidth, Frame Configuration, RF Mode, etc.

A Device Agent is built-in as firmware of IoT devices. It receives and implements policies and tasks sent from the Cloud Controller and Network Edge Agent; thus it may change the device's RF behavior dynamically according to the policies or tasks received from upper layer.

Heterogeneous networks (HetNet) is a term used for modern mobile communications networks. A modern mobile communications network is comprised of a combination of different cell types and different access technologies.

Multi-mode HetNet Node refers multiple types of HetNet-capable wireless base stations, including Macro cells that are used to provide coverage. Pico cells and micro cells that are used to enhance capacity in busy areas, such as train stations, shopping malls and city centers. Femto cells and Wi-Fi that are used at the office and at home. Deployment of these small cell are a key feature of the HetNet approach as they allow considerable flexibility as to where they are positioned.

Multi-mode HetNet Mesh is composed of a cluster of wireless-mesh-capable Multi-mode HetNet Nodes. Cloud controller 710 preferably controls network 700 to improve spectral efficiency, resource utilization rate, and real-time ability. Spectral efficiency, spectrum efficiency or bandwidth efficiency refers to the information rate that can be transmitted over a given bandwidth in a specific communication system. It is a measure of how efficiently a limited frequency spectrum is utilized by the physical layer protocol, and sometimes by the media access control. Resource utilization rate is defined as the amount of a wireless channel's available frames that can be allocated for data payload transfer, divided by theoretical maximum scheduled frames in given time slot, expressed as a percentage. Real-time ability means the latency between transfer and receiver (usually measures as a number in microseconds).

Cloud Controller 710 is a centralized network management entity, including at least one digital processor, memory, I/O, an operating system, and other software or firmware. Cloud Controller 710 determines some or all of the parameters defining each link in the IoT network (a link is also referred to herein as a connection), including RAT (radio access technology), allocated bandwidth, QoS, scheduling priority, data routes, etc. in charge of all network management functions. Cloud Controller 710 semi-continuously updates network elements with management message and signaling. For example, communicating with the rest of the network during every second, and typically sending or receiving instructions during most millisecond intervals. Cloud Controller 710 sends upper layer service requests (also known as distributing policies and computing tasks) to network equipment and devices, such as nodes 730 and IoT devices 740.

For example, cloud controller 710 implements software that controls network configurations to send to the nodes 730 and IoT devices 740, which in part specifies to nodes 730 and IoT devices which devices to form or terminate links 720. For example, software that cloud controller 710 implements may determine which ones of nodes 720 implementing end terminal device agents connect to which ones of IoT devices 740. This determination may be based for example upon location information for IoT devices 740, IoT bandwidth requirement information (indicating how much bandwidth is desired) from IoT devices 740; and node bandwidth requirement information (indicating how much bandwidth is desired) from nodes 730. Cloud controller 710 may for example determine to send instructions to specified nodes 730 to make or break links with specified IoT devices 740, to minimize link distance, to reduce bandwidth load on specified nodes 730, or to decrease latency of signal transmission from specified IoT devices or specified types of data from an IoT device to a network node 730 or to cloud controller 710.

In one mode of action, cloud controller 710 detects and evaluate network status periodically, such as every millisecond, second, every minute, or every hour, based upon timing triggers. When a timer triggers, cloud controller 710 may calculate network status and update a network status matrix containing information defining the status of the network. Cloud Controller 710 may generate tasks (including Power Adjustment, Frequency, Channel Bandwidth, Coding Scheme, Modulation, Target BLER, Required QoS, Target Latency, etc.) based upon the contents of network status matrix. Cloud Controller 710 may distribute the generated tasks to the network edge (that is to Multi-mode Heterogeneous Base Stations). The Network Edge Agent may implement changes according to the received tasks. The Network Edge Agent may distribute changes to Device Agent if the task calls for changes at device side. The nodes running the Network Edge Agent and optionally the IoT devices running the Device Agent implement changes and tasks specified by the instructions originated by Cloud Controller 710.

In one mode of action, cloud controller 710 detects an order from application layer that requires the network to allocate resource dynamically. For example, a video emergency call is to make from a bandwidth-limited multi-radio access technology. Cloud controller 710 may calculate network status and update the network status matrix. Cloud Controller 710 generate tasks (including Power Adjustment, Frequency, Channel Bandwidth, Coding Scheme, Modulation, Target BLER, Required QoS, Target Latency, etc.) to address and prioritize the emergency video call. Cloud Controller 710 may distribute the tasks to a network edge (that is, to a suitable Multi-mode Heterogeneous Base Station that can communicate with the sender of the emergency call.) That Network Edge Agent running on the Multi-mode Heterogeneous Base Station implements changes according to the received tasks. That Network Edge Agent may distribute changes to the Device Agent (running on the video emergency caller's video calling device) if the task calls for changes at device side.

In one mode of action, cloud controller 710 detects changes in device behavior and recognize changes should be made due to certain devices call for network resource. For example, cloud controller 710 may receive network information indicating a surge of activated devices above some threshold number or factor. Cloud controller 710 may run software that indicates from the surge in activated devices that the network is going to be required to admit mass connections in a very short coming slot. Note that a device typically has status of either active mode or inactive mode. In active mode, a device is online and likely in the process of transferring or receiving data to or from network nodes. In inactive mode, the device has no data to transfer or receive. Cloud Controller 710 may calculate network status and update the network status matrix. Cloud controller 710 may generate tasks (including Power Adjustment, Frequency, Channel Bandwidth, Coding Scheme, Modulation, Target Block Error Rate (BLER), Required QoS, Target Latency, etc.) Cloud controller 710 may distribute the tasks to network edge (that is Multi-mode Heterogeneous Base Stations). The corresponding Network Edge Agents in the Base Stations implement changes according to the received tasks. The corresponding Network Edge Agents distribute changes to Device Agents (of the device with which they are communicating respectively) if the task calls for changes at device side.

The network status matrix stores data elements including: application requirements for applications run on IoT nodes and devices; distance between pairs of IoT nodes; power consumption requirement of IoT devices; QoS (the quality of service) requirements for communication protocols and applications; data rate requirements; bandwidth requirements; payload form including size of the package and coding scheme; latency of data paths; fault information for nodes; failure or disconnection data for links between pairs of nodes; and other factors that may relate to decisional processing executed by Cloud controller 710 to improve spectral efficiency, resource utilization, and real-time ability.

FIG. 8 is a high-level flow chart 800 showing flow of functions performed by cloud controller 710 and controlled elements in IoT network and/or Physical Layer Optimized Multimode Heterogeneous Cellular Network 700.

FIG. 8 show start 810, periodical time triggers 820, application layer triggers 830, device awareness triggers 840, update network status matrix 850, generate tasks 860, distribute tasks 870, execute tasks 880, and stop 890.

If a periodic time trigger exists, at 820, cloud controller 710 initiates execution of the left column of steps 850 to 890. Cloud controller 710 updates a network status matrix 850 based upon data received from the network components in 850, executes code to generate tasks 860 and based at least in part on network status, and to distribute tasks 870 to network components based at least in part network status, and cloud controller 710, nodes 730, and/or IoT devices 740 execute those tasks, at step 880.

If there is no periodic time trigger, at 820, cloud controller 710 determines if application layer triggers exist, at step 830. If yes, cloud controller 710 and the other network components execute steps 850 to 880 as just described for periodic time triggers, but for the application layer triggers.

If there no application layer triggers exist, at step 830, cloud controller 710 determines if device awareness triggers exist, at step 840. If yes, cloud controller 710 and the other network components execute steps 850 to 880 as just described for periodic time triggers, but for the device awareness triggers.

FIG. 9 shows network schematic 900 including: MDTU 160, and carbon monoxide (Co), nitrous oxide (NO), and Ozone (03) sensors 180 communicating to MDTU 160.

FIG. 9 also shows IoT Gateway 910; LAN or LAN/WiFi connection 920A, 920B; routers 930A, 930B; cellular connections 940A, 940B; cellular base stations 950A, 950B; Internet I; IoT NS & AS; and client server 970.

FIG. 9 shows that MDTU may communicate with Internet and cellular network connected devices, and a IoT controller of PLOMHCN, such as cloud controller 710, via different data communication paths and networks.

FIG. 10 shows schematic 1000 of an MDTU of FIG. 1 comprising power management and monitor, communication ports (RS232, RS485) to receive sensor data, and memory and an MTU to set messages according to communication specifications, and interfaces for communicating with another IoT node (B2B connector); a source of GPS signals (B2B connector); cellular networks (such as 3G and 4G, for example using mini PCIe) and WiFi transmitter (for example using mini PCIe).

FIG. 11 is a schematic 1100 of an agent (either a Network Edge agent or a Device Agent) communicating with an IoT network and/or the Physical Layer Optimized Multimode Heterogeneous Cellular Network. FIG. 11 shows an application of an IoT device agent (or application) communicating via various wireless with different network nodes using MQTT and UDP protocols for the different communication paths, using environment independent gRPC for RPCs.

In a further preferred embodiment, after the perception terminal makes a decision based on the perception data, the perception strategy, communication parameters and/or network transmission rules of the perception terminal can be adjusted according to the decision content. For example, when the decision content shows that the specified conditions have been met, such as when a dangerous situation occurs, the perception terminal can automatically adjust the perception strategy, such as increasing the sampling frequency, increasing the sampling progress, etc., and at the same time request the superior device to change the communication parameters and strategies, so as to obtain a higher speed, high reliability and more suitable transmission in a multi-mode communication manner. Among them, the dynamically adjustable communication parameters include carrier frequency, carrier bandwidth, modulation mode, channel coding, transmission power, receiving sensitivity, etc.

Figures 1, 12:
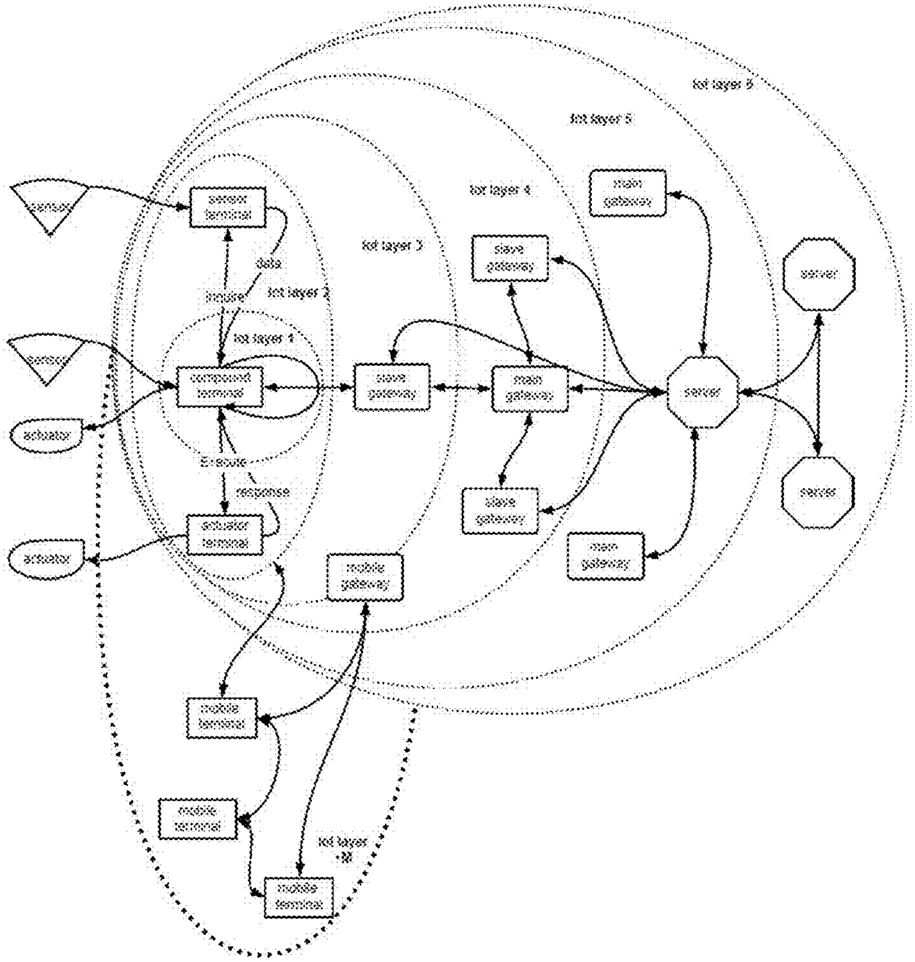
Figures 2, 12:
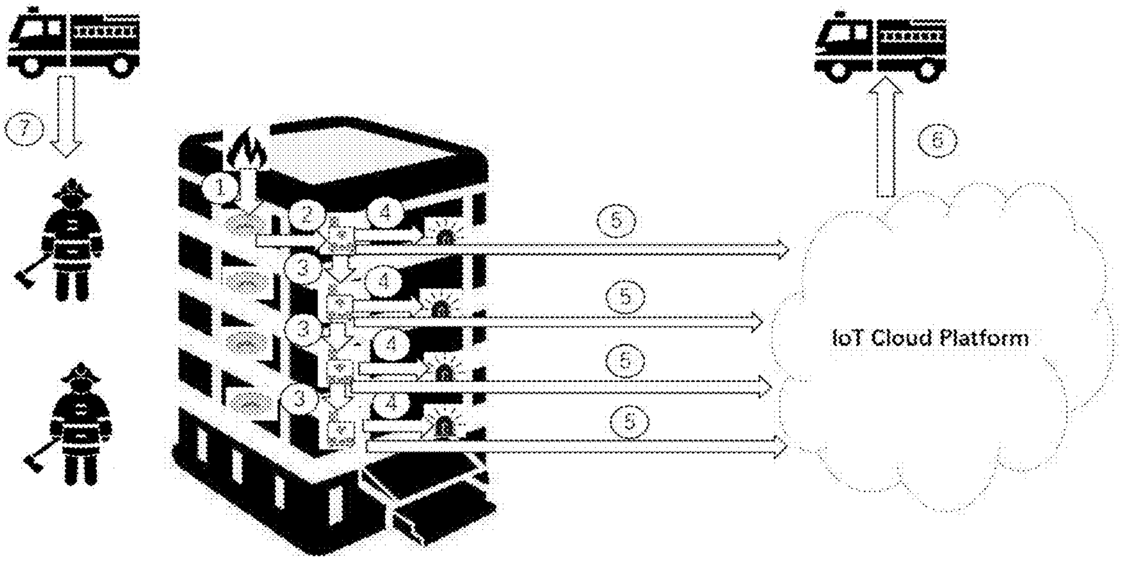

From the perspective of the communication layer, the multi-mode heterogeneous network can provide the perception terminal with diversified, configurable and coordinateable network connections, and can dynamically and on-demand provide the terminal with suitable network communication resources. For example, after making a decision, the sensing terminal can also send the collected data and decision results to the upper device (such as a gateway) at the same time, so that the upper device can store and analyze the data collected by all the sensing terminals. Exemplarily, the sensing terminal can establish a communication connection with the gateway, and the sensing terminal can send the collected data and decision results to the gateway. The gateway itself can have data processing capabilities, so the gateway can process all the received data and generate the decision results on the gateway side according to the processing results, that is, fog computing is realized on the gateway side. The fog computing refers to the data from sensors and edge devices. Not all are stored in the cloud data center, but a layer of "fog" is added between the terminal device and the cloud data center, that is, the network edge layer, which concentrates data, data processing and applications in the device gateway at the edge of the network, and the cloud server stores the data synchronously. For relatively large data, the fog device (gateway) can process it locally, extract meaningful features, and then synchronize it to the cloud. This method can greatly reduce the computing and storage pressure on the cloud, with lower latency and higher transmission rate. The terminal device and the fog device (gateway) adopt a multi-mode heterogeneous network transmission, which can greatly ensure the smooth communication in various situations. For example, the gateway can process the data of all terminals under its coverage, and its decision-making effectiveness tends to be more global, so the accuracy of the decision result made by the gateway can be greater than the accuracy of the decision result made by the perception terminal. When the decision result made by the gateway side is inconsistent with the decision result made by the perception terminal, the gateway can send an adjustment instruction to the perception terminal to adjust the sampling behavior of the perception terminal and can send a control instruction to the execution terminal to adjust the action of the execution terminal, thereby realizing network-based co-sensing and optimizing control. FIG. 12-1 is an integrated architecture of fog computing, edge computing and cloud computing. For example, the sampling interval of the perception terminal, the size of the preset threshold and other parameters can be adjusted, and the execution terminal can be adjusted to terminate the execution action. For example, in a building fire protection application, once a gateway receives the alarm information from a smoke sensor, it will send the alarm information to a nearby gateway. Eventually, the entire building gateway will receive the alarm information, and the entire building gateway will send an alarm command to the smoke alarm connected to it. Eventually, the smoke alarms of the entire building will sound the alarm at the same time, alerting all personnel in the entire building to evacuate quickly. Through gateway communication technology, it is ensured that the fire alarm information is broadcast to the entire building in the first time, and the broadcast of the alarm information will not be affected in the case of abnormal communication between the gateway and the cloud. FIG. 12-2 is an example of the application of gateway communication technology in building fire protection.

Figure 13A:
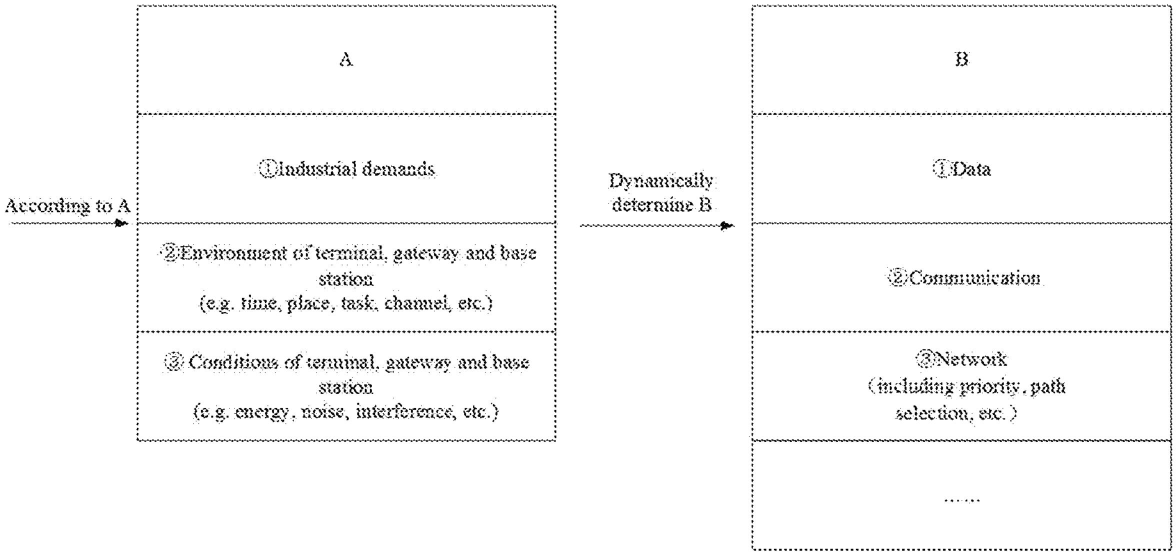
Figure 13B:
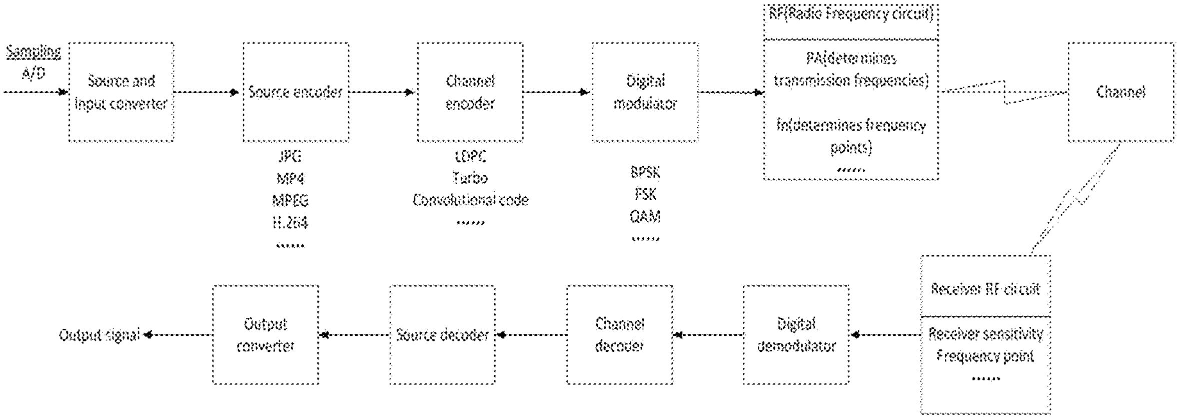
Figure 13C:
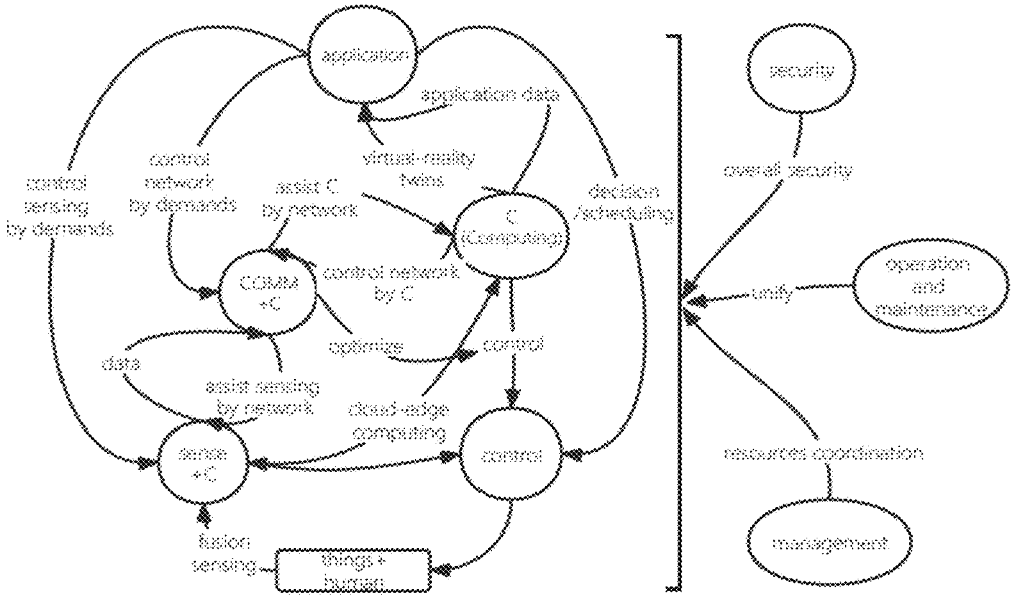

Referring to FIG. 13C, the present disclosure provides an example of a multi-mode heterogeneous network process and system relationship.

The present disclosure provides a method for dynamically adjusting a multi-mode heterogeneous network, the method comprising: obtaining a communication trigger source of a terminal; determining a communication demand according to the communication trigger source of the terminal; and providing a corresponding communication strategy according to the communication demand.

In the field of the Internet of Things or the Industrial Internet, the three elements of communication are: ubiquitous, dynamic, and real-time. Among them, ubiquitous mainly refers to a widely existing and ubiquitous network. Operator networks cannot achieve ubiquitousness based on their profitable nature, while multi-mode heterogeneous Internet of Things can be built according to location and demand, that is, corresponding multi-mode heterogeneous base stations are set up at the required locations. For example, in the Greater Khingan Range, operator network coverage in forest areas is almost non-existent, and it is impossible to achieve large-scale deployment of operator networks, but multi-mode heterogeneous base stations can be deployed to cover target areas. According to business needs, communication needs and low-cost needs, a single base station requires a large coverage area (corresponding to a longer communication distance), and the base station group only provides a limited overall bandwidth. Secondly, dynamic means that the network is dynamically variable. According to industry requirements and/or physical location, any communication parameters are dynamically adjusted to establish a network. In addition to mainstream communication modes, it also includes advanced networking methods such as Mesh, relay, and SDN. Finally, real-time refers to the delay of communication. Real-time is relative. In different communication scenarios, the delay of real-time is different.

As shown in FIG. 13A, B is dynamically determined according to A. Among them, A includes three situations: (1) industrial industry demand (2) the environment where the terminal, gateway, and base station are located (such as: time, location, task, channel, etc.) (3) the terminal, gateway, and base station's own conditions (such as: energy, noise, interference, etc.). B further includes data, communication, network, etc. For example, in the first case, industrial industry demand refers to the different requirements of different industries for communication. For example, the environmental protection industry has the requirements of the environmental protection industry, the safety supervision industry has the requirements of the safety supervision industry, and the water conservancy industry has the requirements of the water conservancy industry. Their requirements are different. In the second case, the environment where the terminal, gateway, and base station are located refers to the physical environment, that is, the physical environment where the terminal, gateway, and base station are located, which further includes time, location, task and channel. In the last case, the terminal, gateway, and base station's own conditions include their own power, sensor values, sensor conversion rate, and dynamically adjust communication intervals, transmission power, modulation methods and other parameters. A dynamically determines B, such as adjusting communication intervals, transmission power, and modulation methods. If the terminal's own power is low, the sensor value is lower than the set threshold, or the sensor value changes slightly, the transmission frequency is reduced. Further, as shown in FIG. 13A, the data in B indicates how to collect data, what data to collect, how to process data, how to use data, how to transmit data, etc., communication indicates what kind of communication settings, radio frequency parameters, transceiver modes, etc. are used for transmission, and the network indicates what kind of networking method, transmission path, etc. are used for the transmission process. Different communication requirements determine different communication strategies. For example, for high-quality communication requirements, strategies such as data information splitting-multipath concurrency-aggregation, real-time optimization of communication settings and radio frequency parameters, and building a high-priority network through the core network and base station can be adopted, and dynamic deployment can be performed in actual situations.

In the present disclosure, the corresponding data, communication, network, etc. are dynamically provided and determined according to different industry requirements, different physical environment requirements and/or different terminal conditions. For example, the environmental protection industry requires hundreds of sites to report data at the same time, which not only requires low latency, but also a high concurrency of sending at the same time. However, the time interval between two reports may be as high as 1 hour or 4 hours. This requires us to establish a multi-mode heterogeneous network that can dynamically adjust any communication parameters. This multi-mode heterogeneous network shatters traditional communication silos, obliterating the artificial boundaries between satellite, cellular, RFID, LTE, WLAN, and LoRaWAN systems to forge a truly borderless connectivity ecosystem. The multi-mode heterogeneous networks (e.g. the novel IoT network and/or Physical Layer Optimized Multimode Heterogeneous Cellular Network) dynamically adjust any communication parameters according to industry requirements or/and physical locations, such as source coding, channel coding, modulation model, signal time slot, transmission power and other physical communication parameters. The networks also flexibly schedule and flexibly expand wireless link access and management technology, perform equipment remote control, upgrade, parameter reading/modification, management and other functions, support link self-healing, and provide high-utilization, strong stability, and easy-to-recover professional wireless network bearer services.

Please refer to FIG. 13B. As shown in the figure, the data is first sampled, where the sampling interval can be set according to the needs (such as sampling once every 1 minute or once every 1 second). Then the sampled data is A/D converted to convert the analog data into digital data. The accuracy of the A/D conversion can also be set according to the needs: it can be 8 bits, 12 bits, 16 bits, 24 bits, etc. The digital data is then sequentially encoded by a source encoder, channel encoded by a channel encoder, and digitally modulated by a digital modulator before being sent out through RF (radio frequency circuit). Source coding can be implemented based on one or more protocols, such as MPEG-1, MPEG-2, MPEG-4, H.263, H.264, H.26, etc. Channel coding types mainly include: linear block code, convolutional code, concatenated code, Turbo code, and LDPC code, etc. Digital modulation methods include: FSK (frequency shift keying), QAM (quadrature amplitude modulation), BPSK (binary phase shift keying), etc.

In the disclosed embodiment, the multi-mode heterogeneous network service provides a network service that dynamically adjusts any communication parameters according to industry requirements and/or physical location, such as source coding, channel coding, modulation model, signal time slot, transmission power, and other physical communication parameters. For example, the transmitted RF signal can be adjusted by PA (determining the transmission power) and fn (determining the transmission frequency). Exemplarily, the adjustment includes allocating different transmission bandwidths to different services. When the data transmission requirements of some terminals change, the multi-mode heterogeneous network adjusts the allocation of network resources to adapt to the changes in requirements. Exemplarily, the adjustment includes adjusting the priority of signal transmission. For example, the signals of some terminals are transmitted first. For example, the data of some base stations or gateways are transmitted first.

For example, some service signals of the terminal are transmitted first. The multi-mode heterogeneous network adjusts network parameters in time based on on-site perception and service requirements, which can ensure the implementation of important upper-layer services and improve the availability of the multi-mode heterogeneous network. Further, the adjustment includes dividing different data into different data streams and transmitting them through different communication paths. For example, some data is transmitted to the upper-layer service through the 4G network, some data is transmitted to the edge computing module through the LoRa protocol, and some data is transmitted through the multi-mode heterogeneous network. Under the premise of meeting the service transmission requirements, the consumption of network resources is optimized.

As an example, in an urban fire protection application, multiple smoke sensor terminals are installed on each floor of a building.

In addition, the terminals have temperature recognition capabilities and use one or more wireless gateways for communication. During normal operation, all terminals detect at a certain frequency, but only send data to the gateway once every few hours to report the device status (such as battery power, temperature, etc.). In order to reduce the power consumption of the terminal, spread spectrum modulation is used during communication, using low transmission power and medium receiving sensitivity.

When a fire occurs on a certain floor, all terminals on that floor will send smoke concentration and temperature data at a faster frequency. These data will be used by the algorithm to calculate the spread of the fire and the best escape route. To cope with the temporary increase in communication resources, the communication between the gateway and the device opens multiple carrier frequencies and uses the 16QAM debugging method that supports higher rates to increase the transmission power and receiving sensitivity to ensure the communication distance. Please continue to refer to FIG. 13B. The transmitter calculates the best channel to connect to the receiver through the communication parameters, and transmits data to the receiver through the channel. The receiver receives the data through the receiving RF circuit and outputs the signal through the digital demodulator, channel decoder, source encoder, and output switch in sequence.

Figures 1, 16:
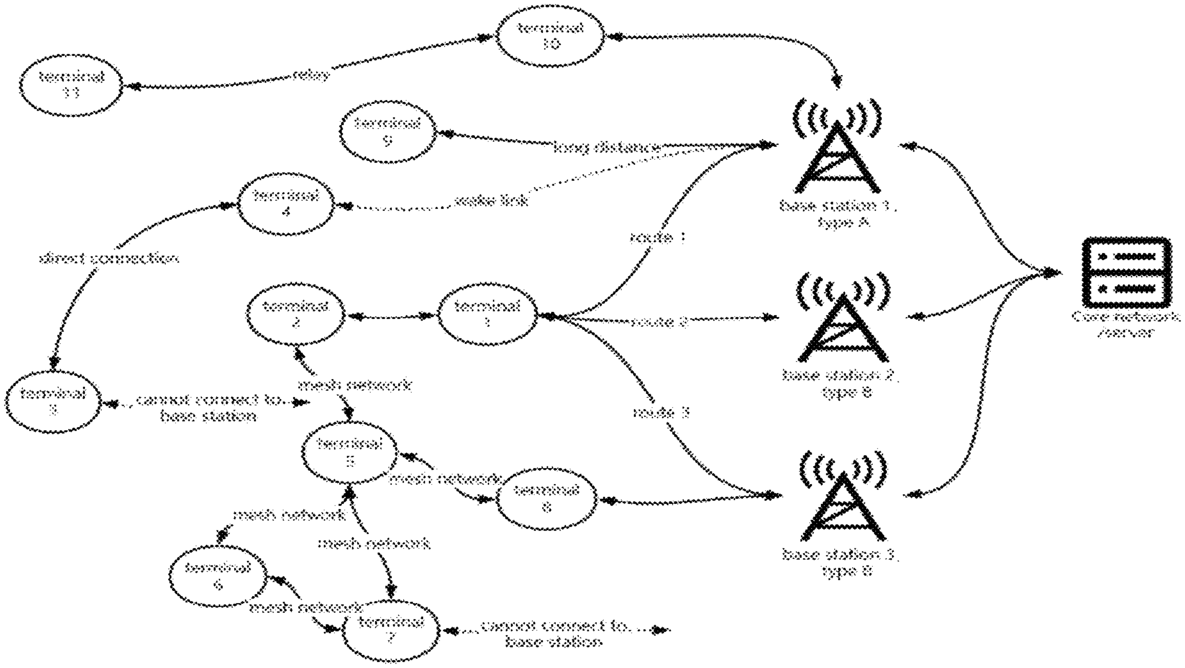
Figures 2, 16:
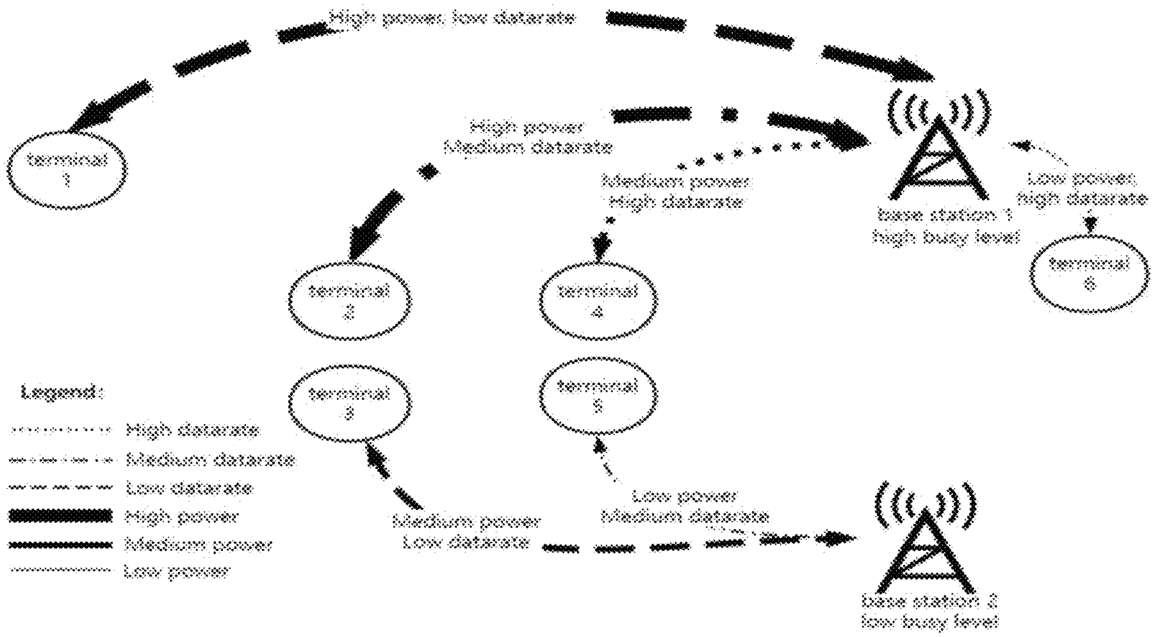

In some embodiments, the communication trigger source includes different requirements such as business requirements and control requirements, and the different requirements include two categories: static requirements and dynamic requirements. Static requirements are generally used to maintain the networking status of terminal devices and send basic information, and dynamic requirements are divided into various situations, such as: frequent monitoring is required to perceive the accident trend of terminal device data, network self-healing is required for gateway/base station failure, real-time networking of mobile terminal devices, temporary regulation, etc. The communication requirements corresponding to different communication trigger sources are also different. The communication requirements include high speed, high quality, reliability, robustness, weak network access, disconnected network access, and improved frequency utilization. The strategies or methods of multi-mode heterogeneous networks include split-multipath concurrency-convergence, dynamic communication adjustment, dynamic network adjustment, base station priority allocation, multipath co-transmission-redundancy removal, multipath round-robin transmission, communication parameter adjustment, network relay, self-organizing network, end-to-end direct connection, end-station diversion, etc. FIG. 16 shows the principle of the multi-mode heterogeneous network split-multipath concurrency-convergence strategy.

In some embodiments, the perception sensor of each terminal collects perception data to obtain a communication trigger source, and after edge computing, communication transmission, cloud-edge co-computing, etc., multiple perception data can not only make scheduling decisions for different terminals, but also determine the communication requirements of each communication trigger source. Different communication requirements require different communication strategies, and appropriate allocation can be made in actual situations. For example, if high-quality communication is required, strategies such as splitting-multipath concurrency-aggregation, dynamic communication adjustment, and base station priority allocation can be adopted; for another example, if network disconnection and access are required, strategies such as network relay, self-organizing network, and end-to-end direct communication can be adopted. In this embodiment, the data splitting and aggregation of multi-path transmission can bring about an improvement in edge throughput by adopting multi-standard and multi-layer network link aggregation (detection is performed through methods such as link quality detection, link response time detection, and link load detection to select the optimal link), so that the terminal can enjoy high-speed and stable data access services regardless of its location in the network. At the same time, by integrating communication methods of different standards, seamless access to heterogeneous networks is achieved, and the appropriate communication method can be adaptively selected according to the network environment where the terminal is deployed, thereby improving the transmission service quality of the terminal, and providing necessary hardware support for multi-stream aggregation. As an embodiment, the sending end splits the sent data packet into multiple sub-data packets, which are spliced into a complete data packet after aggregation at the receiving end. The sender and receiver are different terminals, and they can be the sender and receiver of each other in different data transmission processes. Based on the hybrid network, sub-data packets can be sent from the sender to the receiver through multi-path multi-communication methods as needed. Different strategies can be adopted according to needs during multi-path transmission. When terminals communicate with each other, they can establish connections through base stations or directly, instead of bridging through base stations, which reduces the bandwidth occupation of base stations. Hybrid networking adds self-organizing networks and point-to-point communication methods on the basis of star networks. When blind area terminals cannot directly connect to base stations, they can establish mesh networks with other terminals and realize uplink communication with the help of devices that can connect to base stations. Terminals can switch between star networks and mesh networks; when working in mesh network mode, terminals can act as routing nodes or ordinary nodes. FIG. 16 shows the data splitting and aggregation principles of multi-path transmission in multi-mode heterogeneous networks.

In some embodiments, all data in the communication process will be stored in a database, and a variety of parameters and status information for decision-making will be obtained through deep learning algorithms, including communication strategy optimization parameters, path prediction parameters, resource scheduling parameters, network fault reconstruction parameters, communication situation awareness information, network health status assessment information, etc. These results will be used to execute different multi-mode heterogeneous network strategies or methods and improve the capabilities and effects of multi-mode heterogeneous network strategies or methods through continuous learning optimization. In addition, these results also act on the collaboration of multi-mode heterogeneous networks and are used to regulate the perception data of terminals and the edge computing and cloud-edge collaborative computing of terminals, and can even make scheduling decisions directly for terminals. As an embodiment, due to the network communication data transmission between the multi-mode heterogeneous Internet of Things network and the data intelligent fusion platform, the data sources of different formats in the data intelligent fusion platform are dynamically connected and downlinked, so that the data sources in the data lake of the data intelligent fusion platform can be infinitely expanded, and the data capabilities can be infinitely replicated, providing huge data resources for various business scenarios. In this embodiment, the data sources in the data lake of the data intelligent fusion platform include data from perception terminals, communication big data, external data, and data generated by the algorithm platform.

In summary, the data intelligent fusion platform can achieve multi-industry access, including air, meteorology, soil, transportation, construction, water quality, fire risk, and other multi-industry data including environmental protection, firefighting, municipal administration, etc., first access and then integrate to break through industry barriers; at the same time, the data intelligent fusion platform also provides multi-source heterogeneous data access, including data sources such as databases, file systems, message queues, and structured, semi-structured and non-structured data sources. The data source can be infinitely expanded, and the data capabilities can be infinitely copied, providing huge data resources for various business scenarios; its data specifications are unified, providing a unified data dictionary and data specifications, reducing development costs and improving data quality.

It is worth noting that the core network and base stations collect communication data from base stations, routing nodes, and terminals: communication mode, communication path, signal-to-noise ratio, packet loss rate, delay, channel occupancy rate, etc., and make link predictions through deep learning algorithms. According to the network environment and transmission requirements (bandwidth, rate, response time, reliability, connection distance, etc.) of the terminal node, the connection mode (direct base station, mesh network, point-to-point), transmission path (single path, multi-path), source coding (such as Huffman coding, arithmetic coding, LZ coding, etc.), modulation mode (such as FSK, GFSP, spread spectrum, BPSK, QPSK, 8PSK, 16QAM, 64QAM, etc.), channel coding (such as Turbo code, LDPC code, Polar code, LT code, etc.), signal bandwidth, transmission frequency point, RF parameters (modulation mode, rate, spectrum occupancy, receiving bandwidth) and other factors are dynamically adjusted.

In some embodiments, split-multipath concurrency-aggregation is a data splitting and aggregation method for multipath transmission, including splitting a transmitted data packet into multiple data packets, and different data packets are aggregated into complete data at the receiving end through different communication methods and different paths. Different strategies are adopted according to needs during multipath transmission. As an embodiment: a) the data packet is split into multiple data packets and transmitted in turn through different paths to increase robustness, b) the data packet is split into multiple data packets, and transmitted in parallel through different paths to increase network bandwidth, c) the same communication packet is redundantly transmitted through different paths at the same time to increase reliability. FIG. 16 shows the principle of the data splitting and aggregation method for multipath transmission.

In some embodiments, when the blind area device cannot directly connect to the base station, it can establish a mesh network with other devices, and realize uplink communication with the help of the device that can connect to the base station. The device can switch between the star network and the mesh network; when working in the mesh network mode, the terminal can communicate as a routing node or as a common node. FIG. 16 shows the communication principle between terminals.

Figure 15:
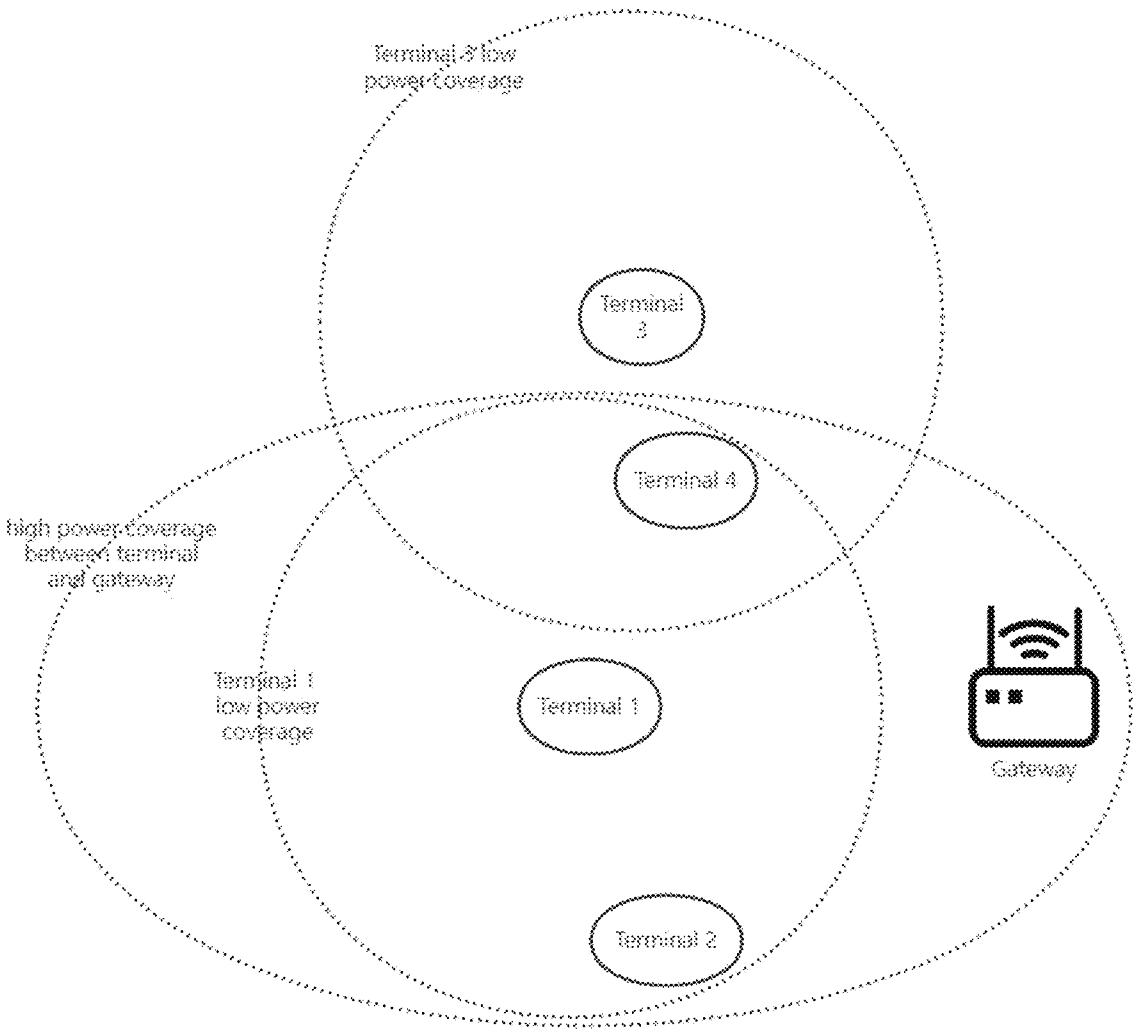

In some embodiments, when adjacent devices communicate with each other, they can establish a connection through a base station or directly, rather than through a base station bridge, thereby reducing the spectrum occupation of the base station. The communication bandwidth requirements between the two devices are evaluated based on the application requirements. According to the distance between the two and the radio frequency noise, the appropriate bit rate, debugging method and control of the transmission power are selected to achieve the minimum occupation of the spectrum resources. FIG. 15, 16-2 shows the control principle of the transmission power and receiving sensitivity between terminals.

Figures 1, 14:
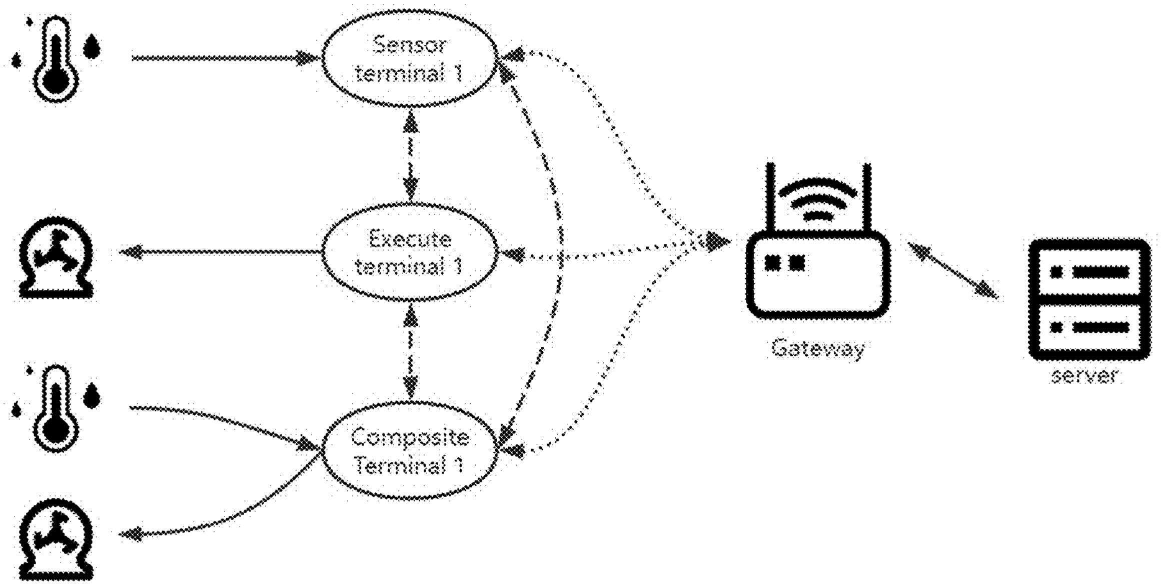
Figures 2, 14:
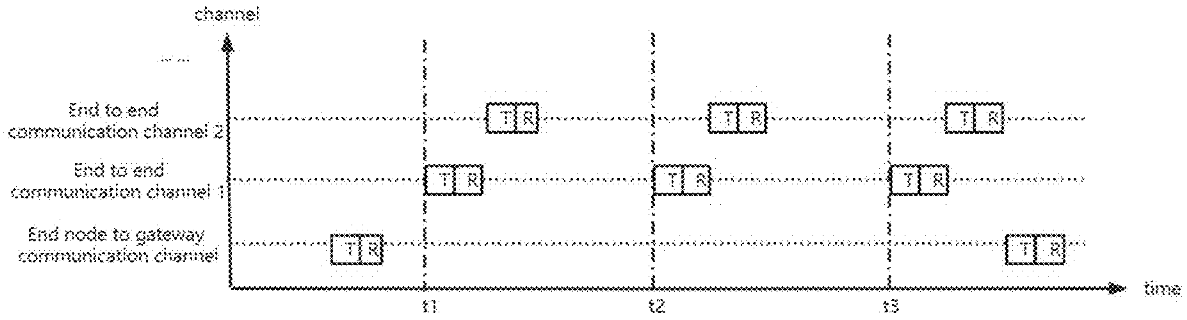
Figures 3, 14:
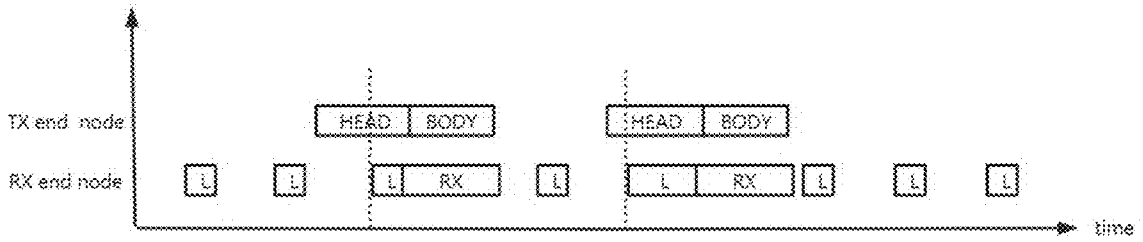

In some embodiments, the terminal node dynamically adjusts the communication interval, transmission power and debugging method according to its own power, sensor value, and sensor conversion rate. For example, if the terminal itself is low in power, the sensor value is lower than the set threshold, or the sensor value changes little, the transmission frequency is reduced as indicated in FIG. 14 including the technical flow chart of dynamically adjusting the terminal reporting time interval.

Figure 13D:
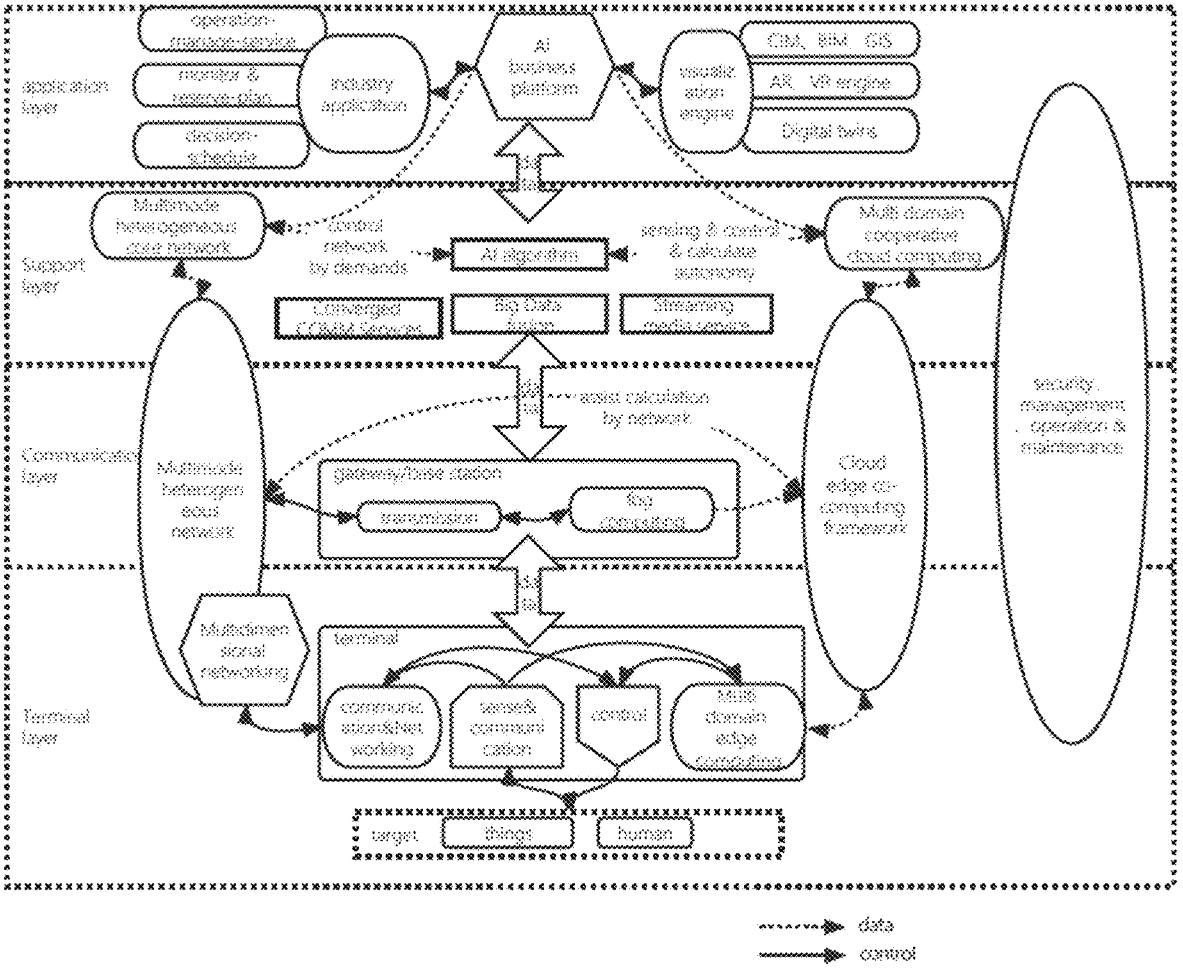

Please refer to FIG. 13C and FIG. 13D together. The terminal layer includes thousands of different types of sensing, linkage, multi-mode heterogeneous communication, mobile and/or video terminals of different industries. The sensing terminal can ubiquitously, in real time and dynamically sense the multi-dimensional state of the city, such as water, gas, electricity, soil, sound, fire, etc. The sensing data is uploaded to the central platform through a multi-mode heterogeneous network that dynamically adjusts any communication parameters according to industry requirements or/and physical location. Further, the sensing terminal can be a variety of sensors with data acquisition functions or electronic devices with sensors, such as temperature sensors, smoke sensors, atmospheric pressure sensors, sound wave sensors, image sensors, cameras, etc.

In this embodiment, the linkage terminal can realize the linkage from edge side perception to execution based on the multi-mode heterogeneous network that dynamically adjusts any communication parameters according to industry requirements or/and physical location, such as linkage alarm, linkage shouting, linkage control valve/door, linkage SMS/email notification, etc. Multi-mode heterogeneous communication terminals provide transmission and interconnection that is dynamically adjusted according to industry requirements or/and physical location for sensors that do not have communication transmission capabilities. It supports composite sensing technology, multi-sensor data fusion, and supports unified access of sensing devices from different manufacturers. The sensing technology combined with edge computing technology realizes edge correction and self-correction of sensing data, and derives optimized sampling strategies, such as dynamically changing the sampling interval, sampling accuracy and transmission frequency according to the change rate of sensing data, preset thresholds, network conditions, etc., so that the response time, the power consumption of the whole machine, and the network bandwidth occupation can be taken into account at the same time. Further, the edge computing method includes: collecting data by a number of sensing terminals; judging whether the data collected by the sensing terminal is abnormal; when abnormal, the first device connected to the sensing terminal generates a first alarm message, and sends the first alarm message to all second devices connected to the first device; the second device sends a second alarm message to all alarm devices connected to the second device. Among them, the first device and the second device can be edge devices or intermediate devices. In this embodiment, the edge device can be used for data packet transmission between access devices and core/backbone network devices, and can be switches, routers, routing switches, gateways, IADs, and various MAN/WAN devices installed on the edge network. With the addition of edge computing, the data collected by the perception terminal does not need to be shuttled between the local and central servers, so that the local device can know which function to execute. This can save operating costs and investment in storage devices. In addition, the information that needs to be uploaded by the communication terminal (such as the perception terminal or gateway or base station) and the communication and network that match it are determined by edge computing or fog computing or algorithm platform. The information may include but is not limited to the data difference, feature value and/or feature value of the image and video of the data collected by the perception terminal. As an embodiment, the communication and network that match it are dynamically allocated and output by a multi-mode heterogenous network. For example, when the data difference of the data collected by the perception terminal exceeds the threshold range, or meets the specific image or video feature value, or meets the specific sound wave feature, it can be determined that the collected data is abnormal, and then an alarm message is generated and other further operations are performed (at the same time, the multi-mode heterogeneous network dynamically allocates network and communication resources). When the collected data is not abnormal, the perception terminal can reduce the frequency of collecting data and transmit it through the corresponding communication and network, which reduces the waste of communication resources and saves the energy of the communication terminal.

Mobile terminals include handheld devices, walkie-talkies, vehicle-mounted devices, positioning terminals, wearable terminals, etc., which perceive, apply, and communicate in a mobile state, and realize the application of wide, medium, and narrow band combination and voice/video/text/image/data/file fusion communication through a multi-mode heterogeneous network that dynamically adjusts any communication parameters according to industry requirements or/and physical location. Video terminals include various video perception terminals such as cameras, thermal imaging, and hyperspectral, which are uploaded through a multi-mode heterogeneous network that dynamically adjusts any communication parameters according to industry requirements or/and physical locations.

Furthermore, as shown in FIG. 14-1, all terminals in the terminal layer (including: perception, linkage, multi-mode heterogenous communication, mobile and/or video terminals) establish communication connections between each other. By establishing direct communication between the terminals, any terminal can obtain the perception data of multiple other terminals, make decisions based on the perception data of multiple terminals, and generate execution commands, that is, it can comprehensively perceive the data to generate decision results, making the decision results more reliable. Even in the case of a gateway network failure, the perception terminal can still obtain the data of other terminals based on direct communication between terminals for edge computing and then generate execution commands under specified conditions, that is, network failure will not affect the generation of decision results. Furthermore, the communication method between terminals is different from the communication method between terminals and gateways. For example: different communication channels, modulation methods, synchronization bytes, etc. are used between terminals and between terminals and gateways; different protocols can be used for the payload content transmitted between terminals; different channels (which may also include different modulation methods, data rates, encoding methods, etc.) can be used for communication between terminals, as shown in FIG. 14-2, thereby reducing conflicts with communication between terminals and gateways.

Figure 37:
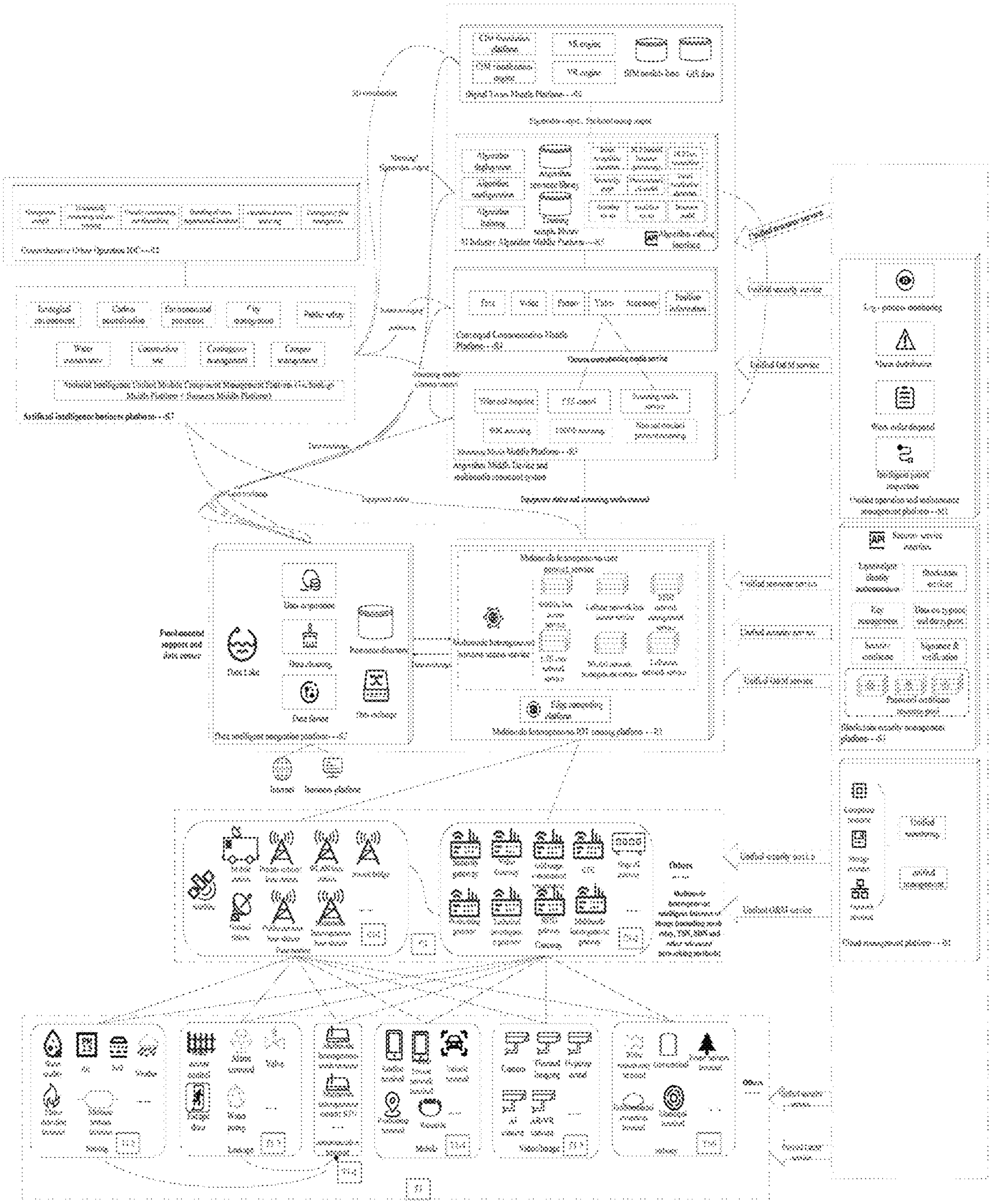

Please refer to FIG. 37 and FIG. 13D together. The communication layer/transmission layer is a multi-mode heterogeneous intelligent Internet of Things composed of two major parts: base stations and gateways. It dynamically adjusts any communication parameters to establish a network according to industry requirements and/or physical locations. In addition to mainstream communication modes, it also includes advanced networking methods such as Mesh, relay, and SDN, providing network support for fixed-mobile convergence, broadband, medium and narrowband convergence, and voice/video/text/image/data/file converged communication for the terminal layer. The communication layer/transmission layer can be understood as the root of a tree, which is the bridge connecting the tentacles and the trunk of the tree. The transmission layer uploads the perception, control, status, and other information of the tentacles to the support layer (the trunk of the tree) through wireless/wired methods.

Furthermore, the base station covers a variety of communication networks such as satellites, private networks, WLAN, bridges, public networks, multi-mode heterogeneous networks, and dynamically adjusts any communication parameters to establish a network according to industry requirements and/or physical locations. For example, it supports data splitting and aggregation of multi-path transmission. As shown in FIG. 16, the terminal splits the sent data packet into multiple data sub-packets, and different data sub-packets are transmitted through different communication methods and different paths and are assembled into complete data packets after being assembled at the receiving end. In the figure, terminal 1 has a multi-mode communication method, which can simultaneously connect to three base stations of different standards, namely base station 1, base station 2 and base station 3. When transmitting data, it transmits data through three base stations at the same time, and aggregates and splices data on the core network/server side. Different strategies are adopted according to needs during multi-path transmission. For example, when the blind spot device cannot directly connect to the base station, it can establish a mesh network with other devices, and realize uplink communication with the help of the device that can connect to the base station: As shown in FIG. 16, terminal 6 and terminal 7 establish a mesh network through terminal 5, terminal 2 and terminal 8, and connect to the base station through terminal 5 and terminal 8. Terminal 5, terminal 2 and terminal 8 assume the routing function. The device can switch between star network and mesh network; when working in mesh network mode, the terminal can be used as a routing node or a common node. The communication network supports point-to-point communication between devices, reducing the bandwidth occupation of base stations. The core network and base station can collect link information of base stations, routing nodes, and terminals, including: communication mode, communication path, signal-to-noise ratio, packet loss rate, delay, channel occupancy rate, etc., and use deep learning to make link predictions to deduce better networking and communication solutions, and adaptively adjust the device's connection mode (direct base station, mesh network, point-to-point), transmission path (single path, multi-path), and communication parameters (modulation mode, rate, spectrum occupancy, receiving bandwidth) as needed (data transmission rate, response time, reliability, connection distance, etc.). For example, as shown in FIG. 16, it provides a method for achieving network coordination by adjusting power and rate only. The higher the power, the longer the transmission distance, but the larger the signal coverage area during the transmission process, the more likely it is to affect the communication of other nearby devices. The higher the rate, the shorter the communication time, and the less frequency resources are occupied, but the closer the communication distance. In the figure, base station 1 is connected to many devices and is relatively busy, while base station 2 is connected to fewer devices and is relatively idle. In order to reduce the busyness of base station 1, terminal 2 and terminal 4 use high power and high-rate transmission. The transmission process may have an impact on base station 2, but this impact can be accepted because base station 2 is relatively idle. Terminal 3 and terminal 4 try to transmit through base station 2 at low power and low rate, because the low power has little impact on base station 1. Terminal 1 can only transmit at high power and low rate due to the long distance, while terminal 6 can transmit at low power and high rate because it is close enough to base station 1.

Figure 17:
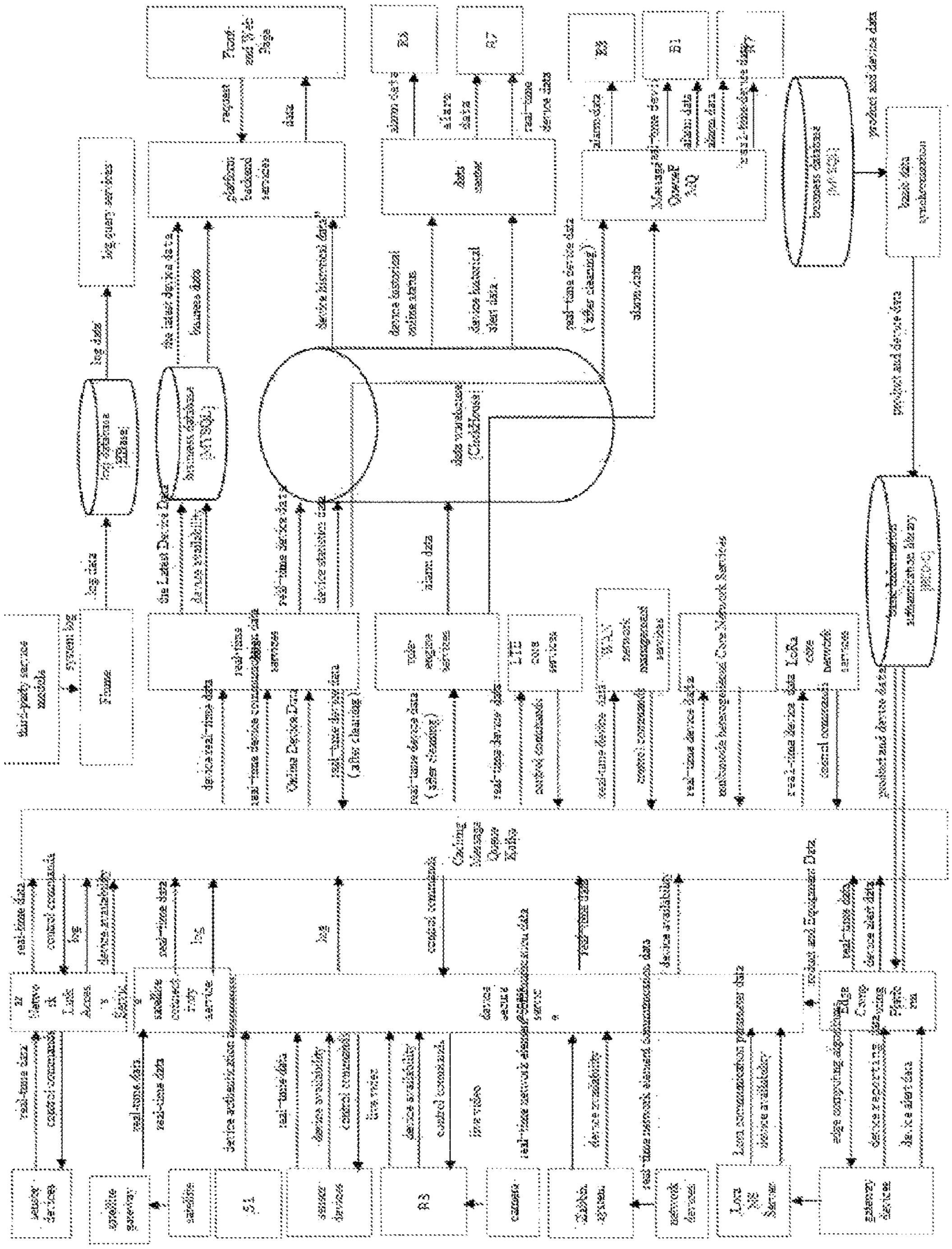
Figure 18:
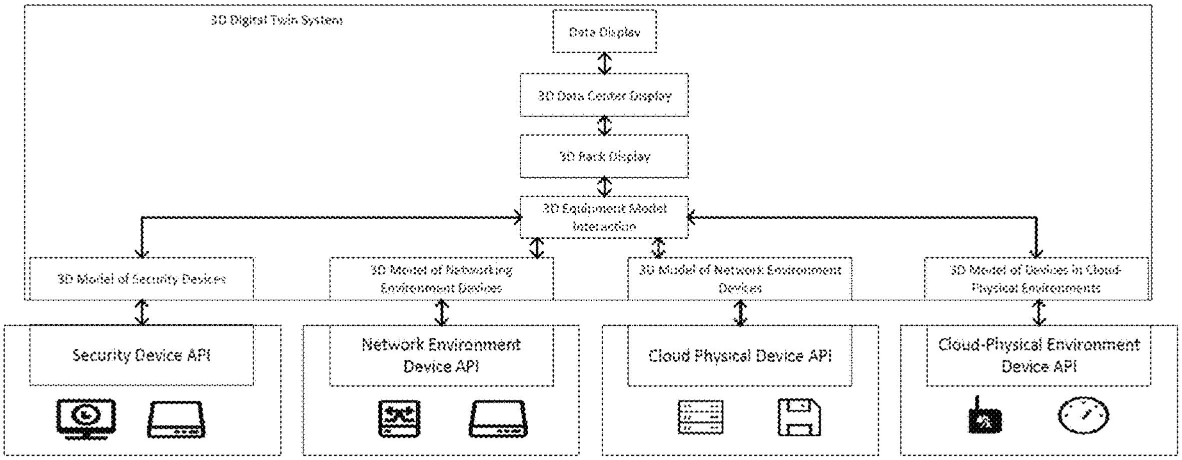

Further, as shown in FIG. 17, the multi-mode heterogeneous IoT perception platform is used to aggregate data at the terminal layer and the transmission layer, support device management at the terminal layer and the transmission layer, and provide multi-mode heterogeneous network services and edge computing services that dynamically adjust any communication parameters according to industry requirements and/or physical locations. Among them, the multimode heterogeneous network service not only provides separate access and management services for existing satellite links, cellular network links, RFID network management, LTE core network, WLAN network management, LoRa core network and other different network communications; it also provides wireless access services based on the multi-mode heterogeneous core network, and supports the converged access and unified management of multi-mode heterogeneous wireless networks. Multi-mode heterogeneous network services provide network services that dynamically adjust any communication parameters according to industry requirements or/and physical locations, such as source coding, channel coding, modulation model, signal unit time slot, transmission power and other physical communication parameters; wireless link access and management technologies that can be flexibly scheduled and flexibly expanded can perform functions such as remote device control, upgrade, parameter reading/modification, and management, support link self-healing, and provide high-utilization, strong stability, and easy-to-recover professional wireless network bearer services. For example, please refer to FIG. 13B and FIG. 14-2, which are schematic diagrams of multi-mode heterogeneous communication links in the next generation of the Internet of Things. As shown in the figures, the data is first sampled and processed, where the sampling interval can be set according to demand (such as sampling once every 1 minute or once every 1 second). Then the sampled data is A/D converted to convert the analog data into digital data, and the accuracy of the A/D conversion can also be set according to demand: it can be 8 bits, 12 bits, 16 bits, 24 bits, etc. The digital data is then sequentially encoded by the source encoder, channel encoded by the channel encoder, and digitally modulated by the digital modulator before being sent out through RF (radio frequency circuit). Source coding can be implemented based on one or more protocols, such as MPEG-1, MPEG-2, MPEG-4, H.263, H.264, H.26, etc. Channel coding types mainly include linear block code, convolutional code, concatenated code, Turbo code, and LDPC code, etc. Digital modulation methods include: FSK (frequency shift keying), QAM (quadrature amplitude modulation), BPSK (binary phase shift keying), etc. Multi-mode heterogeneous network provide network services that dynamically adjust any communication parameters according to industry requirements or/and physical location, such as source coding, channel coding, modulation model, signal time slot, transmission power and other physical communication parameters. For example, the transmitted RF signal can be adjusted by PA (determining the transmission power) and fn (determining the transmission frequency point).

The disclosed multi-mode heterogeneous wireless communication system enables dynamic, real-time adaptation of physical-layer and network-layer parameters to accommodate varying service demands across diverse access technologies. For example, transmission bandwidths are selectively allocated to different services based on the instantaneous quality-of-service (QOS) requirements and link conditions of connected terminals. When data transmission demands change for one or more terminals, the system responsively reallocates radio and network resources, including scheduling priority and bandwidth allocation across available RATs (e.g., LTE, 5G NR, LoRa, Wi-Fi).

Priority-based transmission is also supported. In certain scenarios, uplink signals from specific terminals, base stations, or gateways are prioritized for immediate transmission, based on predefined rules or real-time network analytics. The system employs cross-layer control and on-site sensing to adjust parameters such as transmission power, modulation, and coding scheme (MCS), and time slot assignments, ensuring the continuity of high-priority upper-layer services and maintaining robust overall network availability.

Further, the system supports dynamic stream separation and path selection. For instance, traffic may be segmented into multiple data streams, where one stream is transmitted via a 4G/LTE interface to the core network, another is offloaded to an edge computing module via LoRa, and a third is transmitted using a proprietary multi-mode protocol stack optimized for heterogeneous access. This radio transmission framework reduces unnecessary load on the core while ensuring latency-sensitive data is delivered via the most suitable path.

Edge computing nodes integrated with the heterogeneous system provide local, real-time adaptive control. These nodes manage resource distribution based on environmental conditions and service contexts—allocating differentiated QoS levels, including customized delays, bandwidth ranges, and time-frequency resources. In high-density use cases—such as environmental monitoring where hundreds of distributed sensors report concurrently—the edge intelligence schedules communication to avoid contention. It achieves this by deferring non-critical transmissions, activating parallel transmission links, or time-shifting uploads to prevent bottlenecks, all while preserving low-latency pathways for critical data.

In the present disclosure, the security management platform based on the multi-mode heterogeneous network security can provide security support for the data collection, data transmission, data processing and other steps of each terminal/device in the Internet of Things, and can solve any data security-related problems such as illegal intrusion, data leakage, and external attacks; the security system starts with the multi-mode heterogeneous network security and dynamically controls security from the root, rather than only ensuring security at the platform layer. The security management platform provided by the present disclosure is applied in the multi-mode heterogeneous system shown in FIG. 37, and interacts with the terminal layer (including various sensors, etc.), physical layer and communication layer (including base stations, gateways, etc.), and support layer (including data middle platform, core network, etc.) of the multi-mode heterogeneous system of this embodiment, so as to dynamically and linkage control the entire multi-mode heterogeneous system to ensure data security and communication security. The security management platform provided by an embodiment of the present disclosure is applicable to the scenario where any IoT device is securely connected to the cloud; it is applicable to securely connect to any type of third-party platform data, providing a secure channel and data tamper-proof function; it is applicable to be used in combination with multiple communication types, that is, to meet the needs of multi-mode heterogeneous networks; it is applicable to the scenario where IoT device data, user-generated data, and third-party access data are securely accessed and uploaded to the blockchain for protection. Combined with FIG. 19-1 and FIG. 19-4, the blockchain security management platform of this embodiment is divided into three components, namely security resources, security services, and security management. Among them, the security resource component includes a password resource pool, a key management system, a signature verification system, and a data encryption and decryption system. The password resource pool is pre-configured, and then the key management system, the signature verification system, and the data encryption and decryption system are established based on the password resources and encryption and decryption algorithm resources of the password resource pool. The security management component includes communication security, network security, data security, situational awareness, emergency response, knowledge graph, user management and other systems. Among them, communication security, network security, and data security provide situational awareness with security situation perception data; situational awareness analyzes the security situation; situational awareness provides the results to emergency response, and emergency response notifies relevant security personnel; then the entire security event is stored in the knowledge graph for storage and recording; the knowledge graph provides basis support for the configuration of communication security, network security, and data security to form a closed loop. The security service component includes lightweight authentication service, security authentication service, and blockchain service. The security service component provides security services to business systems and IoT terminals based on the security resource component and under the call management of the security management component.

Figures 1, 21:
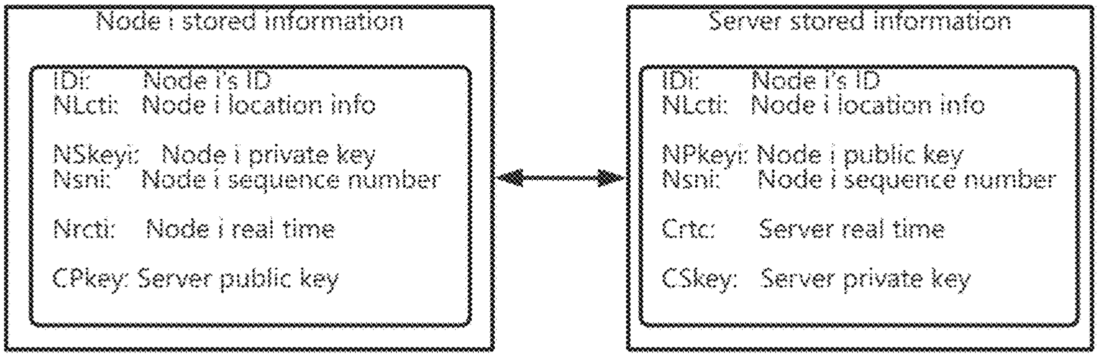
Figures 2, 21:
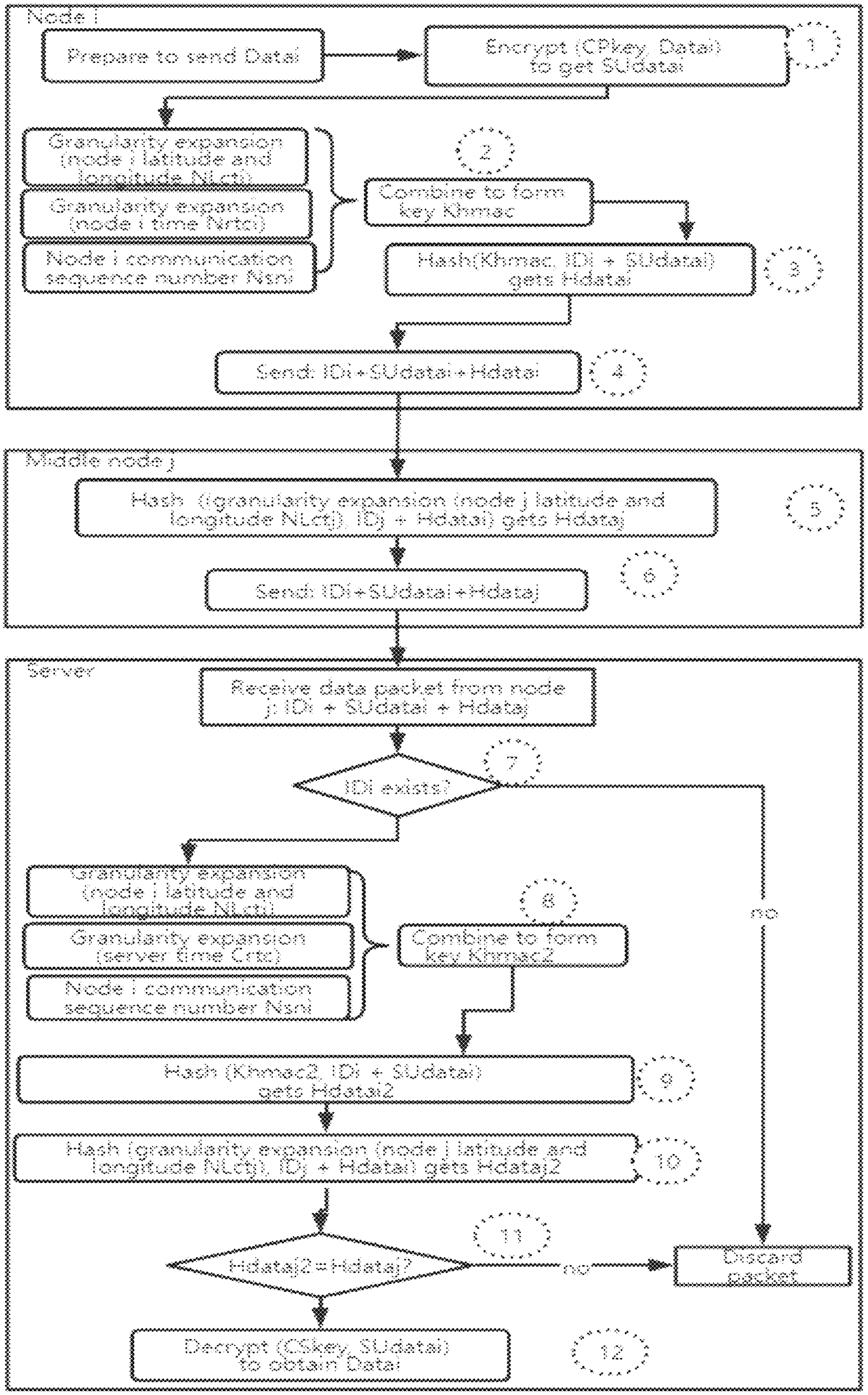

In this disclosure, combined with FIGS. 21-1 and 21-2, the problem of device key distribution and storage difficulties is solved. The blockchain security management platform uses the chain formed by existing terminals, gateways and base stations, and uses their locations (such as longitude, latitude, altitude and other coordinate data), communication parameter information, time information, data packet sequence information and other data to verify and encrypt the data. The receiver uses the corresponding information for reverse verification and decryption. The path (the path is defined by the geographical location information of the gateway through which the data passes) is converted into a key for encryption, and the receiver determines whether the data is legal by checking the path information. The receiver needs to know or collect the location information of the legal path or the legal path point (such as the gateway) in advance. It should be noted that the data transmission path is different, the decryption key is different, the next node knows the location information of the previous node, and the adjacent layer time uses different keys for encryption and decryption. Alternatively, decryption can be performed without the intermediate node, and the data can be transmitted to the server or the cloud after encryption layer by layer, and the server or the cloud performs multiple rounds of decryption on the data. Alternatively, only the first node performs encryption, and the intermediate nodes passed during transmission perform integrity check and summary superposition on the data. The server or cloud performs reverse integrity check according to the transmission path. After the check is passed, decryption is performed according to the first node information. The encryption process starts from the data source (perception terminal layer), runs through the communication layer/network layer, until the multi-mode heterogeneous core network layer, and then covers the support layer and application layer, rather than only ensuring security at the platform layer. Combined with FIG. 21-2, the first perception terminal at the terminal layer needs to transmit Datal data to the first server. The first perception terminal has a unique device ID1, HMAC1 key and public-private key pair {NPkey1, NSkey1}; the first server has a public-private key pair {CPkey, CSkeya}. The first perception terminal has a real-time clock and latitude and longitude location data, and sends data Datal to the first server at time T1 and location L1. The encryption process includes: ① using the server public key CPkey to encrypt T1 and Datal to obtain the ciphertext E1; ② using the private key NSkey1 to digitally sign ID1 and E1 to obtain the signature S1; ③ using the HMAC1 key to perform a hash operation on E1 and S1 to obtain the hash value H1; ④ sending the data ID1, E1, S1 and H1 to the first server, which is decrypted by the first server. As an embodiment, encryption can also be generated at the sensor terminal or gateway as needed.

In some embodiments, at each node of the transmission, a superposition hash algorithm can be performed on the data. After receiving the data packet, the server performs a hash algorithm on the sending node and the intermediate node information one by one to ensure the integrity and authenticity of the data. Continuing with the above example, in step ④, it also includes: the first sensing terminal sends the data ID1, E1, S1 and H1 to the first server through several communication nodes in turn, wherein the communication node can be a gateway, a base station, a communication relay and other devices involved in the communication. Each node performs a superposition hash algorithm on the data sent by the previous node: After node m receives the data IDn, En, Sn and Hn sent by node n, it obtains the real-time time Tm and location Lm. Then the hash value Hm is obtained through the hash algorithm. Finally, the data IDm, IDn, En, Sn and Hm are sent to the next communication node, and so on, and finally the data is sent to the server. The encryption method provided in the embodiment of the present disclosure ensures the confidentiality, integrity and availability of the data, and can resist common communication attacks. For example: The saboteur obtains data packets by monitoring the communication method. Since the data is encrypted at the source of the sensing terminal, the saboteur cannot easily obtain the original data, so he cannot know the content of the data, thus ensuring the confidentiality of the data; the integrity check value will be recalculated when the data packet passes through each node, and the receiving end will recalculate the integrity check value in the same way. Only when the data sender and all intermediate nodes are all correct can it pass. This operation not only ensures the integrity of the data but also ensures the non-repudiation of the communication node; the saboteur intercepts the data packet and resends the same data packet to the intermediate node (i.e., replay attack). Since the data uses the timestamp and serial number as the key fragment, the receiving end will fail in the integrity check and decryption and discard the data packet; if the saboteur uses the man-in-the-middle attack method and simulates himself as an intermediate node, since it is impossible to perform superimposed encryption and verification, any changes to the data cannot be verified by the receiving end.

In some other embodiments, the next generation of the Internet of Things over the physical layer optimized multi-mode cellular network may also include a security system, an operation and maintenance system, and a management system.

Figures 1, 19:
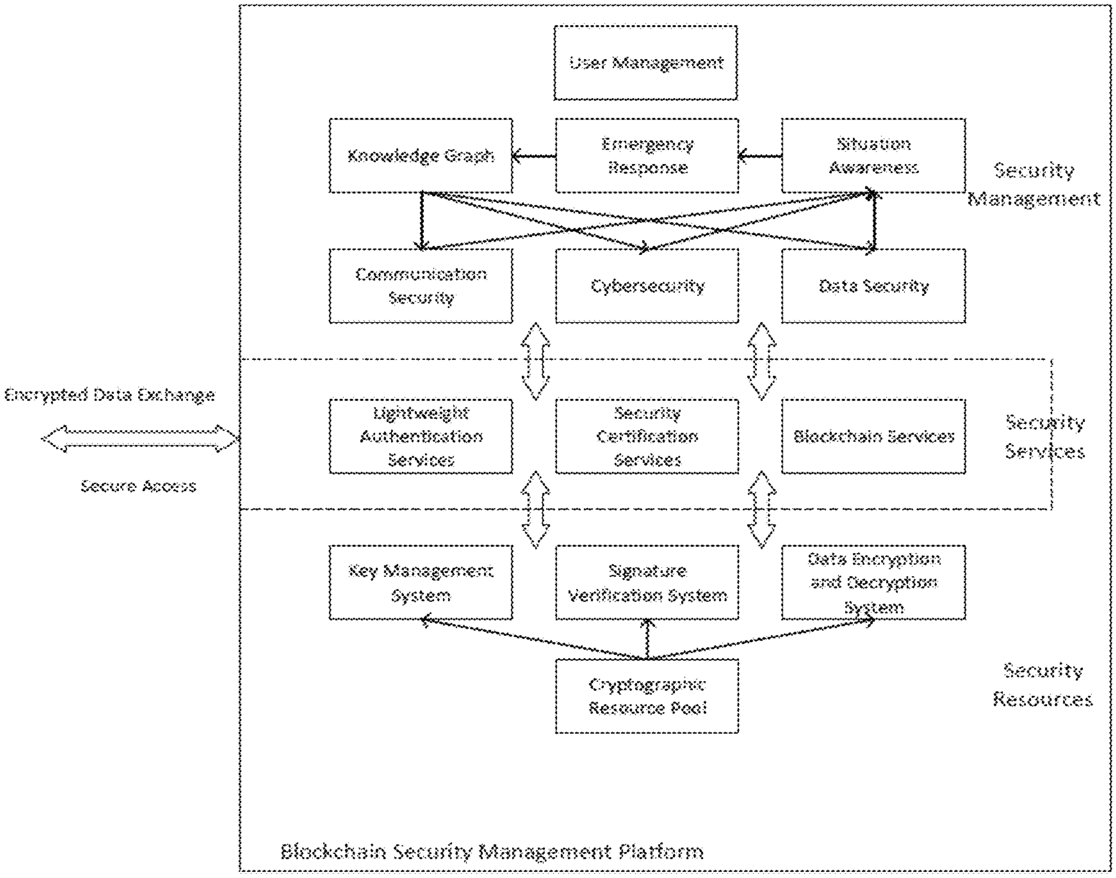
Figures 2, 19:
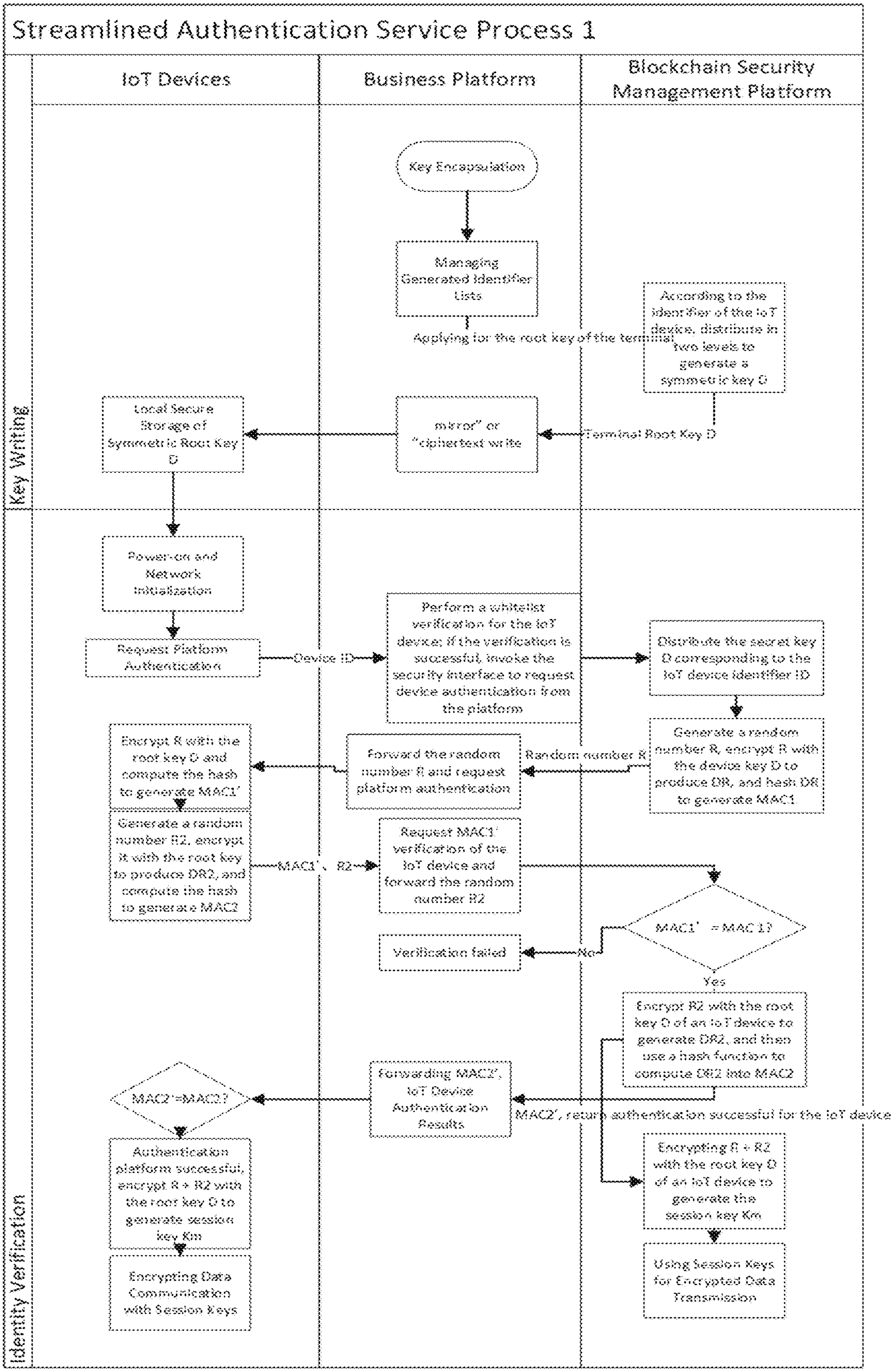
Figures 3, 19:
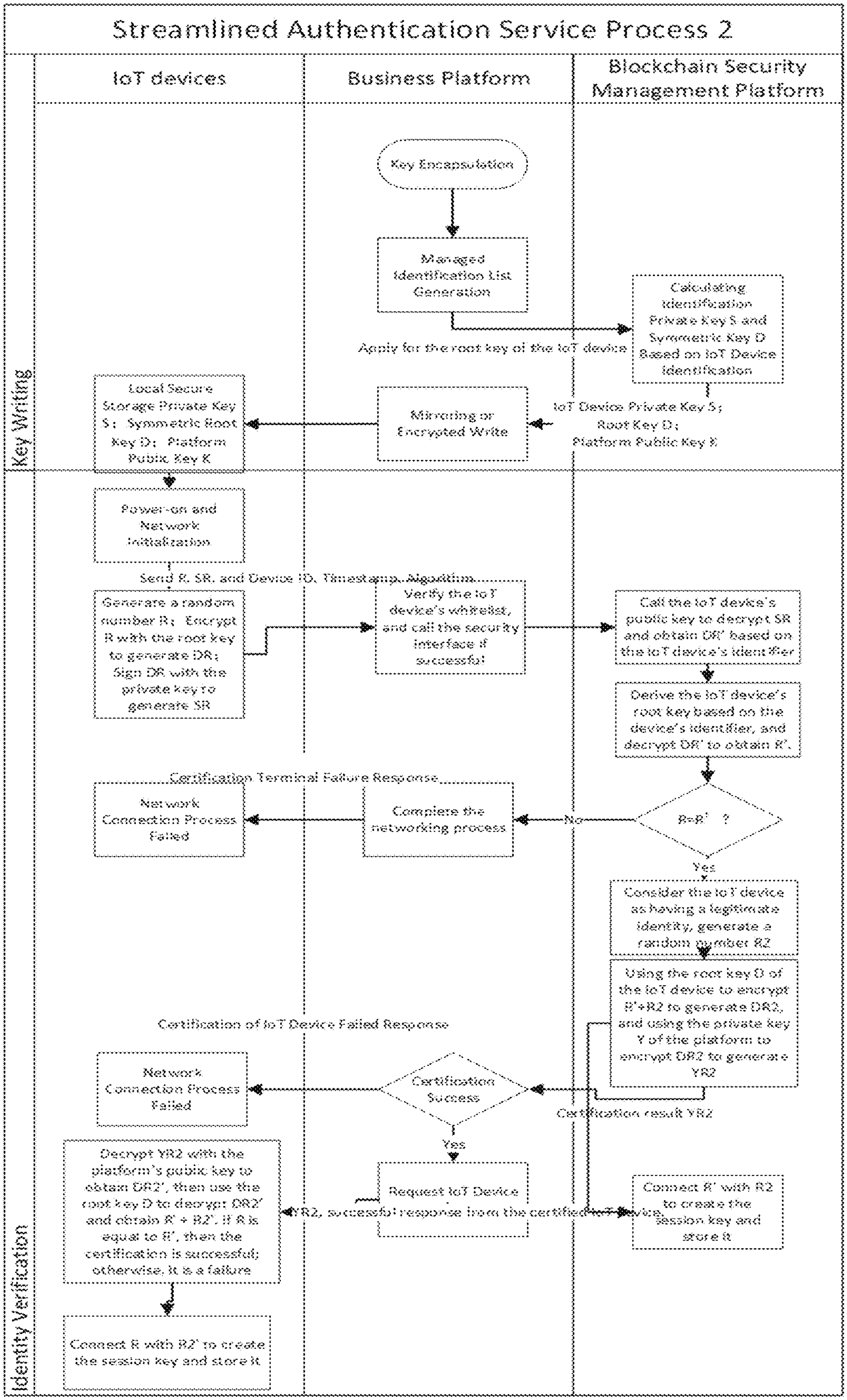
Figures 4, 19:
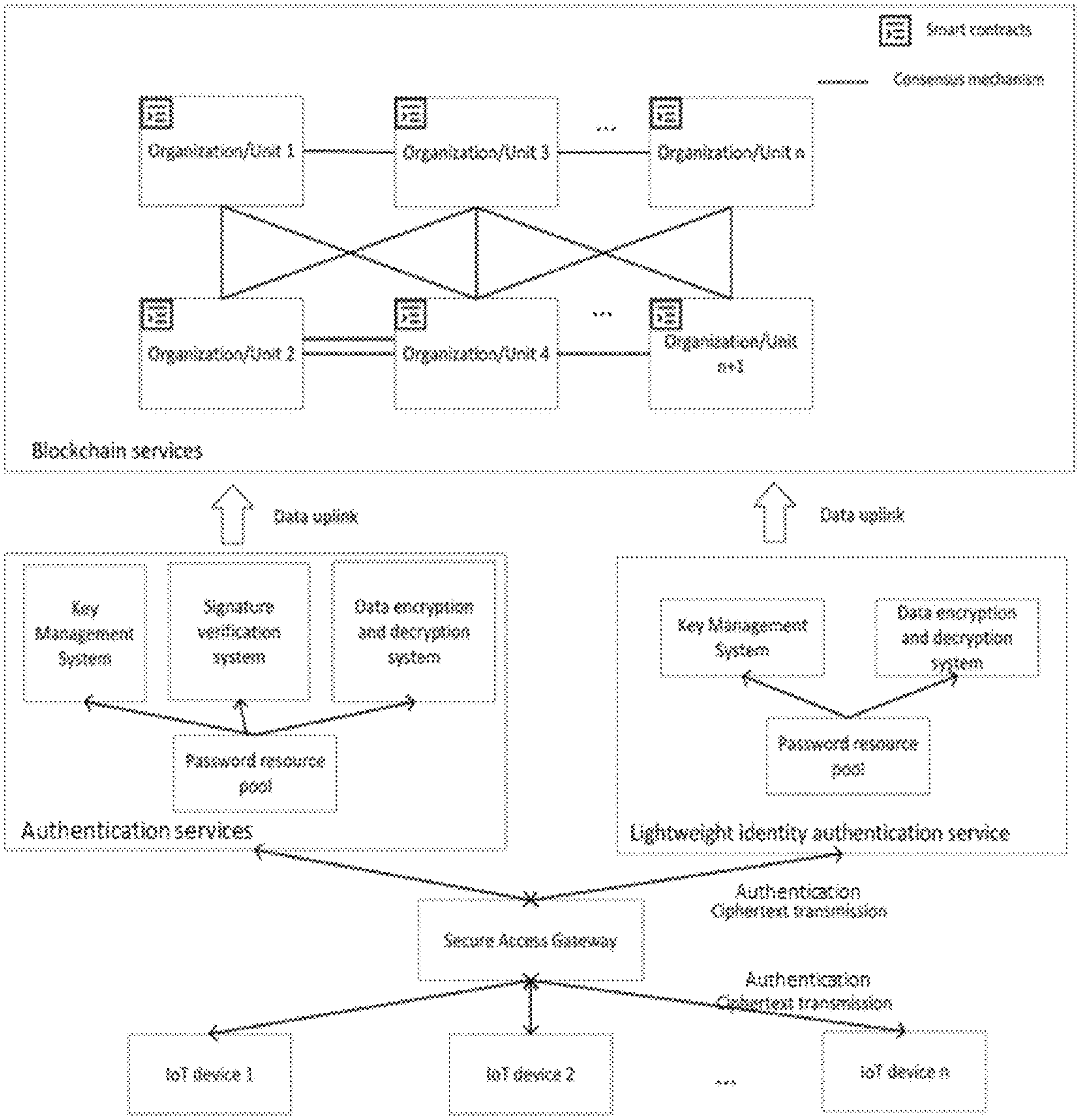
Figure 20:
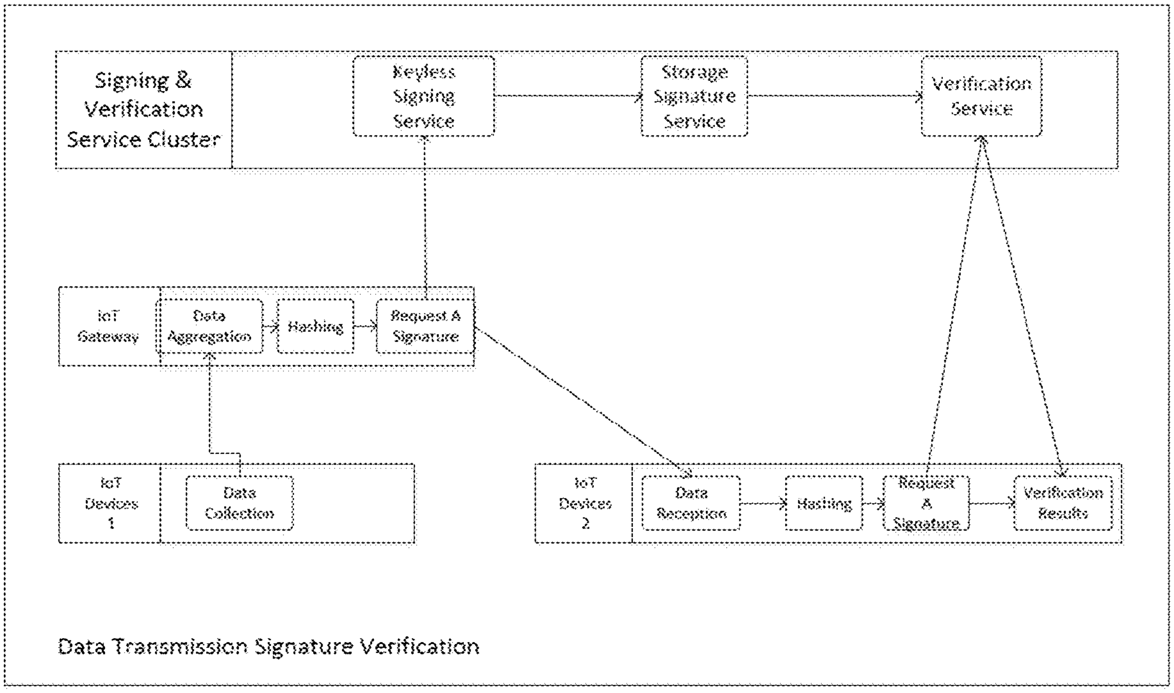

Among them, the security system can provide security support for the data collection, data transmission, data processing and other steps of each terminal/device in the Internet of Things, and can solve any data security-related problems such as illegal intrusion, data leakage, external attack, etc.; the security system starts with the security of multi-mode heterogeneous network, dynamically controls security from the root, rather than only ensuring security at the platform layer. FIG. 19-1 is a security system architecture diagram, FIG. 19-2 and FIG. 19-3 describe the lightweight authentication service process, and FIG. 19-4 describes the Internet of Things device security access & data chain process. The security management platform provided by the present disclosure interacts with the terminal layer (including various sensors, etc.), communication layer (including base stations, gateways, etc.), and support layer (including data middle platform, core network, etc.) of the multi-mode heterogeneous system, thereby dynamically and linkage-controlled the entire multi-mode heterogeneous system to ensure data security and communication security. The security management platform provided by an embodiment of the present disclosure is applicable to the scenario where any IoT device is securely connected to the cloud; it is applicable to securely connect to any type of third-party platform data, provide a secure channel and data anti-tampering function; it is applicable to be used in combination with multiple communication types, that is, to meet the needs of multi-mode heterogeneous networks; it is applicable to the scenario where IoT device data, user-generated data, and third-party access data are securely accessed and uploaded to the blockchain for protection. In this embodiment, the security management platform is divided into three components, namely security resources, security services, and security management. Among them, the security resource component includes a password resource pool, a key management system, a signature verification system, and a data encryption and decryption system. The password resource pool is pre-configured, and then the key management system, the signature verification system, and the data encryption and decryption system are established based on the password resources and encryption and decryption algorithm resources of the password resource pool. The security management component includes communication security, network security, data security, situational awareness, emergency response, knowledge graph, user management and other systems. Among them, communication security, network security, and data security provide situational awareness with security situation perception data; situational awareness analyzes security situation; situational awareness provides the results to emergency response, and emergency response notifies relevant security personnel; then the entire security incident is stored in the knowledge graph for storage and recording; the knowledge graph provides basis support for the configuration of communication security, network security, and data security to form a closed loop. The security service component includes lightweight authentication service, security authentication service, and blockchain service. The security service component provides security services to business systems and IoT terminals based on the security resource component and under the call management of the security management component. To solve the problem of device key distribution and storage difficulties.

In some embodiments, the blockchain security management platform provides a unified security management service. The security management vertically penetrates all horizontal layers (perception layer, communication layer, support layer to the top application layer) to provide a full-chain, end-to-end unified security service. FIG. 19-1 shows the architecture diagram of the blockchain security management platform. The blockchain security management platform uses the information of the transmission process to encrypt the transmitted data. The information of the transmission process may include: node location (such as latitude and longitude coordinate data), communication mode, time point, communication sequence number, communication path, frequency, bandwidth, and/or speed. The information used for encryption can also be various indicators/characteristics of the communication endpoint or various combinations of the above transmission information and communication endpoint characteristics. In the present disclosure, the blockchain security management platform uses the existing gateway chain, the gateway location (such as latitude and longitude coordinate data, the latitude and longitude information of the gateway is attached when the data is transmitted), communication protocol information and time information to encrypt the data. The receiver verifies the authenticity of the data by checking the location information, communication protocol information and time information. The path (the path is defined by the geographical location information of the gateway through which the data passes) is converted into a key for encryption, and the receiver determines whether the data is legal by checking the path information. The receiver needs to know or collect the legal path or the location information of the legal path point (such as the gateway) in advance. As an embodiment, the data transmission path is different, the decryption key is different, the next node knows the location information of the previous node, and encrypts and decrypts layer by layer: the next node decrypts the previous node, and then transmits it to the next node after decryption. Alternatively, it is also possible not to decrypt during node transmission, but to transmit to the server or cloud after encryption layer by layer, and decrypt by the server or cloud. The method of using the key solves the problem of difficult key distribution and storage of terminal devices, intermediate nodes (such as terminals, relays, routers, etc. as network nodes), and gateways/base stations. At the same time, the encryption process ensures data security from the source of the terminal data, runs through the multi-mode heterogeneous core network of the network layer/communication layer and the support layer, and provides secure data transmission for other modules of the support layer and the application layer, rather than only ensuring security at the platform layer.

For example, the first perception terminal of the terminal layer needs to transmit Datal data to the first server. The first perception terminal has a unique device ID1, HMAC1 key and public-private key pair {NPkey1, NSkey1}; the first server has a public-private key pair {CPkey, CSkeya}. The first perception terminal has a real-time clock and longitude and latitude location data, and sends data Datal to the first server at time T1 and location L1. The encryption process includes: ① using the server public key CPkey to encrypt T1 and Datal to obtain the ciphertext E1; ② using the private key NSkey1 to digitally sign ID1 and E1 to obtain the signature S1; ③ using the HMAC1 key to perform a hash operation on E1 and S1 to obtain the hash value H1; ④ sending the data ID1, E1, S1 and H1 to the first server, which is decrypted by the first server. As an embodiment, encryption can also be generated at the sensor terminal or gateway as needed. FIG. 21-2 shows the process of sending data by the node through encryption and decryption.

In some embodiments, each node in the transmission can perform a superposition digest algorithm on the data. After receiving the data packet, the server performs a digest algorithm on the sending node and the intermediate node information one by one to ensure the integrity and authenticity of the data. Continuing with the above example, in step ④, it also includes: the first sensing terminal sends data ID1, E1, S1 and H1 to the first server through several communication nodes in turn, wherein the communication node can be a gateway, a base station, a communication relay and other devices participating in the communication. Each node performs a superposition digest algorithm on the data sent by the previous node: after node m receives the data IDn, En, Sn and Hn sent by node n, it obtains the real-time time Tm and the location Lm. Then the hash value Hm is obtained by the digest algorithm, and finally, the data IDm, IDn, En, Sn and Hm are sent to the next communication node, and so on, and finally the data is sent to the server. The encryption method provided by the embodiment of the present disclosure ensures the confidentiality, integrity and availability of the data, and can resist common communication attack methods. For example: The saboteur obtains data packets by monitoring the communication method. Since the data is encrypted at the source of the sensing terminal, the saboteur cannot easily obtain the original data, so he cannot know the content of the data, thus ensuring the confidentiality of the data; the integrity check value will be recalculated when the data packet passes through each node, and the receiving end will recalculate the integrity check value in the same way. Only when the data sender and all intermediate nodes are all correct can it pass. This operation not only ensures the integrity of the data but also ensures the non-repudiation of the communication node; the saboteur intercepts the data packet and resends the same data packet to the intermediate node (i.e., replay attack). Since the data uses the timestamp and serial number as the key fragment, the receiving end will fail in the integrity check and decryption and discard the data packet; if the saboteur uses the man-in-the-middle attack method and simulates himself as an intermediate node, since it is impossible to perform superimposed encryption and verification, any changes to the data cannot be verified by the receiving end.

FIG. 22-1 is a flow chart of a method for intelligently switching the operation of a security system in an embodiment of the present invention, and the method specifically includes the following steps:

- S100, obtaining the attribute information of the current transmission link, calculating the weight and entropy value of the attribute information of the current transmission link, and obtaining the link evaluation entropy value of the current transmission link;
- S200, obtaining the transmission data of the current transmission link, performing probability calculation on the transmission data of the current transmission link, and obtaining the transmission information entropy value of the current transmission link;
- S300, selecting the best security system of the current link from a variety of preset security systems according to the link evaluation entropy value, transmission information entropy value and security system strategy of the current transmission link;
- S400, switching and running the best security system, and performing secure communication on the current transmission link.

In this embodiment, when switching the best security system, the attribute information and transmission information of the transmission link are obtained at the same time, and the corresponding link evaluation entropy value and transmission information entropy value are calculated according to the attribute information and transmission information of the transmission link, respectively, and the best security system of the current transmission link is selected according to the link evaluation entropy value, transmission information entropy value and security system strategy, and the security system is switched.

Specifically, the attribute information of the current transmission link is obtained, wherein the attribute information includes: bandwidth, bandwidth occupancy, bit error rate, packet loss rate, signal-to-noise ratio, bit rate (bit/s), baud rate (baud), frequency utilization (bit/s.hz), protocol efficiency, communication efficiency, channel occupancy, amplitude-frequency characteristics, phase-frequency characteristics, communication model constants, communication model correction variables, etc. The entropy method is used to calculate the weight and entropy value of the attributes of the current transmission link to obtain the link evaluation entropy value of the current transmission link. The transmission information contained in the current transmission link is obtained, and the Shannon entropy calculation method is used to calculate the probability of the transmission data of the current transmission link to obtain the transmission information entropy value of the current transmission link. According to the obtained link evaluation entropy value, transmission information entropy value and pre-set security system strategy, the best security system suitable for the current link is selected from multiple preset security systems, and a switching instruction is issued according to the selected best security system, and the best security system is switched to and operated, and after the switch, secure communication is performed on the transmission link.

Further, as shown in FIG. 22-2, this embodiment supports the storage of security identity key information of multiple security systems. For example, the public and private key storage function of the asymmetric security system, the private key and certificate storage function of the certificate security system, the root key and application key storage function of the symmetric security system, etc., support the storage of key identity data of all security systems. Support the storage of identity information of international symmetric algorithms and asymmetric algorithms, and support the storage of identity information of national secret symmetric algorithms and asymmetric algorithms SM series. Identity information includes information such as the unique ID code of the device, symmetric algorithm keys, symmetric algorithm public and private keys, certificates, and private keys in various formats to ensure the legitimacy of the identity. Support the operation of asymmetric security systems, certificate security systems, and symmetric security systems. In the present invention, the security system runs in the device in the form of SDK or in the form of a separate function. Call the security SDK to provide identity authentication interfaces, encryption and decryption interfaces, identity management interfaces, and system support interfaces. Support the applicability of international symmetric algorithms and asymmetric algorithms, and also support national secret symmetric algorithms and asymmetric SM series algorithms. Support the operation of multiple security systems.

In one embodiment, before step S100, it also includes:

- obtaining different attribute information of different transmission links, calculating weights and entropy values for the attribute information of the different transmission links, and obtaining link evaluation entropy values of each transmission link;
- obtaining different transmission data of different transmission links, performing probability calculation on the transmission data of the different transmission links, and obtaining transmission information entropy values of each transmission link;
- determining the best transmission link as the current transmission link according to the link evaluation entropy value, transmission information entropy value and link selection strategy of each transmission link.

In this embodiment, different attribute information of all different transmission links is obtained, and weights and entropy values are calculated according to the attribute information of different transmission links to obtain link evaluation entropy values of each transmission link, and different transmission data of different transmission links are obtained, and the transmission information entropy values of different transmission links are calculated according to the formula:

$$H(X) = -\sum_{i=1}^{n} p(xi)\log(p(xi)).$$

Among them, xi represents multiple transmission data information for pre-transmission, and p (xi) represents the probability of occurrence of the content described by each data information. If the probability of the content of the transmission data appearing is high, then its p (xi) is also high, and if the probability of the content of the transmission data appearing is low, then its p (xi) is also low. For example, if the probability of a monitoring data being normal is 0.9995, then its p (xi) is very large, and the corresponding entropy value is very small; if the probability of this monitoring data being abnormal is 0.0005, then its p (xi) is very small, and the corresponding entropy value is very large. After calculating the entropy value of the transmission information, the expectation of the security of the data transmission can be obtained according to the entropy value. The best transmission link is selected based on the link evaluation entropy value and the link optimization strategy, and is used as the current transmission link. The entropy method is used to evaluate the transmission link situation, which is used as the input parameter of the link optimization strategy. All links are sorted and the best transmission link is selected. The link sorting can be weight sorting, direct sorting, reverse sorting, algorithm sorting, etc.

In one embodiment, the link evaluation entropy value of the transmission link is obtained by the following steps:

- Performing dimensionless processing on the attribute information of the transmission link, and
- calculating the proportion of each sample index value in the attribute information;

According to the proportion of each sample index value, the weight matrix of the transmission link attribute is obtained; The entropy value and difference degree of the transmission link attribute are defined, and the weight of the transmission link attribute is calculated according to the entropy value and difference degree of the transmission link attribute; According to the weight and weight matrix of the transmission link attribute, the link evaluation entropy value of the transmission link is obtained.

In this embodiment, attribute information of the transmission link is collected, dimensionless processing is performed on the attribute information, and the proportion of each sample index value in each attribute information is calculated according to the processed attribute information. For example, according to the formula $$f_{ij} = \frac{x_{ij}}{\sum_{i}^{m} x_{ij}},\ 0 \le x_{ij} \le 1,$$

the proportion of the i-th sample index in the j-th transmission link attribute is calculated, and the proportion matrix $$F = \begin{pmatrix} f_{11} & \cdots & f_{1n} \\ \vdots & \ddots & \vdots \\ f_{m1} & \cdots & f_{mn} \end{pmatrix}$$

of the transmission link attribute is calculated according to the proportion of each sample index value, and the entropy value of the transmission link attribute is defined. For example, according to formula $$e_j = -k\sum_{i}^{m} f_{ij}\ln f_{ij},\ k > 0,\ k = \frac{1}{\ln m},\ e_j = -\frac{1}{\ln m}\sum_{i}^{m} f_{ij}\ln f_{ij},$$

define the entropy value of the j-th transmission link attribute, and define the degree of difference of the transmission link attribute, for example, define the degree of difference of the j-th transmission link attribute according to the formula $$d_j = 1 - e_j,$$

calculate the weight of the transmission link attribute according to the entropy value and degree of difference of the transmission link attribute, that is, calculate the weight of the j-th transmission link attribute according to the formula $$w_j = \frac{d_j}{\sum_{j=1}^{n} d_j}$$

obtain the link evaluation entropy value of the transmission link according to the weight and weight matrix of the transmission link attribute, and calculate the link evaluation entropy value of the transmission link according to the formula $$F_i = \sum_{j=1}^{n} w_j f_{ij}.$$

In one embodiment, the step S300 includes:

- Inputting the link evaluation entropy value and the transmission information entropy value of the current transmission link as input parameters into the security system strategy;
- Judging whether the link evaluation entropy value and the transmission information entropy value meet the preset conditions of multiple preset security systems according to the security system strategy;
- Selecting the best security system for the current link from multiple preset security systems based on the judgment result.

In this embodiment, as shown in FIG. 23, the link evaluation entropy value and the transmission information entropy value of the current transmission link are input as input parameters into the strategy of the security system. The security system strategy comprehensively judges whether the preset conditions of the preset security system are met based on the link evaluation entropy value and the transmission information entropy value. If the link evaluation entropy value and the transmission information entropy value meet the preset conditions of multiple preset security systems, the best security system of the current link is selected for switching among the multiple preset security systems according to the security system optimization strategy. Multiple security systems have stronger device adaptability than a single security system.

In one embodiment, the step S400 includes:

Initiating identity authentication and switching security systems, using the best security system to send an identity authentication request to perform verification and identity verification of the best security system;

When the verification and identity verification pass, a secure connection is established on the current transmission link for secure communication.

In this embodiment, as shown in FIG. 24, all security systems are prioritized, after the original security system is disconnected or fails, the security system with the highest priority is switched to, identity authentication is initiated, the best security system is used to send an identity authentication request, and the security configuration is checked to see if it is a symmetric security system policy for the device. If the policy does not match, the request fails to be received and returned; if the policy matches, the validity of the device symmetric key is checked, if the key is valid, a secure link is established on the current transmission link, and secure communication is performed; if the key is invalid, the request fails to be received and returned, and a symmetric security system is used to perform identity authentication requests, check whether it meets the policy, and whether the asymmetric key and certificate are valid.

Among them, the access platform supports the operation of multiple security systems, including but not limited to symmetric algorithm security systems, asymmetric algorithm security systems, and certificate security systems. Algorithms include but are not limited to international algorithms RSA, AES, and national secret algorithms SM series. The management records meet the security system requirements, support all authentication methods, including one-way authentication or two-way authentication, support record authentication strategies, including single authentication or multiple identity authentication, and determine whether the security system of the current link access meets the management records. If it meets the management records, the identity authentication, key exchange, and data transmission of the security system are completed in cooperation.

Furthermore, the secure connection between the device and the secure access platform can also be extended to the secure connection between the secure platform and the secure platform or between the secure device and the secure device; both the secure device and the secure platform support the switching capability of the security system. The security device initiates identity authentication and initiates the switching of the security system, and the secure access platform verifies the security system and verifies the identity. The functions of the security device and the secure access platform can also be interchanged, and the secure access platform initiates identity authentication and initiates the switching of the security system, and the security device verifies the security system and verifies the identity.

In one embodiment, after the step S400, it also includes:

If the current secure connection is disconnected or fails, all preset security systems are prioritized according to the link evaluation entropy value and the transmission information entropy value of the current transmission link;

Switch to the security system with the highest current priority according to the priority ranking.

In this embodiment, as shown in FIG. 25, after the current transmission link fails or is disconnected, all security systems that meet the preset conditions are prioritized according to the evaluation entropy value of the current link, the transmission information entropy value and the security system policy, and the ranking includes weight ranking, direct ranking, reverse ranking and algorithm ranking. Select the best security system for switching according to the priority ranking. The best security system selection is more reasonable than a fixed security system, improves security efficiency, and provides the strongest protection with the least resources.

In one embodiment, after step S400, it also includes:

Determine whether the current transmission link fails. If so, re-determine and switch to the best transmission link;

Select an optimal security system for secure communication based on the attribute information and transmission data of the new best transmission link.

In this embodiment, as shown in FIG. 25, determine whether the current transmission link fails. If the current link fails, select the best transmission link for switching based on the link selection strategy. After switching the transmission link, select the best security system based on the attribute information and transmission data of the current transmission link. After switching the security system, the transmission link and the security access platform perform identity authentication, key exchange, and data security transmission. The function of automatically switching the security system and establishing a secure connection based on the switching of the transmission link realizes the security guarantee of the closed-loop transmission link. The intelligent switching security system is more robust than a single security system, reduces the human capital of on-site maintenance equipment, and increases the self-recovery ability of the equipment.

Another embodiment of the present invention provides a device for operating an intelligent switching security system, as shown in FIG. 26-1, including:

A first calculation unit 11, which obtains the attribute information of the current transmission link, calculates the weight and entropy value of the attribute information of the current transmission link, and obtains the link evaluation entropy value of the current transmission link;

A second calculation unit 12, which obtains the transmission data of the current transmission link, performs probability calculation on the transmission data of the current transmission link, and obtains the transmission information entropy value of the current transmission link;

A system selection unit 13, which is used to select the best security system for the current link from a variety of preset security systems according to the link evaluation entropy value, transmission information entropy value and security system strategy of the current transmission link;

A system switching unit 14, which is used to switch and run the best security system and perform secure communication on the current transmission link.

The first calculation unit 11, the second calculation unit 12, the system selection unit 13 and the system switching unit 14 are connected in sequence. The unit referred to in the present invention refers to a series of computer program instruction segments that can complete specific functions, which are more suitable for the execution process of the intelligent switching security system than the program. For the specific implementation of each unit, please refer to the corresponding method embodiment above, which will not be repeated here.

Another embodiment of the present invention also provides a system for the operation of an intelligent switching safety system. As shown in FIG. 26-2, the system 10 includes:

One or more processors 110 and a memory 120. FIG. 26-2 takes a processor 110 as an example for introduction. The processor 110 and the memory 120 can be connected via a bus or other means. FIG. 26-2 takes the connection via a bus as an example.

The processor 110 is used to complete various control logics of the system 10. It can be a general-purpose processor, a digital signal processor (DSP), an application-specific integrated circuit (ASIC), a field programmable gate array (FPGA), a single-chip microcomputer, an ARM (Acorn RISC Machine) or other programmable logic device, a discrete gate or transistor logic, a discrete hardware component, or any combination of these components. In addition, the processor 110 can also be any conventional processor, microprocessor or state machine. The processor 110 can also be implemented as a combination of computing devices, for example, a combination of a DSP and a microprocessor, multiple microprocessors, one or more microprocessors combined with a DSP, and/or any other such configuration.

The memory 120, as a non-volatile computer-readable storage medium, can be used to store non-volatile software programs, non-volatile computer executable programs and modules, such as program instructions corresponding to the method for running the intelligent switching safety system in the embodiment of the present invention. The processor 110 executes various functional applications and data processing of the system 10 by running the non-volatile software programs, instructions and units stored in the memory 120, that is, the method for running the intelligent switching safety system in the above method embodiment is realized.

The memory 120 may include a program storage area and a data storage area, wherein the program storage area may store an operating system and an application required for at least one function; the data storage area may store data created according to the use of the system 10, etc. In addition, the memory 120 may include a high-speed random access memory, and may also include a non-volatile memory, such as at least one disk storage device, a flash memory device, or other non-volatile solid-state storage device. In some embodiments, the memory 120 may optionally include a memory remotely arranged relative to the processor 110, and these remote memories may be connected to the system 10 via a network. Examples of the above network include, but are not limited to, the Internet, an intranet, a local area network, a mobile communication network, and combinations thereof.

One or more units are stored in the memory 120, and when executed by one or more processors 110, the method for operating the intelligent switching safety system in any of the above method embodiments is executed, for example, the method steps S100 to S400 in FIG. 22-1 described above are executed.

As an example, the non-volatile storage medium can include a read-only memory (ROM), a programmable ROM (PROM), an electrically programmable ROM (EPROM), an electrically erasable ROM (EEPROM), or a flash memory. The volatile memory can include a random access memory (RAM) as an external cache memory. By way of illustration and not limitation, RAM can be obtained in many forms such as synchronous RAM (SRAM), dynamic RAM, (DRAM), synchronous DRAM (SDRAM), double data rate SDRAM (DDRSDRAM), enhanced SDRAM (ESDRAM), Synchlink DRAM (SLDRAM), and direct Rambus RAM (DRRAM). The disclosed memory components or memories of the operating environment described herein are intended to include one or more of these and/or any other suitable types of memory.

In summary, the present invention integrates a method, device, system and medium for intelligent switching of security system operation with the physical layer optimized multi-mode cellular network and/or IoT network, wherein the method obtains attribute information and transmission data of the current transmission link; calculates weights and entropy values of the attribute information, and performs probability calculation on the transmission data to obtain link evaluation entropy value and transmission information entropy value of the current transmission link; selects the best security system for the current link from a variety of preset security systems according to the link evaluation entropy value, transmission information entropy value and security system strategy of the current transmission link; switches and runs the best security system to perform secure communication on the current transmission link. The present invention calculates the transmission link evaluation entropy value and the transmission information entropy value, and when the transmission link needs to switch the security system, selects the best security system from a variety of preset security systems according to the link evaluation entropy value, transmission information entropy value and security system strategy to switch and perform secure communication.

FIG. 27 is a framework diagram of an intelligent bit rate switching wireless intercom system, which can also be integrated or applied in the physical layer optimized multi-mode cellular networks and/or IoT network. The electronic terminal can include an intelligent bit rate switching wireless intercom system, wherein the intercom system is specifically described as follows:

1) The intercom system is composed of multiple functional modules, each of which may include corresponding hardware and software, including communication module, speech extraction module, speech reproduction module, positioning and location module, speech sampling and playback module, control module, etc.;
2) The communication module supports at least one communication mode and can dynamically adjust the communication parameters to switch freely between high-speed short-distance and low-speed long-distance. The adjustment of communication parameters can be achieved using multiple configurations of one communication mode, or using different communication modes;
3) The speech extraction module supports speech compression algorithms with different bit rates, and also supports pronunciation recognition and speech-to-text conversion. Among them, pronunciation recognition can identify and extract pronunciation, intonation, timbre, speech speed and other information. Information;
4) The voice reproduction module supports the corresponding decompression algorithms of different bit rates, and also supports the pronunciation synthesis algorithm and the text-to-speech algorithm;
5) The positioning and location module supports satellite positioning or other positioning methods, and optionally includes geographic location data, such as whether there is any obstruction nearby, what the obstruction is, etc.;

6) The voice sampling and playback module is used to sample the analog voice signal into a digital signal, and convert the digital signal into an analog voice signal;

7) The control module controls the operation of the entire system. Of course, the system also includes a user interface module, a power management module, etc., and the optional system also includes an encryption module;

Further, the workflow of the intercom system is as follows:

1) The two parties in the intercom first establish a connection through multi-mode communication and evaluate the link environment through wireless connection; 2) The two parties can also exchange positioning information to assist in evaluating the link environment of both parties to ensure that the link has a certain margin; 3) When one party initiates an intercom request, the two parties negotiate which voice model to use based on the link environment and start intercom; 4) During the intercom process, the two parties keep detecting the link status. When the wireless environment changes significantly, they renegotiate the voice model to use; specifically, when the link is good and supports higher communication bandwidth, a normal compression algorithm is used. On the contrary, when the link is poor and only supports low-bandwidth communication bandwidth, a pronunciation compression algorithm or text transmission of voice information is used;

Thus, in this embodiment, by using a variable transmission rate, the communication distance and anti-interference ability between intercom devices are improved, so that the intercom devices have stronger environmental adaptability; secondly, the adaptive voice compression rate allows the device to achieve the best intercom effect in any use environment.

Further, the low-power multi-mode heterogeneous positioning system in the present invention can use the narrowband intercom solution in the above embodiment (intelligent bit rate switching wireless intercom system), and the electronic terminal in the low-power multi-mode heterogeneous positioning system can send an SOS request after entering the SOS mode. The server can establish a narrowband call or intercom with the electronic terminal through the gateway, and infer the actual available bandwidth according to the communication situation between the electronic terminal and the gateway. Then, the different voice compression bit rates in the intelligent bit rate switching wireless intercom system are used to achieve reliable calls.

Furthermore, when the low-power multi-mode heterogeneous positioning system of the present invention is deployed, it can only provide network to some multi-mode gateways. Other nearby multi-mode gateways can be interconnected with the multi-mode gateways with network through high-frequency transceiver modules. The multi-mode gateway without network in the middle can also be used as a wireless relay for the multi-mode gateway without network at a longer distance to achieve data transmission between the multi-mode gateway at a longer distance and the multi-mode gateway with network.

It can be understood that in order to achieve gateway coverage in a specified area, due to working conditions, the gateway installation points in the low-power multi-mode heterogeneous positioning system of the present invention cannot all have networking capabilities, and the use of gateways as relays has a large delay, which is not suitable for applications with high real-time requirements such as voice.

Therefore, in an optional embodiment of the present invention, a low-power hybrid mode wireless relay system can be used. The system (as shown in FIG. 28, which is a framework diagram of the low-power hybrid mode wireless relay system) is used to achieve complete coverage of the designated area. The advantage of using the low-power hybrid mode wireless relay system is that, compared with the multi-mode gateway in the low-power multi-mode heterogeneous positioning system, the low-power hybrid mode wireless relay system increases coverage without network access while also ensuring low latency.

Wherein, the specific description of the wireless relay system is as follows:

The system is roughly composed of the following parts: antenna and duplexer, amplifier, transceiver and control module; under this composition, the system supports two low-power relay modes (relay mode 1 and relay mode 2);

Relay Mode 1:

A1) The control module turns off the power supply of the amplifier and turns on the receiving function of transceiver 1 to monitor the carrier signal;

A2) When the carrier signal is detected, the control module turns on the amplifier 1 and directly amplifies and forwards the signal of the corresponding antenna and band;

A3) When the data packet is sent and the carrier signal disappears, the control module turns off the amplifier 1 to save power;

A4) Preferably, after receiving the carrier signal, the transceiver 1 starts demodulation and the protocol engine at the same time, and turns off the amplifier 1 after receiving the complete data packet. If there is an error in the data packet receiving process, the amplifier 1 can be turned off in advance;

Relay Mode 2:

B1) Transceiver 1 turns on the low-power monitoring mode. Once the carrier signal is detected, the signal is demodulated immediately, and the demodulated data stream is sent to the modulation input end of transceiver 2;

B2) The debug input signal is further processed by transceiver 2 and sent out. The sent signal can be used and received. The same frequency point can also be used for different frequencies;

B3) The received carrier signal disappears, and the control module turns off the transmission of transceiver 2 to save power consumption;

B4) Preferably, after receiving the carrier signal, transceiver 1 starts demodulation and the protocol engine at the same time and turns off transceiver 2 after receiving the complete data packet. If there is an error in the data packet reception process, transceiver 2 can be turned off in advance;

In this way, by using symmetrical antennas and duplexers, transceivers and amplifiers, the system supports two-way wireless relay;

In this embodiment, the power consumption of the relay can be effectively reduced. For example, if solar power is required, a smaller solar panel can be used, or it can be used in places with poor lighting; the above two optimization methods both have low latency characteristics, generally do not affect the communication protocol, and can make the devices on both sides of the repeater communicate without feeling.

Figure 30:
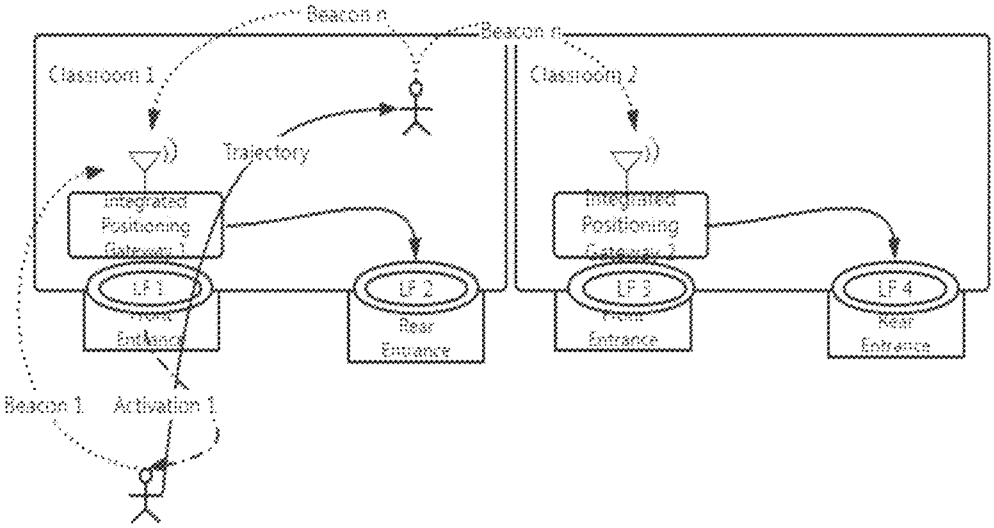

Further, based on FIG. 30, this embodiment further describes its application scenario to determine the location of the terminal in the adjacent room:

1) Low-frequency wake-ups are installed at the doors of all classrooms, and the coverage areas of the low-frequency wake-ups do not overlap. The terminal enters classroom 1 from the front door and is awakened by low frequency 1. The terminal sends beacon 1, which means that the electronic terminal enters, leaves or passes through the front door of classroom 1;

2) After entering the classroom, the electronic terminal sends beacon n at a certain time interval, and multiple beacons are received by gateway 1, so it can be determined that the electronic terminal is in classroom 1. The beacon may also be received by gateway 2 installed in classroom 2 at the same time, and its signal strength may be stronger than that of gateway 1, but since the electronic terminal was awakened by low frequency 1 for the last time, it can still be determined that the terminal exists in classroom 1;

3) It can also be used to identify areas such as entering and exiting teaching buildings and stairs. A low-frequency exciter is installed at the entrance of the teaching building. When the terminal passes by the entrance of the teaching building, it is awakened and sends a beacon, but it cannot be determined whether the terminal enters or leaves the teaching building. If the terminal's beacon is received by the gateway installed in the building (corridor entrance, classroom) after a period of time, it can be determined that the terminal has entered the teaching building. If the gateway in the building does not receive the device beacon for a period of time or the beacon is received by the gateway outside the building, it can be determined that the terminal has left the teaching building.

On the other hand, the present invention relates to the field of positioning technology, and in particular to a positioning method, device, system and medium based on multi-mode heterogeneous communication.

The present invention relates to the field of positioning technology, and in particular, to a positioning method, device, system and medium based on multi-mode heterogeneous communication.

The traditional outdoor high-precision positioning solution not only makes it difficult to control the power consumption of the positioning terminal, but also usually requires the operator's network environment to meet the high-precision positioning requirements. However, in the network service blind area or the area without base station coverage, such as in the deep mountains and forests in the uninhabited area, or the sea without network coverage, the positioning tag cannot transmit data to the positioning engine through the network, and it is difficult to monitor the movement trajectory of the terminal.

In view of the above-mentioned deficiencies in the prior art, the purpose of the present invention is to provide a positioning method, device, system and medium based on multi-mode heterogeneous communication, aiming to achieve low-power and high-precision positioning based on multi-mode heterogeneous communication, and meet the positioning requirements of different outdoor scenes.

The first aspect of the present invention provides a positioning method based on multi-mode heterogeneous communication, which is applied to a positioning terminal with a multi-mode heterogeneous communication mode, and the method includes:

Determining the target positioning mode of the positioning terminal according to positioning demand information;

Switching to the corresponding base station for communication through the multi-mode heterogeneous network according to the current network environment;

Starting the satellite receiver of the positioning terminal to receive satellite messages;

According to the target positioning mode and the network environment, receiving the auxiliary positioning data sent by the base station and combining the satellite message to perform positioning solution at the terminal locally, or sending the satellite message to the base station to perform positioning solution at the base station or server;

Shutting down the satellite receiver of the positioning terminal and entering a dormant state until the next positioning is turned on.

In one embodiment, determining the target positioning mode of the positioning terminal according to the positioning demand information specifically refers to:

Determining the target positioning mode of the positioning terminal as a normal positioning mode or a precise positioning mode according to the positioning accuracy and positioning frequency.

In one embodiment, switching to the corresponding base station for communication through the multi-mode heterogeneous network according to the current network environment specifically refers to:

Switching to private network base station communication or public network base station communication through the multi-mode heterogeneous network according to the current network environment.

In one embodiment, when the target positioning mode is the common positioning mode, the receiving of the auxiliary positioning data sent by the base station and the combination of the satellite message to perform positioning and solving in the terminal locally include:

Receiving the compressed ephemeris and almanac data sent by the base station;

Performing positioning and solving in the local area according to the compressed ephemeris and almanac data and the satellite message to obtain the terminal positioning information.

In one embodiment, when the target positioning mode is the precise positioning mode, the receiving of the auxiliary positioning data sent by the base station and the combination of the satellite message to perform positioning and solving in the terminal locally include:

Receiving the compressed ephemeris and almanac data and RTK differential data sent by the base station, the RTK differential data comes directly from the base station or from the server, and the data from the server is obtained after aggregation, fusion and virtual processing from other base stations;

Performing positioning and solving in the local area according to the compressed ephemeris and almanac data, satellite message and RTK differential data to obtain the terminal positioning information.

In one embodiment, when the target positioning mode is the common positioning mode, the sending of the satellite message to the base station to perform positioning and solving in the base station or server includes:

Extracting valid original messages from the satellite message;

Sending the valid original message to the base station so that the base station or server performs positioning and solving according to the valid original message to obtain terminal positioning information.

In one embodiment, when the target positioning mode is the precise positioning mode, the sending of the satellite message to the base station to perform positioning and solving in the base station or server includes:

Extracting valid original messages from the satellite message;

Sending the valid original message to the base station so that the base station or server performs positioning and solving according to the valid original message and RTK differential data to obtain terminal positioning information, wherein the RTK differential data comes directly from the base station or from the server, and the data from the server is obtained after aggregation, fusion and virtual processing from other base stations.

The second aspect of the present invention provides a positioning device based on multi-mode heterogeneous communication, which is applied to a positioning terminal with a multi-mode heterogeneous communication mode, and the device includes:

A positioning mode switching module, which is used to determine the target positioning mode of the positioning terminal according to the positioning demand information;

A multi-mode heterogeneous communication module, which is used to switch to the corresponding base station for communication through the multi-mode heterogeneous network according to the current network environment; the network environment includes the public network and private network base stations available for communication, the connection quality, the available bandwidth, the power consumption per bit, etc.;

A receiver control module, which is used to turn on the satellite receiver of the positioning terminal to receive satellite messages; and turn off the satellite receiver of the positioning terminal to enter a dormant state until the next positioning is turned on;

A positioning module, which is used to receive the auxiliary positioning data sent by the base station according to the target positioning mode and the network environment and perform positioning solution in the terminal in combination with the satellite message, or send the satellite message to the base station to perform positioning solution in the base station or server.

The third aspect of the present invention provides a positioning system based on multi-mode heterogeneous communication, the system includes at least one processor; and, a memory connected to the at least one processor in communication; wherein, the memory stores instructions executable by the at least one processor, the instructions are executed by the at least one processor, so that the at least one processor can execute the above-mentioned positioning method based on multi-mode heterogeneous communication.

The fourth aspect of the present invention provides a non-volatile computer-readable storage medium, the non-volatile computer-readable storage medium stores computer-executable instructions, when the computer-executable instructions are executed by one or more processors, the one or more processors can execute the above-mentioned positioning method based on multi-mode heterogeneous communication.

The traditional outdoor high-precision positioning solution not only makes it difficult to control the power consumption of the positioning terminal, but also usually requires the operator's network environment to meet the high-precision positioning requirements. However, in the network service blind area or the area without base station coverage, such as in the deep mountains and forests in the uninhabited area, or the sea without network coverage, the positioning tag cannot transmit data to the positioning engine through the network, and it is difficult to monitor the terminal's movement trajectory.

One embodiment discloses a positioning method, device, system, and medium based on multi-mode heterogeneous communication networks which adapts to varying network environments to execute positioning computations locally at the terminal, base station, or cloud server, depending on current resource availability and latency constraints. This flexible deployment enables low-power and high-precision positioning through intelligent control of satellite receiver activation (e.g., GNSS wake/sleep cycles), optimizing energy consumption without compromising accuracy. The system autonomously shifts between network-assisted positioning and standalone operation, offering seamless coverage across diverse outdoor scenarios—including remote or network-sparse areas such as deep forests, mountainous terrain, or offshore environments—where base station access is limited or absent.

In contrast with traditional high-precision positioning solutions that heavily rely on continuous network connectivity and centralized computation, the proposed invention offers an edge-intelligent, protocol-adaptive architecture that ensures continuity of positioning service, enhanced energy efficiency, and robust terminal-side trajectory tracking under heterogeneous link conditions.

In response to the above problems existing in outdoor positioning, the present invention proposes a positioning method based on multi-mode heterogeneous communication. The positioning method based on multi-mode heterogeneous communication can be applied to the positioning system framework based on multi-mode heterogeneous communication shown in FIG. 31. The terminals in the system framework have multi-mode heterogeneous communication modes; the base station covers a variety of communication networks such as satellites, private networks, WLANs, bridges, public networks, multi-mode heterogeneous networks, etc., and dynamically adjusts any communication parameters according to industry requirements or/and physical locations to establish a network. Specifically, a network service that dynamically adjusts any communication parameters according to industry requirements or/and physical locations is provided through multi-mode heterogeneous network services, for example, physical communication parameters such as source coding, channel coding, modulation model, signal time slot, and transmission power can be adjusted; wireless link access and management technology that can also be flexibly scheduled and flexibly expanded can perform functions such as remote control, upgrade, parameter reading/modification, and management of equipment, support link self-healing, and provide high-utilization, strong stability, and easy-to-recover professional wireless network bearer services.

This multi-mode heterogeneous network is an effective improvement and upgrade of existing wireless communications and networks. Through the dynamic coordination and allocation of communication parameters, multiple networking modes and network resources, the utilization rate of network resources is improved, and the network coverage capacity and coverage performance are increased. For example, in the Greater Khingan Range, the network coverage of operators in forest areas is poor. Multi-mode heterogeneous base stations can be deployed to cover the target area. The multi-mode heterogeneous network is used as the connection network between the terminal and the base station, the terminal and the server, and the base station and the server in the architecture diagram shown in FIG. 31 to achieve low-power and high-performance positioning in outdoor scenarios with poor operator network environments.

As shown in FIG. 32, a flowchart of a positioning method based on multi-mode heterogeneous communication provided by an embodiment of the present invention is introduced by applying to a positioning terminal with a multi-mode heterogeneous communication mode in the framework diagram shown in FIG. 31. The method specifically includes the following steps:

S101, determining the target positioning mode of the positioning terminal according to the positioning requirement information;

S102, switching to the corresponding base station of the positioning terminal through the multi-mode heterogeneous network for communication;

S103, turning on the satellite receiver of the positioning terminal to receive satellite messages;

S104, receiving the auxiliary positioning data sent by the base station and combining the satellite message to perform positioning solution in the terminal according to the target positioning mode and the network environment, or sending the satellite message to the base station to perform positioning solution in the base station or server;

S105, turning off the satellite receiver of the positioning terminal and entering a dormant state until the next positioning is turned on.

In this embodiment, the positioning solution of the positioning terminal can be run locally in the terminal, the base station or the server as needed, and the positioning strategy can be flexibly switched according to the positioning requirements and the network environment. Specifically, the target positioning mode of the positioning terminal can be determined by positioning demand information such as positioning accuracy and positioning frequency, so that the target positioning mode of the positioning terminal can be switched between ordinary positioning mode, precise positioning mode, low-frequency positioning or high-frequency positioning. For example, when the positioning accuracy requirement is higher than the specified accuracy and/or the positioning frequency is lower than the specified frequency, it can be automatically switched to the precise positioning mode to ensure the terminal positioning accuracy; when the positioning accuracy requirement is lower than the specified accuracy and/or the positioning frequency is higher than the specified frequency, it can be automatically switched to the ordinary positioning mode to save terminal power consumption and improve terminal battery life during high-frequency positioning; of course, the positioning mode can also be manually switched according to the actual needs of the user to meet the positioning needs in different scenarios.

On the basis of switching the target positioning mode, according to the current network environment, such as the public network and private network base stations available for communication, connection quality, available bandwidth, power consumption per bit, actual available bandwidth, etc., the multi-mode heterogeneous network is switched to the corresponding base station for communication. Specifically, it switches between private network base station communication and public network base station communication. For example, when the communication condition is good, it switches to private network base station communication to provide safe and reliable positioning services; and when the communication condition is poor, it switches to public network base station communication to ensure basic data transmission needs.

The satellite receiver of the positioning terminal, i.e., the GNSS receiver, has wake-up and sleep functions to minimize positioning power consumption. When positioning is required, the satellite receiver is turned on to receive satellite messages sent by satellites. Since the positioning solution of the positioning terminal can be run on the terminal, base station or server as needed, based on different network environments, when the network environment is poor, the auxiliary positioning data sent by the base station can be received and combined with the satellite message to perform positioning solution in the terminal; or when the network environment is good, the satellite message can also be sent to the base station to perform positioning solution in the base station or server, and the specific auxiliary positioning data content is adjusted based on different target positioning modes. The specific auxiliary positioning data may include satellite ephemeris, satellite almanac, RTK differential data, base station position, etc., to achieve different positioning accuracy.

After completing the positioning, the satellite receiver of the positioning terminal is turned off, so that it enters a dormant state until the next positioning, and then wakes up again for the next round of positioning. Thus, multi-mode heterogeneous communication switching is performed through different positioning modes and network environments, so that positioning solutions can be performed locally in the terminal, base station or server as needed, and low-power and high-precision positioning can be achieved in conjunction with the start-up and sleep of the satellite receiver. Low-power outdoor positioning can be achieved in good or poor network environments, precise or conventional positioning requirements, etc., to meet the positioning requirements of different outdoor scenes.

In one embodiment, when the target positioning mode is the ordinary positioning mode, the receiving of the auxiliary positioning data sent by the base station and the combination of the satellite message to perform positioning solutions locally in the terminal include:

Receiving the compressed ephemeris and almanac data sent by the base station;

Performing positioning solutions locally according to the compressed ephemeris and almanac data and the satellite message to obtain terminal positioning information.

In this embodiment, as shown in FIG. 33, the multi-mode positioning working strategy, when the positioning mode is switched to the normal positioning mode, i.e., general positioning, if the communication condition is poor, the positioning terminal runs the positioning solution locally, receives the compressed ephemeris and almanac data sent by the base station, and specifically obtains the compressed data such as ephemeris and almanac through the public network base station, saving the data transmission time, and after the GNSS receiver is turned on to receive the satellite message, the positioning solution can be performed locally according to the compressed ephemeris and almanac data and the satellite message, and the terminal positioning information is obtained to complete the positioning, and the terminal positioning information can be further sent to the base station or server for other control processing based on the positioning information, which is not limited in this embodiment. After the local positioning solution is completed, the GNSS receiver is turned off in time to enter the dormant state, waiting for the next positioning wake-up. In this embodiment, the positioning terminal supports local position solution, improves the first positioning time by using compressed ephemeris and almanac data, and reduces the power consumption by sleeping and starting the satellite receiver, so that the local low-power positioning can still be achieved when the communication condition is poor.

In one embodiment, when the target positioning mode is the precise positioning mode, the receiving of the auxiliary positioning data sent by the base station and the combination of the satellite message to perform positioning and solving in the terminal locally include:

Receiving the compressed ephemeris and almanac data and RTK differential data sent by the base station, the RTK differential data directly comes from the base station or from the server, and the data from the server is obtained after aggregation, fusion and virtual processing from other base stations;

According to the compressed ephemeris and almanac data, satellite message and RTK differential data, local positioning and solving are performed to obtain terminal positioning information.

In this embodiment, as shown in FIG. 33, when the positioning mode is switched to the precise positioning mode, if the communication condition is poor, the positioning and solving are performed locally by the positioning terminal. In order to achieve more accurate positioning, on the basis of receiving the compressed ephemeris and almanac data sent by the base station, the base station or server is also requested to obtain RTK differential data, the RTK differential data directly comes from the base station or from the server, and the data from the server is obtained after aggregation, fusion and virtual processing from other base stations.

Specifically, RTK (Real-Time Kinematic) positioning technology is a high-precision differential positioning technology based on the global positioning system (Beidou, GPS, GLONASS, etc.). By using an additional base station to provide a high-precision reference signal, the position error of the receiver is calculated in real time and corrected, and centimeter-level positioning accuracy can be achieved through RTK positioning technology. In this embodiment, the private network differential base station has an RTK differential receiver and provides an RTK correction engine. By regularly obtaining satellite position information, the differential correction parameters are updated in real time to obtain RTK differential data. The RTK differential data can be provided downward to the terminal and upward to the server. The server can further provide RTK differential data, ephemeris and almanac to the public network base station, so that the positioning terminal can obtain compressed data such as ephemeris and almanac and RTK differential data through the public network base station when the communication conditions are poor. After the GNSS receiver is turned on to receive satellite telegrams, the positioning solution can be performed locally according to the compressed ephemeris and almanac data, satellite telegrams and RTK differential data to obtain accurate terminal positioning information and complete the local high-precision positioning process. The precise terminal positioning information can be further sent to the base station or server for other control processing based on the precise positioning information. This embodiment does not limit this. After completing the local precise positioning solution, the GNSS receiver is promptly turned off and enters a dormant state, waiting for the next positioning wake-up. In this embodiment, the positioning terminal supports local position solution, improves the first positioning time by using compressed ephemeris and almanac data, and reduces power consumption by sleeping and starting the satellite receiver, requests RTK differential data from the base station or server, and combines RTK differential data to achieve high-precision positioning. When the communication conditions are poor, local low-power and high-precision positioning can still be achieved.

In one embodiment, when the target positioning mode is the normal positioning mode, the sending of the satellite message to the base station to perform positioning solution at the base station or server includes:

Extracting a valid original message from the satellite message;

Sending the valid original message to the base station so that the base station or server performs positioning solution according to the valid original message to obtain the terminal positioning information.

In this embodiment, as shown in FIG. 33, the multi-mode positioning working strategy, when the positioning mode is switched to the normal positioning mode, i.e., general positioning, if the communication condition is good, the positioning solution is run through the private network base station or server. After the GNSS receiver is turned on to receive satellite messages, the valid original message is extracted from the satellite message of the GNSS receiver, specifically, the bad message and the compressed message are removed and sent to the multi-mode positioning base station or server. The base station or server performs positioning solution based on the valid original message to obtain the terminal positioning information, which can effectively reduce the power consumption caused by the satellite position solution and save the terminal power consumption. Preferably, when the positioning solution is run on the private network base station or server, the positioning terminal can turn off the GNSS receiver and enter the dormant state after sending the original message to the base station or server, without waiting for the private network base station or server to complete the positioning calculation, so as to reduce the power consumption caused by the GNSS receiver as much as possible, and realize low-power positioning based on multi-mode heterogeneous communication.

In one embodiment, when the target positioning mode is the precise positioning mode, the sending of the satellite message to the base station to perform positioning solution at the base station or server includes:

Extracting a valid original message from the satellite message;

Sending the valid original message to the base station so that the base station or server performs positioning solution based on the valid original message and RTK differential data to obtain terminal positioning information, wherein the RTK differential data comes directly from the base station or from the server, and the data from the server is obtained after aggregation, fusion and virtual processing from other base stations.

In this embodiment, as shown in FIG. 33, the multi-mode positioning working strategy, when the positioning mode is switched to the precise positioning mode, if the communication condition is good, the positioning solution is run through the private network base station or server. After the GNSS receiver is turned on to receive satellite messages, the valid original message is extracted from the satellite message of the GNSS receiver, specifically, the bad message and the compressed message are removed and sent to the multi-mode positioning base station or server. The base station or server performs positioning solution based on the valid original message, and directly provides RTK differential correction to obtain accurate terminal positioning information, which can effectively reduce the power consumption caused by satellite position solution and save terminal power consumption. Preferably, when the positioning solution is run on the private network base station or server, the positioning terminal can turn off the GNSS receiver and enter the dormant state after sending the original message to the base station or server, without waiting for the private network base station or server to complete the positioning calculation, so as to reduce the power consumption caused by the GNSS receiver as much as possible, and realize low-power positioning based on multi-mode heterogeneous communication.

Specifically, in the precise positioning mode, the positioning terminal carries the currently available satellite number when requesting RTK data from the base station or server. The base station and server extract the corresponding data from the complete RTK data according to the currently available satellite number of the device, and compress the data and send it to the terminal. The specific RTK data compression method includes eliminating poor quality data, using differential compression when the RTK data requested continuously does not change much, etc., to save the amount of transmitted data and improve the positioning speed.

The positioning terminal can also limit the available satellite numbers according to the actual network conditions and positioning requirements. If the network is not good and the bandwidth is limited, the satellites with slightly poor signal strength will be designated as unavailable satellites, which can effectively reduce the bandwidth occupied by RTK data.

When multiple positioning terminals around the base station request to obtain RTK differential data respectively, the communication bandwidth of the base station may be insufficient. At this time, the base station adopts a broadcast method to send RTK differential data. The broadcast method of the base station means that the base station regularly sends broadcast information to all connected terminals, including time, location, frequency and other information, to ensure that the communication connection of all terminals is unimpeded. The terminal receives RTK differential data at the same time when the base station broadcast is turned on to ensure accurate and reliable acquisition of RTK differential data and achieve local high-precision positioning.

Specifically, the server supports all base station algorithms, and when providing RTK differential data to the terminal, it can automatically select the data of the base station closest to the terminal, and can also generate new virtual RTK differential data by combining the data of multiple multi-mode differential stations. This embodiment does not limit this.

It should be noted that there is not necessarily a certain order between the above steps. A person of ordinary skill in the art can understand from the description of the embodiment of the present invention that in different embodiments, the above steps can have different execution orders, that is, they can be executed in parallel, or they can be executed interchangeably, etc. For example, step S101 and step S102 can be executed in parallel, that is, the target positioning mode and the base station communication are switched at the same time. Step S101 can also be executed first and then step S102, or step S102 can be executed first and then step S101. This embodiment does not limit this.

For example, an application scenario of the positioning method based on multi-mode heterogeneous communication provided in an embodiment of the present invention is a multi-mode self-organizing network mutual identification intelligent positioning badge. A multi-mode self-organizing network mutual identification intelligent positioning badge includes: a main controller, a cellular communication module, an LPWA communication module, a BLE communication module, an acceleration sensor, a GNSS positioning module, and a server.

The main controller is the control center of all modules. The cellular communication module connects to the server through a mobile network. The LPWA communication module can communicate with the LPWA gateway, and can also be used for self-organizing network communication between badges. The BLE communication module is used for indoor RSSI and AOA positioning, clocking in and out, and can also be used for mutual scanning and identification between badges. The acceleration sensor is used for step counting and motion recognition, and can be used to identify whether the wearer is moving. The GNSS positioning module is used to achieve outdoor positioning.

By applying the positioning method based on multi-mode heterogeneous communication provided in the embodiment of the present invention to the smart positioning badge, the target positioning mode of the positioning terminal is determined according to the positioning demand information; according to the current network environment, the multi-mode heterogeneous network is switched to the corresponding base station for communication; the satellite receiver of the positioning terminal is turned on to receive satellite messages; according to the target positioning mode, the auxiliary positioning data sent by the base station is received and combined with the satellite message to perform positioning solution at the terminal, or a satellite message is sent to the base station to perform positioning solution at the base station or server; the satellite receiver of the positioning terminal is turned off and enters a dormant state until the next positioning is turned on. By switching multi-mode heterogeneous communication between different positioning modes and network environments, the positioning solution can be performed locally at the terminal, base station or server as needed, and low-power consumption and high-precision positioning can be achieved in conjunction with the start-up and dormancy of the satellite receiver, which can meet the positioning requirements of different outdoor scenes. For example, it can be worn by sanitation workers, security personnel, construction workers, forest rangers, firefighters and other outdoor personnel who need to be positioned, and is used to record personnel trajectories, attendance, etc.

Exemplarily, an application scenario of the positioning method based on multi-mode heterogeneous communication provided in an embodiment of the present invention is a water-falling recognition and automatic rescue system. The water-falling recognition and automatic rescue system based on AI is a water-falling recognition and unmanned automatic rescue system using video images plus AI algorithms, including: a main control unit, a ball camera or a panoramic camera, a remote-controlled lifeboat, a lifeboat dock, and a server. The main control unit includes an AI processor, a wireless communication unit with the lifeboat, a wired or wireless unit for communicating with the server, and a control unit. The ball camera or the panoramic camera provides a panoramic image for the main control unit. The lifeboat dock can charge the lifeboat, release and recover the lifeboat, receive the control of the main control unit, and send the status to the main control unit. The lifeboat has a controller, a rechargeable battery, a power system, a satellite positioning unit, a voice recognition unit, a load detection unit, and a wireless communication unit.

The water-falling recognition and automatic rescue system based on AI provides an application method: the camera ball camera or the panoramic camera keeps patrolling the water surface, and identifies whether someone falls into the water through the AI image recognition algorithm. The lifeboat is docked at the lifeboat dock and automatically fully charged. The lifeboat and the main control box are connected wirelessly and are in standby mode. When someone falls into the water, the main control box sends out an audible and visual alarm to remind nearby personnel to assist in the rescue, and sends an alarm message and on-site images to the server. The video AI algorithm calculates the rough position of the person who falls into the water based on the current camera pitch angle and the position of the person who falls into the water in the picture. Release the lifeboat. The lifeboat has a satellite positioning function and can report its own position to the main control unit. The main control unit calculates the best driving route to control the lifeboat to the point where it falls into the water. The position of the point where the water falls can also be sent to the lifeboat, and the lifeboat calculates the path to the point where the water falls. The camera continues to track the position of the person who falls into the water and sends it to the lifeboat. Since the positioning calculation of the AI algorithm for the point where the water falls may deviate from the position of the satellite positioning, when the lifeboat and the rescue target are close, the camera uses the AI algorithm to identify the distance and relative direction between the two, and controls the lifeboat to get as close to the target as possible. The lifeboat has a load detection function. When it detects that the drowning person has grabbed the back of the boat, the lifeboat drags the drowning person to a safe area. The lifeboat is equipped with a speaker and a microphone, and the drowning person issues a control command through voice prompts, such as: "The lifeboat supports voice control. You can issue the following commands: forward, stop, turn left, turn right. If you do not issue a control, the lifeboat will sail to the default landing point." The drowning person says "forward", and the lifeboat moves forward. Other commands are similar.

By applying the positioning method based on multi-mode heterogeneous communication provided by the embodiment of the present invention on the lifeboat, the target positioning mode of the positioning terminal is determined according to the positioning demand information; according to the current network environment, the corresponding base station is switched to communicate through the multi-mode heterogeneous network; the satellite receiver of the positioning terminal is turned on to receive satellite telegrams; according to the target positioning mode, the auxiliary positioning data sent by the base station is received and combined with the satellite telegrams to perform positioning solution at the terminal locally, or a satellite telegram is sent to the base station to perform positioning solution at the base station or server; the satellite receiver of the positioning terminal is turned off and enters a dormant state until the next positioning is turned on. By switching between multi-mode heterogeneous communications in different positioning modes and network environments, positioning solutions can be performed locally on the terminal, in the base station or on the server as needed, and low-power and high-precision positioning can be achieved in conjunction with the start-up and sleep of the satellite receiver, which can meet the positioning and search and rescue needs of different outdoor scenes. Low-power and high-precision positioning can still be achieved in sea areas with poor network coverage, so that rescue can be carried out in a timely and accurate manner.

It can be understood that the positioning method based on multi-mode heterogeneous communication provided in the embodiment of the present invention can also be applied to various outdoor scene environments, such as field operations, forest fire prevention and rescue, etc., and can meet the needs of high-precision positioning in an operator-free network environment.

Another embodiment of the present invention provides a positioning device based on multi-mode heterogeneous communication, which is applied to a positioning terminal with a multi-mode heterogeneous communication mode. As shown in FIG. 34, the device 1 includes:

Positioning mode switching module 11, used to determine the target positioning mode of the positioning terminal according to the positioning demand information;

Multi-mode heterogeneous communication module 12, used to switch to the corresponding base station of the positioning terminal through the multi-mode heterogeneous network for communication;

Receiver control module 13, used to turn on the satellite receiver of the positioning terminal to receive satellite messages; and turn off the satellite receiver of the positioning terminal to enter a dormant state until the next positioning is turned on;

Positioning module 14, used to receive the auxiliary positioning data sent by the base station according to the target positioning mode and network environment and perform positioning solution in the terminal in combination with the satellite message, or send the satellite message to the base station to perform positioning solution at the base station or server.

The modules referred to in the present invention include but are not limited to a series of computer program instruction segments capable of completing specific functions, which are more suitable for describing the positioning execution process based on multi-mode heterogeneous communication than programs. For the specific implementation of each module, please refer to the corresponding method embodiment above, which will not be repeated here. Each module may also include related hardware devices, etc.

Another embodiment of the present invention provides a positioning system based on multi-mode heterogenous communication. As shown in FIG. 35, the system 10 includes:

One or more processors 110 and a memory 120. FIG. 35 takes a processor 110 as an example for introduction. The processor 110 and the memory 120 can be connected via a bus or other means. FIG. 35 takes the connection via a bus as an example.

The processor 110 is used to complete various control logics of the system 10. It can be a general-purpose processor, a digital signal processor (DSP), an application-specific integrated circuit (ASIC), a field programmable gate array (FPGA), a single-chip microcomputer, an ARM (Acorn RISC Machine) or other programmable logic device, a discrete gate or transistor logic, a discrete hardware component, or any combination of these components. In addition, the processor 110 can also be any traditional processor, microprocessor or state machine. The processor 110 can also be implemented as a combination of computing devices, for example, a combination of a DSP and a microprocessor, multiple microprocessors, one or more microprocessors combined with a DSP and/or any other such configuration.

The memory 120, as a non-volatile computer-readable storage medium, can be used to store non-volatile software programs, non-volatile computer executable programs and modules, such as program instructions corresponding to the positioning method based on multi-mode heterogeneous communication in the embodiment of the present invention. The processor 110 executes various functional applications and data processing of the system 10 by running the non-volatile software programs, instructions and units stored in the memory 120, that is, the positioning method based on multi-mode heterogeneous communication in the above method embodiment is realized.

The memory 120 may include a program storage area and a data storage area, wherein the program storage area may store an operating system and an application required by at least one function; the data storage area may store data created according to the use of the system 10, etc. In addition, the memory 120 may include a high-speed random access memory, and may also include a non-volatile memory, such as at least one disk storage device, a flash memory device, or other non-volatile solid-state storage device. In some embodiments, the memory 120 may optionally include a memory remotely arranged relative to the processor 110, and these remote memories may be connected to the system 10 via a network. Examples of the above network include, but are not limited to, the Internet, an intranet, a local area network, a mobile communication network, and a combination thereof.

One or more units are stored in the memory 120, and when executed by one or more processors 110, the following steps are implemented:

Determine the target positioning mode of the positioning terminal according to the positioning demand information;

Switch the positioning terminal to the corresponding base station for communication through a multi-mode heterogeneous network; the network environment includes the public network and private network base stations available for communication, connection quality, available bandwidth, power consumption per bit, etc.;

Turn on the satellite receiver of the positioning terminal to receive satellite messages;

According to the target positioning mode and the network environment, receive the auxiliary positioning data sent by the base station and perform positioning solution in the terminal locally in combination with the satellite message, or send the satellite message to the base station to perform positioning solution in the base station or server;

Turn off the satellite receiver of the positioning terminal and enter a dormant state until the next positioning is turned on.

In one embodiment, the target positioning mode of the positioning terminal is determined according to the positioning demand information, specifically referring to:

Determine the target positioning mode of the positioning terminal as a normal positioning mode or a precise positioning mode according to the positioning accuracy and positioning frequency.

In one embodiment, the switching to the corresponding base station for communication through the multi-mode heterogeneous network according to the current network environment specifically refers to:

Switching to private network base station communication or public network base station communication through the multi-mode heterogeneous network according to the current network environment.

In one embodiment, when the target positioning mode is the ordinary positioning mode, the receiving of the auxiliary positioning data sent by the base station and combining the satellite message to perform positioning solution in the terminal locally includes:

Receiving the compressed ephemeris and almanac data sent by the base station;

Performing positioning solution locally according to the compressed ephemeris and almanac data and the satellite message to obtain the terminal positioning information.

In one embodiment, when the target positioning mode is the precise positioning mode, the receiving of the auxiliary positioning data sent by the base station and the combination of the satellite message to perform positioning and solving in the terminal locally include:

Receiving the compressed ephemeris and almanac data and RTK differential data sent by the base station, the RTK differential data directly comes from the base station or from the server, and the data from the server is obtained after aggregation, fusion and virtual processing from other base stations;

Performing positioning and solving in the local area according to the compressed ephemeris and almanac data, satellite message and RTK differential data to obtain terminal positioning information.

In one embodiment, when the target positioning mode is the ordinary positioning mode, the sending of the satellite message to the base station to perform positioning and solving in the base station or server includes:

Extracting a valid original message from the satellite message;

Sending the valid original message to the base station so that the base station or server performs positioning and solving according to the valid original message to obtain terminal positioning information.

In one embodiment, when the target positioning mode is the precise positioning mode, the sending of the satellite message to the base station to perform positioning solution at the base station or server includes:

Extracting a valid original message from the satellite message;

Sending the valid original message to the base station so that the base station or server performs positioning solution according to the valid original message and RTK differential data to obtain terminal positioning information, wherein the RTK differential data comes directly from the base station or from the server, and the data from the server is obtained after aggregation, fusion and virtual processing from other base stations.

An embodiment of the present invention provides a non-volatile computer-readable storage medium, the computer-readable storage medium stores computer-executable instructions, and the computer-executable instructions are executed by one or more processors, for example, executing the method steps S101 to S105 in FIG. 32 described above.

Figure 36:
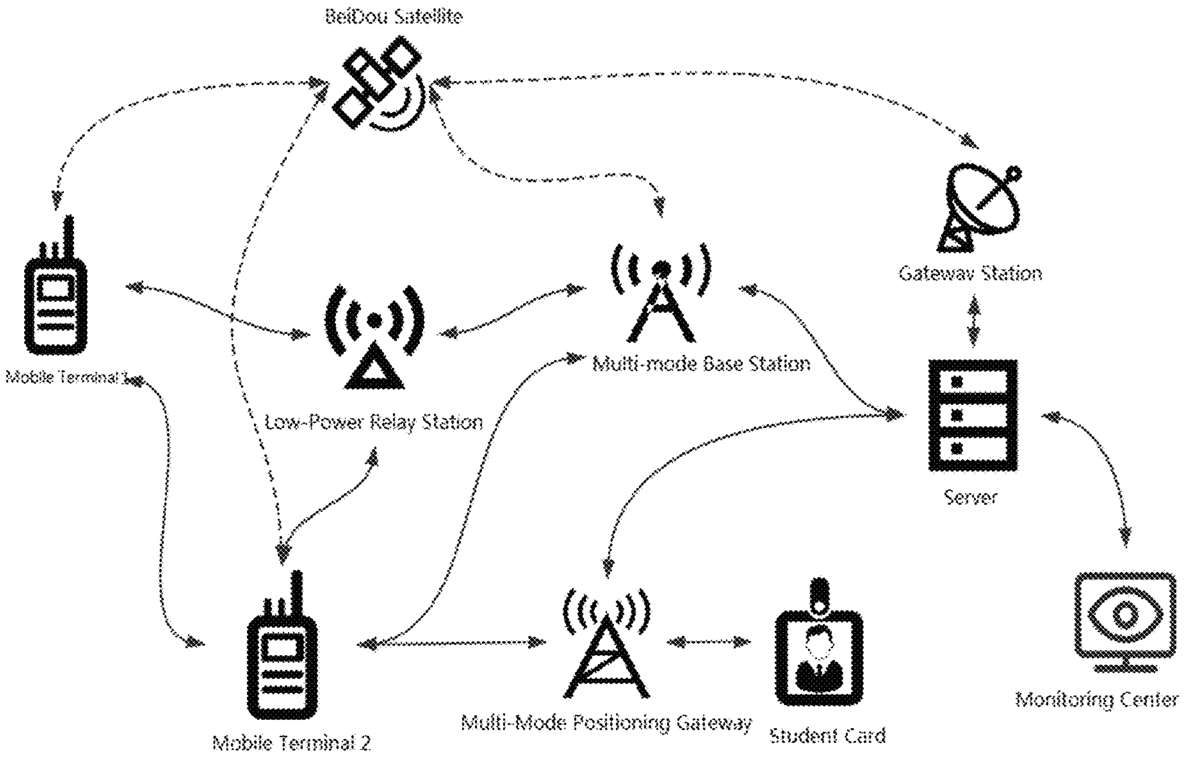

Another embodiment of the present invention is shown in FIG. 36, a set of dangerous area warning and rescue processes, in which:

1) The student card uses low-power multi-mode heterogeneous positioning to achieve low-power positioning through a multi-mode positioning gateway. Due to the use of a low-power positioning method, the student card has a very long standby time. The student's positioning trajectory is sent to server 1. Due to the differences in positioning strategies in different regions, some trajectory points are relatively not particularly accurate, but they are sufficient to meet the requirements for determining the existence of the region; the multi-mode positioning gateway supports higher-precision positioning of the student card when necessary;

2) Mobile terminal 1 and mobile terminal 2 use satellite positioning support, and the frequency, accuracy and method of satellite positioning can be changed in different scenarios, such as using RTK positioning, using base stations and server calculations, etc.; the multi-mode base station provides necessary satellite positioning auxiliary data such as almanac, ephemeris and RTK differential data in this process; usually, the mobile terminal only needs to report rough location information to the server once in a certain period of time;

3) Mobile terminal 1 and mobile terminal 2 support variable bit rate intercom function, and can be directly networked with each other connection, or it can be connected through a multi-mode base station;

4) In some places where base station network coverage is poor, low-power relay stations can be responsible for relay communications between different mobile terminals and between mobile terminals and gateways;

5) When a student wearing a student card may approach a dangerous area, such as a dangerous mine, the multi-mode positioning gateway sends a precise positioning instruction to the student card. Through the precise positioning result, it is determined that the student has indeed entered the dangerous area. The gateway sends an alarm message to the server, which will be sent to parents and relevant management departments, and a warning message "Leave the dangerous area as soon as possible" will be issued on the student card;

6) If the student still stays in the dangerous area, it may be trapped accidentally. The system notifies the rescue personnel based on the rough location information of the rescue personnel and mobilizes the nearby rescue personnel to the location of the student card for rescue;

7) Mobile terminal 2 turns on the high-precision satellite positioning function, and quickly rushes to the scene according to its current location and the location of the student card. At the same time, it contacts mobile terminal 2 through intercom to communicate the rescue details. Due to the good communication conditions, high-definition intercom data is used;

8) Due to the obstruction of the mountain at the scene, the direct communication between mobile terminal 1 and mobile terminal 2 is blocked. The low-power relay station deployed on the mountain side turns on the relay function to maintain the communication between mobile terminal 1 and mobile terminal 2;

9) Mobile terminal 2 and mobile terminal 1 continue to move to the rescue site and maintain intercom communication. However, because mobile terminal 2 is getting farther and farther away from the low-power relay station, it is impossible to maintain high-definition intercom data transmission. Mobile terminal 2 and mobile terminal 1 switch to an intercom mode with a higher compression ratio through evaluation to continue to maintain communication;

10) After mobile terminal 2 and mobile terminal 1 arrive at the scene one after another, since frequent and precise positioning is no longer required, the positioning mode is switched to low-frequency rough positioning to save bandwidth and power consumption. During this process, intercom communication is maintained with the monitoring center until the rescue is completed.

Various combinations of the embodiments of FIGS. 1 to 36 can be applied to the next-generation Internet of Things as shown in FIG. 37, and support and integrate with the technology in the system of FIG. 37 to effectively solve many bottleneck problems in the industrial Internet of Things, such as high latency, high power consumption, incomplete network coverage, low data carrying capacity, different communication protocols, insecure data, and application terminal allocation of communication resources. The present invention greatly improves the application value and user experience of the Internet of Things in a variety of different environments, improves application efficiency, and truly realizes the effective application of "Internet of Everything", including but not limited to the following: The next generation of the Internet of Things over Physical Layer-Optimized Multimode Heterogeneous Cellular Network (PLOMHCN is characterized by weakening the boundaries of the traditional Internet of Things's sense (perception), transmission (communication), calculation (calculation), control (control) and use (application), improving the interoperability between layers, and promoting each other between layers with the guidance of dynamic, on-demand, and reasonable allocation of resources, so that the system can achieve overall optimization; Among them, the communication link and physical layer are particularly critical. Based on the multi-mode heterogeneous network, it is specially built for the smart twin/smart empowerment of various industries. Through the dynamic coordination and allocation of communication parameters, multiple networking methods and network resources, ubiquitous, dynamic, and real-time effective communication is realized, the spectrum utilization rate, the utilization rate of network resources, and the coverage capacity and coverage performance of the network are improved; The multi-mode heterogeneous network (e.g. PLOMHCN) has polymorphism, and the communication parameters can be dynamically adjusted according to the physical location to establish a network. In addition to the mainstream communication mode, it also includes advanced networking methods such as Mesh, relay, and SDN. Supports flexible scheduling, flexible expansion of wireless link access and management technology, supports link self-healing, and provides high utilization, strong stability, and easy recovery of professional wireless network bearer services;

Multi-mode heterogeneous networks are closely integrated with the industry, and dynamically adjust communication parameters according to industry requirements or/and physical location, such as source coding, channel coding, signal time slot, transmission power, carrier frequency, carrier bandwidth, modulation mode, transmission power, receiving sensitivity and other communication parameters; different communication requirements use different communication strategies, such as high-bandwidth communication requirements can adopt data transmission point splitting, multi-path concurrency during transmission and receiving point aggregation, and can be combined with high service quality allocation and other strategies, such as data for high-reliability communication requirements can adopt multi-channel redundant transmission mode, and ensure reliable delivery, and reduce the delay caused by the sequential switching of multiple communication modes;

Multi-mode heterogeneous networks are deeply integrated with sensor control terminals, and perception dynamically changes sampling intervals and sampling accuracy according to their own conditions such as power, perception data value, perception data change rate, preset threshold, network status, etc., and further adjusts parameters such as transmission frequency, transmission power and modulation mode, so that response time, whole machine power consumption, and network bandwidth occupancy can be taken into account at the same time. The sensing device combines edge computing to achieve edge correction and self-correction, and can also generate edge decisions at the same time to directly drive the control terminal;

The multi-mode heterogeneous network has autonomous capabilities. The base station/gateway can have its own distributed edge core network (or communication server), and can automatically switch to the edge core network when the connection with the server-side core network is interrupted; in the case of network disconnection, the base stations/gateways can be networked wirelessly or wired, with one base station/gateway serving as the core network. The edge core network provides hierarchical and regional communications in the case of network disconnection and weak networks, providing necessary support for data exchange for domain-specific edge computing;

Multi-mode heterogeneous networks and artificial intelligence support, the core network and base stations can collect link information of base stations, routing nodes, and terminals, including: communication standards, communication paths, signal-to-noise ratios, packet loss rates, delays, channel occupancy rates, etc., and use deep learning to make link predictions and then deduce better networking and communication solutions, and adaptively adjust the device's connection mode (direct base station, mesh network, point-to-point), transmission path (single path, multi-path), and RF parameters as needed (data transmission rate, response time, reliability, connection distance, etc.). Number (modulation mode, rate, spectrum occupancy, receiving bandwidth);

The present invention also discloses a positioning method, device, system and medium based on multi-mode heterogeneous communication, the method includes determining the target positioning mode of the positioning terminal according to the positioning demand information; switching to the corresponding base station of the positioning terminal through the multi-mode heterogeneous network for communication; starting the satellite receiver of the positioning terminal to receive satellite messages; according to the target positioning mode, receiving the auxiliary positioning data sent by the base station and combining the satellite message to perform positioning solution in the terminal locally, or sending the satellite message to the base station to perform positioning solution in the base station or server; turning off the satellite receiver of the positioning terminal and entering a dormant state until the next positioning is turned on. By switching multi-mode heterogeneous communication with different positioning modes and network environments, the positioning solution can be performed locally in the terminal, base station or server as needed, and low-power and high-precision positioning can be achieved in conjunction with the start-up and dormancy of the satellite receiver to meet the positioning needs of different outdoor scenes.

Of course, ordinary technicians in this field can understand that all or part of the processes in the above-mentioned embodiment method can be completed by instructing related hardware (such as processors, controllers, etc.) through computer programs. The computer program can be stored in a non-volatile computer-readable storage medium. When the computer program is executed, it may include the processes of the above-mentioned method embodiments. The storage medium may be a memory, a disk, a floppy disk, a flash memory, an optical storage device, etc.

One embodiment provides a low-power multi-mode heterogeneous positioning system, which includes an electronic terminal and at least one multi-mode gateway deployed at a target location and connected to the electronic terminal; wherein the electronic terminal includes a low-frequency wake-up module and a multi-mode transceiver module, and the multi-mode gateway includes a low-frequency transceiver module and a high-frequency transceiver module. In this way, the low-power multi-mode heterogeneous positioning system of the present invention can achieve low-power and high-precision positioning of target personnel/animals/objects, etc.

The technical features of the above-mentioned embodiments can be combined arbitrarily. In order to make the description concise, all possible combinations of the technical features in the above-mentioned embodiments are not described. However, as long as there is no contradiction in the combination of these technical features, they should be considered to be within the scope of this specification.

The above-mentioned embodiments only express several implementation methods of the present invention, and the descriptions thereof are relatively specific and detailed, but they cannot be construed as limiting the scope of the patent of the present invention. It should be understood that the application of the present invention is not limited to the above-mentioned examples, and it can be improved or transformed according to the above description by ordinary technicians in the field, and all these improvements and transformations shall fall within the scope of protection of the claims attached to the present invention.

The invention claimed is:

1. A wireless system configured to optimize wireless transmission propagation, signal attenuation, or communication capacity for incident management or building automation, comprising:

a plurality of multimode data transmit units (MDTUs), each MDTU comprising at least one processor, a memory, and at least one wireless transceiver, configured to communicate with a plurality of wireless sensors using one or more wireless communication modes, protocols, frequency bands, or radio access technologies (RATs); wherein the plurality of MDTUs are configured to:

(i) receive sensor data from the wireless sensors distributed across one or more monitored zones;

(ii) evaluate the sensor data to determine whether the sensor data indicates an abnormal condition or security incident; and (iii) responsive to detection of the abnormal condition or security incident, perform one or more of:

alert a designated set of recipients, control a door or access gate, command an elevator to a floor of a building, open or close a valve, command operation of a water pump, or transmit a control signal to control a process, the memory storing wireless capability information associated with the MDTUs and the wireless sensors, the wireless capability information including wireless transmission frequency information, communication mode information, communication capacity information, or transmission characteristics information associated with the MDTUs and the wireless sensors; and a computing system operatively coupled with the MDTUs and programmed to dynamically optimize wireless communication links for communication of the sensor data based on the stored wireless capability information and one or more of:

distance between the wireless sensors and the MDTUs, signal attenuation, received signal strength, signal-to-noise ratio, interference of a transmission link, communication capacity associated with an MDTU, number of wireless sensors associated with an MDTU, wireless frequency compatibility, or wireless communication mode compatibility.

2. The system of claim 1, wherein the computing system is further programmed to prevent assignment of an additional wireless sensor to an MDTU when a number of wireless sensors associated with the MDTU exceeds a communication capacity threshold.

3. The system of claim 1, wherein the computing system is further programmed to dynamically update optimization of the wireless communication links responsive to at least one of: changes in signal attenuation, changes in interference, mobility of a wireless sensor, changes in environmental conditions, or expiration of a predetermined time interval.

4. The system of claim 1, wherein the computing system is further programmed to dynamically optimize the wireless communication links based on modeled or measured signal attenuation between the wireless sensors and the MDTUs.

5. The system of claim 1, wherein the computing system is further programmed to dynamically optimize the wireless communication links based on received signal strength associated with wireless transmissions between the wireless sensors and the MDTUs.

6. The system of claim 1, wherein the computing system is distributed across the one or more MDTUs, one or more edge computing devices, or any combination thereof.

7. The system of claim 1, wherein the computing system is further programmed to dynamically reassign a wireless communication association of a wireless sensor from a first MDTU to a second MDTU.

8. The system of claim 1, wherein the system further comprises an adaptive encryption configuration configured to change according to a selected wireless communication link associated with encrypted sensor data.

9. The system of claim 1, wherein the computing system is configured to adjust a sampling interval, precision, or transmission frequency of a wireless sensor responsive to detection of the abnormal condition.

10. The system of claim 1, wherein the computing system is further programmed to dynamically optimize the wireless communication links based on a bandwidth requirement.

11. A method for optimizing wireless transmission propagation, signal attenuation, and/or communication capacity for incident management or building automation, comprising:

communicating, by a plurality of multimode data transmit units (MDTUs), with a plurality of wireless sensors using one or more wireless communication modes, protocols, frequency bands, or radio access technologies (RATs);

receiving sensor data from the wireless sensors distributed across one or more monitored zones;

evaluating the sensor data to determine whether the sensor data indicates an abnormal condition or security incident;

responsive to detection of the abnormal condition or security incident, performing one or more of:

alerting a designated set of recipients, controlling a door or access gate, commanding an elevator to a floor of a building, opening or closing a valve, commanding operation of a water pump, or transmitting a control signal;

storing wireless capability information associated with the MDTUs and the wireless sensors, the wireless capability information including wireless transmission frequency information, communication mode information, communication capacity information, or transmission characteristics information associated with the MDTUs and the wireless sensors; and dynamically optimizing wireless communication links for communication of the sensor data based on the stored wireless capability information and one or more of:

distance between the wireless sensors and the MDTUs, signal attenuation, received signal strength, signal-to-noise ratio, interference of a transmission link, communication capacity associated with an MDTU, number of wireless sensors associated with an MDTU, wireless frequency compatibility, or wireless communication mode compatibility.

12. The method of claim 11, further comprising preventing assignment of an additional wireless sensor to an MDTU when a number of wireless sensors associated with the MDTU exceeds a communication capacity threshold.

13. The method of claim 11, further comprising dynamically updating optimization of the wireless communication links responsive to at least one of: changes in signal attenuation, changes in interference, mobility of a wireless sensor, changes in environmental conditions, or expiration of a predetermined time interval.

14. The method of claim 11, further comprising dynamically optimizing the wireless communication links based on modeled or measured signal attenuation between the wireless sensors and the MDTUs.

15. The method of claim 11, further comprising dynamically optimizing the wireless communication links based on received signal strength associated with wireless transmissions between the wireless sensors and the MDTUs.

16. The method of claim 11, further comprising dynamically optimizing the wireless communication links based on a bandwidth requirement.

17. The method of claim 11, further comprising dynamically reassigning a wireless communication association of a wireless sensor from a first MDTU to a second MDTU.

18. The method of claim 11, further comprising adaptively changing an encryption configuration according to a selected wireless communication link associated with encrypted sensor data.

19. The method of claim 11, further comprising adjusting a sampling interval, precision, or transmission frequency of a wireless sensor responsive to detection of the abnormal condition.

20. The method of claim 11, further comprising dynamically optimizing the wireless communication links based on packet loss rate.

* * * * *